(12) United States Patent
Serebrennikov

(10) Patent No.: US 9,043,246 B2
(45) Date of Patent: *May 26, 2015

(54) METHOD FOR PERFORMING TRANSACTIONAL COMMUNICATION USING A UNIVERSAL TRANSACTION ACCOUNT IDENTIFIER ASSIGNED TO A CUSTOMER

(71) Applicant: Oleg Serebrennikov, Moscow (RU)

(72) Inventor: Oleg Serebrennikov, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 14/468,093

(22) Filed: Aug. 25, 2014

(65) Prior Publication Data
US 2015/0052056 A1 Feb. 19, 2015

Related U.S. Application Data

(63) Continuation of application No. 10/927,460, filed on Aug. 27, 2004, now Pat. No. 8,868,467, which is a continuation of application No. PCT/IB03/00634, filed on Jan. 24, 2003, now abandoned, and a
(Continued)

(30) Foreign Application Priority Data

Oct. 24, 2001 (RU) ................. 2001128645

(51) Int. Cl.
G06Q 20/00 (2012.01)
G06Q 20/40 (2012.01)
G06Q 20/34 (2012.01)
G06Q 20/16 (2012.01)

(52) U.S. Cl.
CPC ............... *G06Q 20/40* (2013.01); *G06Q 20/34* (2013.01); *G06Q 20/16* (2013.01)

(58) Field of Classification Search
USPC ............ 705/16, 21, 59, 71; 380/44, 262, 278, 380/279
See application file for complete search history.

(56) References Cited

U.S. PATENT DOCUMENTS

| | | | |
|---|---|---|---|
| 5,457,736 A | 10/1995 | Cain et al. | |
| 5,477,038 A | 12/1995 | Levine et al. | |
| 5,521,962 A | 5/1996 | Chavez, Jr. | |
| 5,732,359 A | 3/1998 | Baranowsky, II et al. | |

(Continued)

FOREIGN PATENT DOCUMENTS

EP 1130491 A2 9/2001

OTHER PUBLICATIONS

International Preliminary Examination Report issued in parent International Application No. PCT/IB03/002045, dated Jan. 13, 2005.

*Primary Examiner* — Dante Ravetti
(74) *Attorney, Agent, or Firm* — Sughrue Mion, PLLC

(57) ABSTRACT

A method for sending a transactional message assigns a universal transactional account (UTA) identifier to a customer, associates the assigned UTA identifier with a customer account corresponding to the customer, assigns an account network address corresponding to a service provider, stores, in a routing database, the UTA identifier in association with the account network address, creates, using a second terminal including a processor, the transactional message comprising the UTA identifier and a value, and sends the transactional message to the service provider, the sending the transactional message to the service provider including using the routing database to look up the account network address corresponding to the UTA identifier and transmitting the transactional message to the account network address.

1 Claim, 26 Drawing Sheets

Related U.S. Application Data continuation of application No. PCT/IB03/02045, filed on Apr. 16, 2003, now abandoned, and a continuation of application No. PCT/IB03/05326, filed on Oct. 23, 2003, now abandoned, and a continuation of application No. 10/085,717, filed on Feb. 27, 2002, now abandoned, and a continuation of application No. 10/233,426, filed on Sep. 4, 2002, now abandoned, and a continuation of application No. PCT/RU02/00462, filed on Oct. 23, 2002, now abandoned.

(56) References Cited

U.S. PATENT DOCUMENTS

| | | |
|---|---|---|
| 5,793,762 A | 8/1998 | Penners et al. |
| 6,151,624 A | 11/2000 | Teare et al. |
| 6,324,645 B1 | 11/2001 | Andrews et al. |
| 6,353,621 B1 | 3/2002 | Boland et al. |
| 6,385,728 B1 | 5/2002 | Debry |
| 6,539,007 B1 | 3/2003 | Reeder et al. |
| 6,539,077 B1 | 3/2003 | Ranalli et al. |
| 7,644,037 B1 | 1/2010 | Ostrovsky |
| 2001/0024443 A1 | 9/2001 | Alriksson et al. |
| 2002/0068557 A1* | 6/2002 | Heo .................. 455/422 |
| 2002/0144107 A1 | 10/2002 | Sweeny et al. |
| 2002/0167943 A1* | 11/2002 | Hakim et al. .......... 370/356 |
| 2003/0009393 A1 | 1/2003 | Norris |
| 2003/0131104 A1 | 7/2003 | Karamanolis et al. |
| 2004/0123129 A1 | 6/2004 | Ginter et al. |

* cited by examiner

UTA CARD & RECORD SAMPLES:
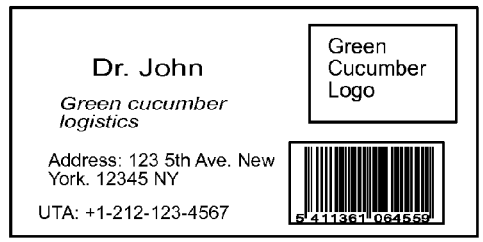
UTA CARDS:
*UTA™ CARD SERVICES*
UTA STICKERS:
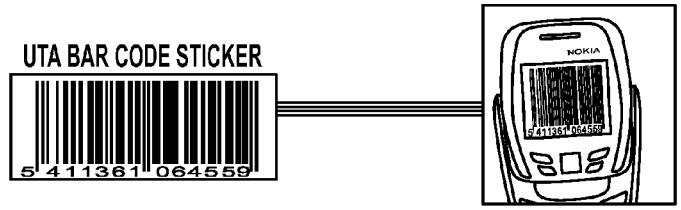
UTA DISPLAY IMAGES:
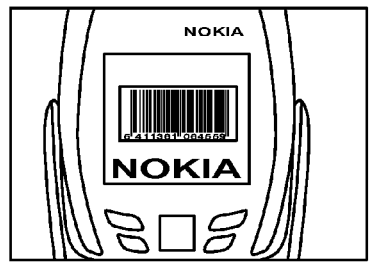
FIG. 17

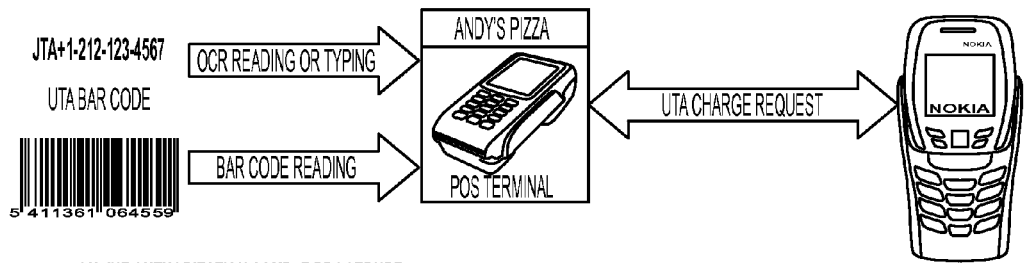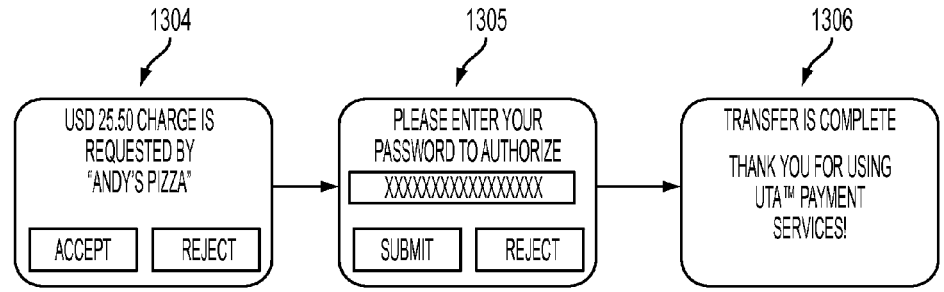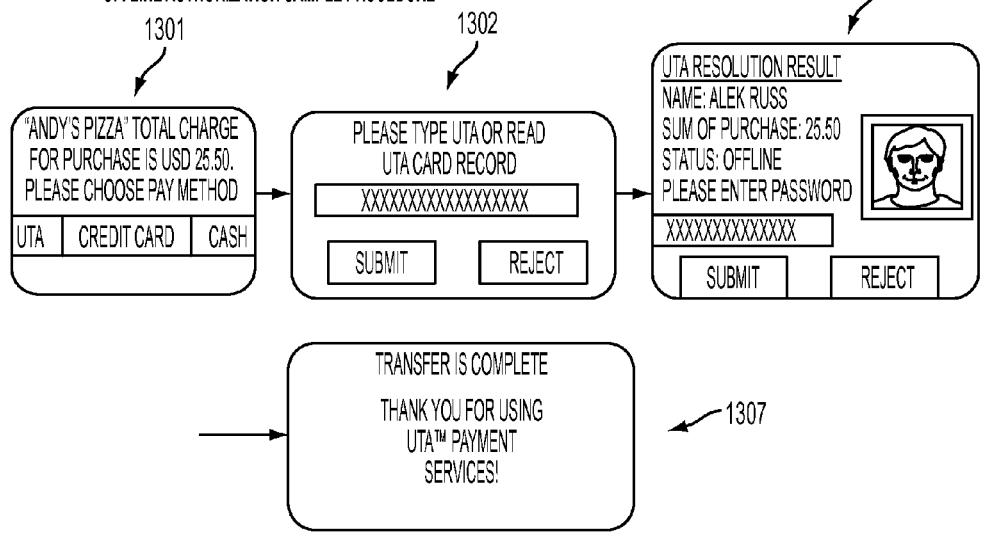
FIG. 18

FIGURE 21

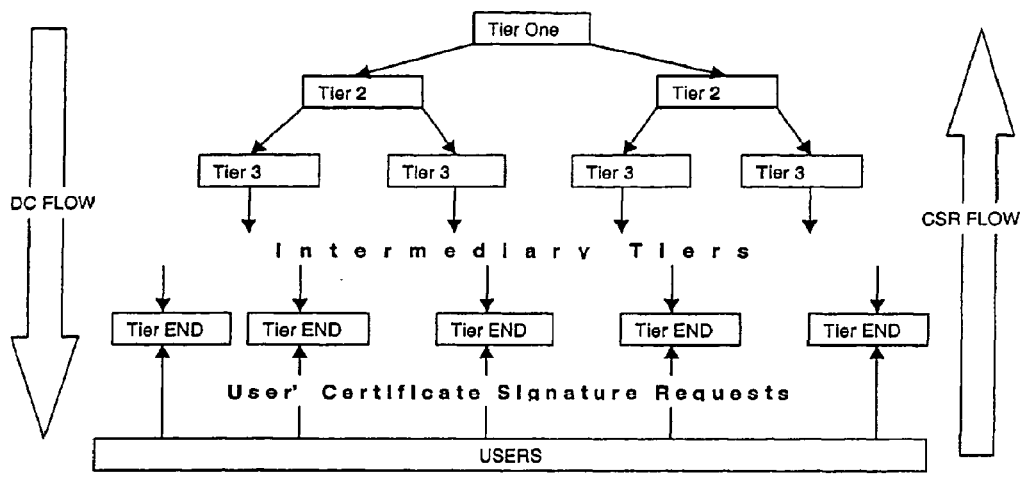

FIGURE 22

DC TITLE: NA or AR or EAR or (AR + EAR) or (NA + AR) or (NA + EAR) or (NA + AR + EAR)
Segment Financial:
    Field 1: NA or AR or EAR or (AR + EAR) or (NA + AR) or (NA+EAR) or (NA + AR + EAR)
    Field 2: NA or AR or EAR or (AR + EAR) or (NA + AR) or (NA+EAR) or (NA + AR + EAR)
    ............
    Field END: NA or AR or EAR or (AR + EAR) or (NA + AR) or (NA+EAR) or (NA + AR + EAR)
Segment Personal:
    Field 1: NA or AR or EAR or (AR + EAR) or (NA + AR) or (NA+EAR) or (NA + AR + EAR)
    Field 2: NA or AR or EAR or (AR + EAR) or (NA + AR) or (NA+EAR) or (NA + AR + EAR)
    ............
    Field N: NA or AR or EAR or (AR + EAR) or (NA + AR) or (NA+EAR) or (NA + AR + EAR)
Segment ............

METHOD FOR PERFORMING TRANSACTIONAL COMMUNICATION USING A UNIVERSAL TRANSACTION ACCOUNT IDENTIFIER ASSIGNED TO A CUSTOMER

CROSS-REFERENCE TO RELATED APPLICATIONS

This application is a continuation of U.S. application Ser. No. 10/927,460, filed on Aug. 27, 2004, which is a continuation of International Applications PCT/IB03/00634 with an international filing date of Jan. 24, 2003 (which is a continuation of U.S. application Ser. No. 10/085,717 filed on Feb. 27, 2002 (which claims priority from Russian Patent Application No. 2001-128645 filed on Oct. 24, 2001 in the Russian Patent Office), U.S. application Ser. No. 10/233,426 filed on Sep. 4, 2002 (which claims priority from Russian Patent Application No. 2001-128645 filed on Oct. 24, 2001 in the Russian Patent Office and is a continuation in part of U.S. application Ser. No. 10/085,717 filed on Feb. 27, 2002), and International Application PCT/RU02/00462 with an international filing date of Oct. 23, 2002 (which claims priority from Russian Patent Application No. 2001-128645 filed on Oct. 24, 2001 in the Russian Patent Office and is a continuation of U.S. application Ser. No. 10/085,717 filed on Feb. 27, 2002 and U.S. application Ser. No. 10/233,426 filed on Sep. 4, 2002)), PCT/IB03/02045 with an international filing date of Apr. 16, 2003 (which is a continuation of U.S. application Ser. No. 10/233,426 filed on Sep. 4, 2002. International Application PCT/RU02/00462 with an international filing date of Oct. 23, 2002, and international Application PCT/IB03/00634 with an international filing date of Jan. 24, 2003), and PCT/IB03/05326 with an international filing date of Oct. 23, 2003 (which is a continuation of International Application PCT/RU02/00462 with an international filing date of Oct. 23, 2002, International Application PCT/IB03/00634 with an international filing date of Jan. 24, 2003, and International Application PCT/IB03/02045 with an international filing date of Apr. 16, 2003), the disclosures of which are incorporated in their entirety into this application by reference.

FIELD

The present invention generally relates to data processing on-line communication. More particularly, the present invention relates to a system, and method for facilitating information exchange and communications with various communications devices using a telephone number.

DESCRIPTION OF THE RELATED ART

U.S. Pat. No. 6,151,624 (hereinafter, "the '624 patent") of Teare et al., which is hereby incorporated herein by reference in its entirety, and which is considered by applicant to be the closest known art to the presently claimed invention, describes a system and method that facilitates the search and retrieval of network resources, such as a Web page, by utilizing a natural language name. In the case of a Web page, the system and method of the '624 patent associates a natural language name with a Uniform Resource Locator ("URL") in a metadata file which also contains additional descriptive information about the Web page. Upon entry and submission of a natural language name in a Web browser's data entry field, the system and method consults an indexed database containing metadata information in order to find the corresponding URL associated with the given natural language name. The system and method of the '624 patent thereafter send the corresponding Web page, identified by the associated URL, to the user. In this manner, the user is freed from the constraint of being required to know the complete URL of a desired Web page before being able to access the Web page.

There are, however, several drawbacks and limitations associated with the system and method described in the '624 patent. As the '624 patent itself acknowledges, a natural language name is not unique and any particular natural language name provided by a user may result in more than one Web page from which the user must select. Accordingly, the '624 patent provides additional data and network processing for resolving such conflicts.

Moreover, a natural language name may be protected by trademark or domain name registration and, accordingly, may be off-limits to a Web site administrator desirous of associating his Web site with a particularly appropriate, but legally protected, natural language name.

Moreover, the '624 patent does not address communications with other communication facilitating resources and methods, e.g., email, voice mail and PDA devices.

What is desired, therefore, and has heretofore not been available, is a system and method which allows a user to utilize unique descriptive information to identify, retrieve and interact with Web sites or other network-based resources using information that is unique and known.

Public key cryptography is an approach to enabling secure communications using key pairs. Each key pair includes a public key and a private key. The public key and private key are related so that a message encrypted by one key may be decrypted only by the other, but it is computationally infeasible to deduce the private key given the public key. The private key is typically created and securely held by an entity; while the corresponding public key is typically made widely available. Secure communications between parties may then be enabled by using the parties' public and private keys.

The use of public key cryptography addresses many of the inherent security problems in an open network such as the Internet. However, two significant problems remain. First, parties must be able to access the public keys of other entities in an efficient manner. Second, since in many protocols entities are associated with and in some sense identified by their public keys, there must be a secure method for parties to verify that a certain public key is bound to a certain entity.

A public key management infrastructure (PKI) addresses these two problems. In one common approach, the public key management infrastructure is based on digital certificates, which are used to associate a certain public key to a certain entity with some degree of integrity. The public key management infrastructure typically would include a database of digital certificates, and various operations are provided in order to access and maintain this database. For example, requests for new digital certificates are processed, digital certificates are revoked, and the status of existing digital certificates is designated and checked.

The closest art known is as follows:

U.S. Pat. No. 6,151,624, RealNames, does not provide interoperability between communication networks and the Internet; on-line status check; secure connectivity; support of 3 G communication standards→MMS/I-mode/FOMA and unified communication and messaging.

U.S. Pat. No. 6,324,645, VeriSign discloses use of digital certificates, but does not detail the use of certificates for web-enabled devices; secure purchase and transaction services based on the check of Uniform Telephone Address (UTA) and dynamic Uniform Resource Locators (URL)s;

U.S. Pat. No. 5,793,762 titled "System and method for providing packet data and voice services to mobile subscribers", and U.S. Pat. No. 5,457,736 titled "System and method for providing microcellular personal communications services (PCS) utilizing embedded switches": Major difference between these patents and present invention is that besides wireline-to-mobile; mobile-to-wireline; mobile-to-mobile calls the present invention is applicable to browser-to-wireline; browser-to-mobile; mobile-to-browser and wireline-to-browser connectivity therefore providing cross operability not only between Mobile users via Internet but also between all Mobile, Wireline and the Internet users, meaning that Internet user can be a calling party without being a mobile subscriber.

U.S. Pat. No. 5,732,359 titled "Mobile terminal apparatus and method having network inter-operability" addresses interoperability between mobile and satellite communication networks, but does not address interoperability between any telephone communication networks and the Internet.

U.S. Pat. No. 6,353,621 titled "Method to allow seamless service to mobile subscribers across various mobile switching centers supporting multiple intersystem standards", describes call termination and interoperability method for mobile services generally at the level of multiple switching centers using any protocols (meaning that Internet TCP/IP is included). However, this patent does not provide the same for hardware-to-software and vice versa communication.

U.S. Pat. No. 5,521,962 titled "Temporary storage of authentication information throughout a personal communication system", describes a method for managing authentication information for mobile users reducing number of authentication information copies distributed within current wireless infrastructure.

The known art does not contemplate a central Internet Switch repository with number files database providing interoperability between Mobile communication network, wireline and the Internet.

SUMMARY

The drawbacks and functional limitations of the prior art systems and methods described above are overcome by the various embodiments of the present invention which provides inter alia methods, systems, computer data signals, recordable media and methods of doing business including, among other feature, forming a primary number file (PNF) comprising a uniform telephone address (UTA) which has a telephone number associated with a network resource.

One particularly advantageous aspect of the invention provides a method which includes forming a secondary number file and a default number file, the secondary and default number files being mirror images of the primary number file, and storing the default number file at a switch server which provides connectivity services for the network resources and is itself a network resource, and storing the secondary number file at an internet service provider.

Another particularly advantageous embodiment of the invention provides a method which includes issuing a temporary Digital Certificates containing UTA for use in at least one Temporary Target (TT), the TT serving as a temporary Target or Mover in the network, wherein a CA Switch issues UTA and UTA DC; transfers the UTA and DC directly to Temporary Target Number File or to a reseller; and the reseller assigns the UTA/DC to a particular temporary Target Primary Number File.

Yet another particularly advantageous embodiment of the invention provides a method which includes performing session encryption, wherein Targets use shorter key pairs in order to accelerate encryption of on-line audio and video streams; and each Target issuing new pair of shorter public and private keys, storing the private key in an internal memory of the Target, the private key being used only for one session, encrypting a new shorter public key with a sending target original private key, or with a receiving target original public key, and transmitting the encrypted message to the receiving target; and receiving target decrypting the received message containing the new shorter Public Key of the sending target and uses the received sending target public key to encrypt/decrypt the session exchange with sending target.

The foregoing is a general summary of only some of the aspects of the some of the more advantageous embodiments of the invention. Detailed description of the various embodiments of the invention is set forth below, while the scope of the invention is defined by the claims.

The foregoing needs, and other needs and objects, are fulfilled by the present invention, which comprises, in one aspect, a method of locating and communicating with networked resources using a telephone number, and a location identifier, comprising the steps of storing a first telephone number of the resource in association with the location identifier of the resource; receiving a request to locate the resource containing the first telephone number; retrieving the location identifier associated with the first telephone number; and communicating with the resource using the location identifier.

One feature of this aspect involves storing at least a second telephone number for the resource, in association with the location identifier; receiving requests to locate the resource based on the first or second telephone number; retrieving the location identifier associated with the first or second telephone number; and communicating with the resource using the location identifier. Another feature involves the steps of storing the first and second telephone numbers in association with the location identifier, and in a number file in a storage device associated with the resource.

Yet another feature involves the steps of retrieving a number file including a telephone number and an associated resource; parsing the number file; building an index entry based on the values parsed from the number file; and storing the index entry in an index that is stored apart from the storage device. Still another feature is the steps of sending the number file over the network to a client associated with the resource; and storing the number file in a server storage device of a server associated with the client. Another feature involves periodically polling the number file on the server associated with the client; testing whether one of the telephone numbers stored in the number file matches a third telephone number stored in a database indexed by the index; and updating the database when changes are detected in the number file. Yet another feature is the step of synchronizing the index to the database.

According to another feature, the method includes the steps of receiving a client identifier of a client associated with the resource; generating a set of metadata that describes the resource, the location identifier, and the client identifier; and storing the set of metadata in a persistent storage device associated with the client. Another feature is assigning a randomly generated name to the set of metadata. Yet another feature is instructing the client to store the metadata in a particular authorized location in the persistent storage device. Another feature is registering the set of metadata and the randomly generated name in a database.

The foregoing is merely a brief summary of various aspects of the invention. The invention encompasses many other aspects, as set forth in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 17 is a diagram of UTA card and record samples for UTA card services.

FIG. 18 is a diagram of a sample POS purchase procedure showing UTA charge service at POS location.

FIG. 21 is a flow diagram of a distribution model of trusted services through a supply chain.

FIG. 22 is an exemplary DC structure in accordance an embodiment of the invention.

DESCRIPTION OF THE PREFERRED EMBODIMENTS

Figure 1A:
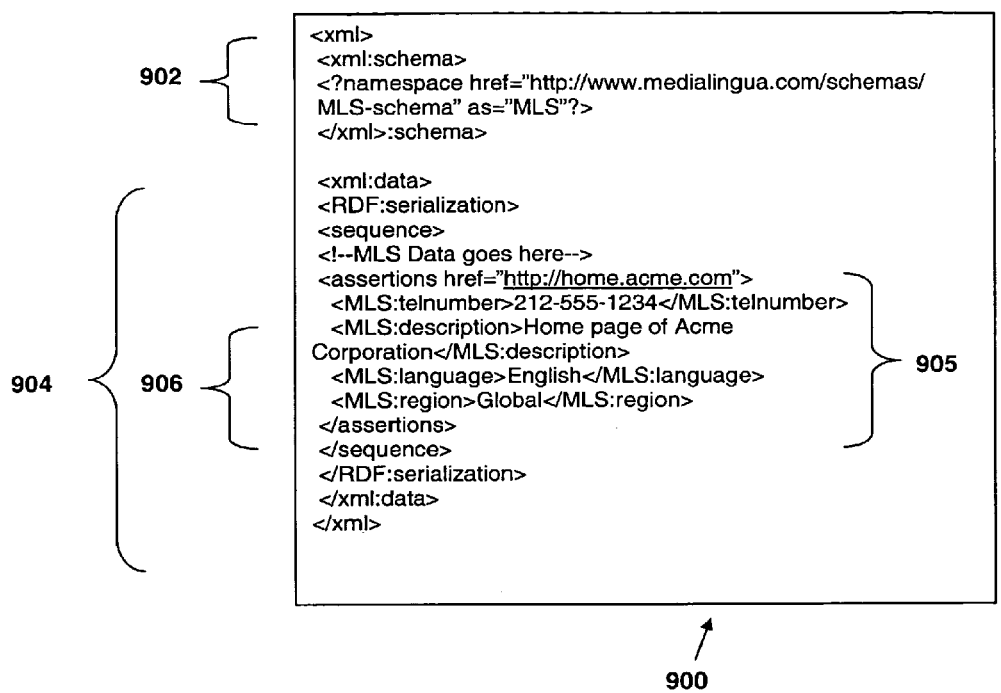
FIG. 1A is a diagram of a number file.

A mechanism for associating network resources with a telephone number and locating and communicating with network resources using the associated telephone number is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form or otherwise explained in a manner that avoids unnecessarily obscuring the present invention.

Number File Format

In one embodiment of the present invention, metadata is associated with network resources such as a Web page, networked computers, Web-enabled appliances or wireless or other communications devices. Generally, metadata is data that describes other data. The metadata defined herein provides information that describes a Web page or other networked communication resource in a manner analogous to the manner by which a catalog card describes a book in a library. For example, the metadata includes information that provides a telephone number associated with the Web page or other networked resource, a description of the resource, a language designation of the resource, a geographical location associated with the networked resource and other information pertinent to the resource. Continuing with the example of a Web page, the metadata is defined by an administrator of the server that stores the Web pages that are described in the metadata, and a copy of the metadata is stored in association with that server so that the metadata is accessible using the Web. Using a Librarian, the copy of the metadata is registered with a database that is coupled to an index. In this manner, a Web site may be identified by typing a known telephone number (stored with associated information in a metadata) into a Web browser. Thereafter, the information in the metadata is used to resolve the telephone number into the Web site associated with the telephone number in the metadata.

As stated, the metadata may associate other communications resources, in addition to Web pages, with a telephone number. For example, the metadata may associate a telephone number with a user's instant messaging facility, wireless telephone number (when the telephone number upon which the metadata is based is a landline phone) or even a user's internet video conferencing facility. In this manner, a telephone number and associated metadata can be utilized to locate a myriad of communication facilities associated with a telephone number in addition to a Web page.

While the following description of various embodiments of the present invention deals primarily with the resolution of Web page resources using telephone numbers, it is understood that one skilled in the art would be able to easily modify the teachings herein to accomplish resolution of other communication resources using a telephone number as described below.

Preferably, the metadata is prepared and initially stored in the form of a Number File 64 which is a text file defined by the Extensible Markup Language (XML) grammar. XML is a language definition promoted by Microsoft® Corporation and Netscape® Communications Corporation. Further information about XML is provided in "XML: Principles, Tools, and Techniques," The World Wide Web Journal, vol. 2, no. 4 (Fall 1997) (Sebastopol, Calif.: O'Reilly & Assoc., Inc.).

Preferably, the text in the Number File 64 is compatible with the Resource Definition Format ("RDF") format and CC/PP (Composite Capabilities/Preference Profiles) RDF-based framework for the management of device profile information, as well as with other XML initiatives related to Web-enabled and wireless appliances' metadata description. RDF is a syntax of XML designed by the World Wide Web Consortium for expressing semantics. The text file for the metadata described herein is also called an MLS file. An example of an MLS file is set forth in FIG. 1A.

The MLS file 900 is defined according to a grammar in which information elements are surrounded by complementary tags. For example, "<resource>" and "</resource>" are complementary tags. The MLS file 900 has two general parts, namely a schema section 902, and a data section 904. The schema section 902 and the data section 904 are enclosed within complementary tags ("<xml>, </xml>") that indicate that the MLS file 900 is in the XML grammar.

The schema section 902 is delineated by the <schema> and </schema> tags. The schema section identifies the schema that is used to organize data in the data section. In the example of FIG. 1A, an "href" anchor code in the schema section refers to a file, "MLS-schema", located on a Web server, that contains the schema definition. The schema is assigned the name "MLS." Tags in the MLS file 900 that are part of the MLSschema have a prefix of "MLS". Based on this prefix, the XML parser that reads the MLSfile 900 can identify tags that are part of the MLS schema.

The data section 904 is delineated by the <xml:data> and </xml:data> tags. The data section contains one or more MLS entries 905. Each MLS entry 905 is delineated by the tags <assertions> and </assertions>. Conceptually, each MLS entry 905 is a set of assertions about a network resource that is identified within the <assertions> tag. In the example of FIG. 1A, one MLS entry 905 makes assertions about the network resource home.acme.com, which for exemplary purposes is the home page of a fictional company, Acme Corporation. Of course, in accordance with the present invention, the <assertions> tag may make assertions about resources other than Web pages. For example, the <assertions> tag may define a user's instant messaging "buddy" name.

In a further embodiment of the present invention, more than one type of resource may be associated with a telephone number and the various resources made available based on the availability of a particular resource. For example, a landline telephone number of a user may be associated with that user's instant messaging "buddy" name, SMS identifier, and online video conferencing facility, e.g., Microsoft NetMeeting. The number file defining these various resources lists the resources in a hierarchical order, e.g., instant messaging, then video conferencing, then SMS messaging and is preferably constantly updated as to the on-line availability of each of the resources in accordance with known methods. Thus, when an attempt is made to contact the user by using the landline telephone number, the resource to be utilized to facilitate contact is determined based on the defined hierarchy and the on-line availability of the particular resource sat that instances. Continuing with the above example, communication will be made via instant messaging unless the user is not "on-line" with his instant messenger at which point communications will be attempted via video conferencing. If the user is not on-line via video conferencing, communications will be made via SMS. Other communications facilities may also be offered, e.g., a voice or video message may be stored for delivery to the user.

The metadata file of the present invention provides a uniform addressing scheme based upon a telephone number. The metadata file in combination with the uniform addressing scheme allows communications between and among different types of devices operating on disparate networks. As another example, the metadata file of the present example can be used to facilitate addressing between an internet-based video conferencing system and a mobile telephone with videoconferencing capabilities, e.g., a 3G-based mobile phone with video capabilities. In this context, a connection may be initiated by the internet-based videoconferencing user by typing the telephone number into the address bar which is resolved by the metadata file into the videophone resource.

The RDF language provides a general mechanism for describing many types of resources. RDF does not inherently provide facilities for describing Web pages. Accordingly, a Number File 64 is expressed in an RDF vocabulary that is specific to Web pages that expresses the main attributes of a Web page. The attributes include a telephone number associated with the Web page, and preferably also includes a location identifier or URL, a description, a language attribute, a region attribute, and a listings attribute. Of course, one skilled in the art will appreciate that other attributes may be utilized for non-Web page resources as appropriate.

Figure 16:
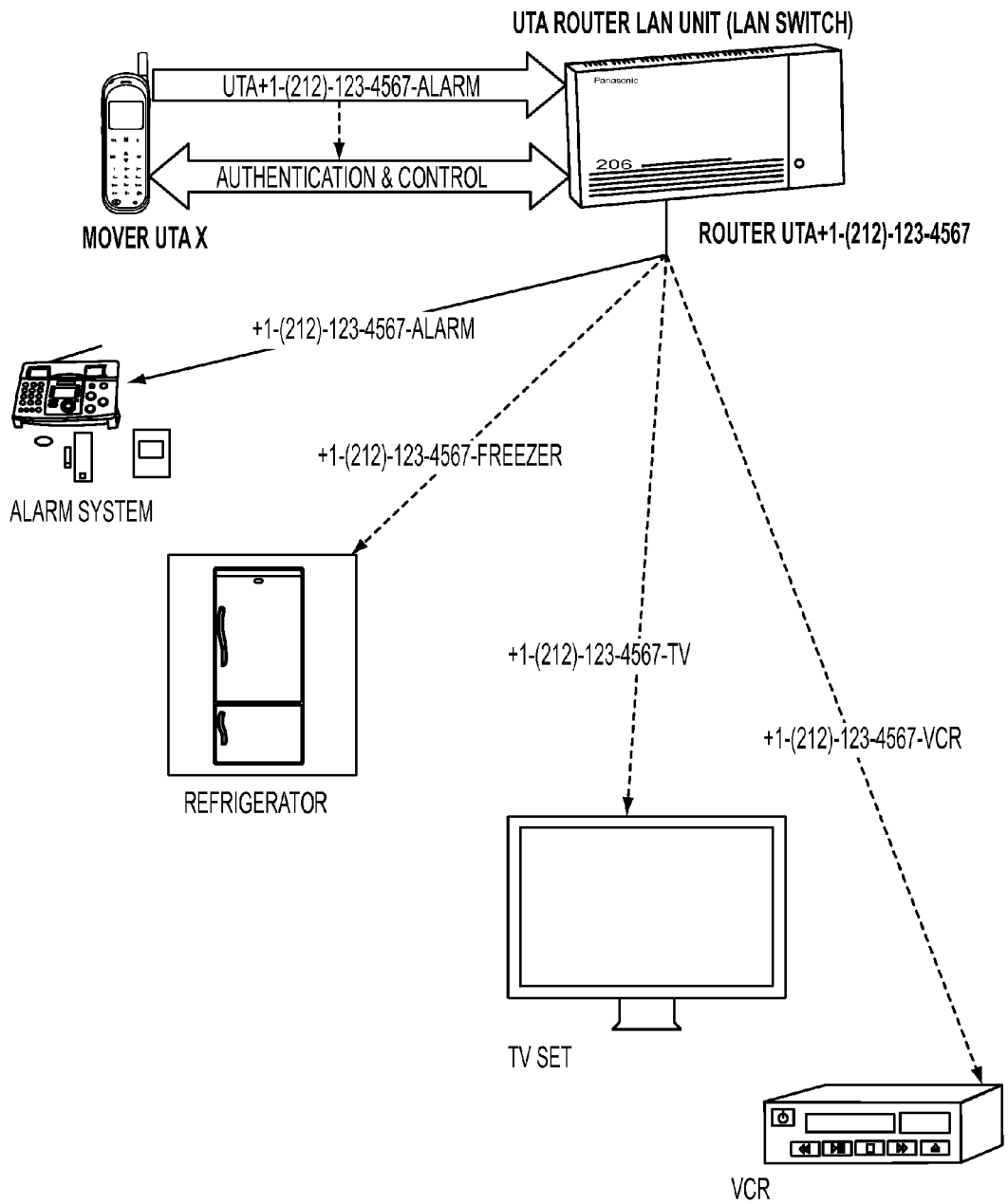
FIG. 16 is a diagram of Extended UTA usage for remote device control.

Each MLS entry 905 has a set of metadata 906. In the example of FIG. 1A, the metadata 906 contains a value that identifies the telephone number associated with the resource. The real telephone number value, "212-555-1234" is between the <telnumber> and <telnumber> tags. The metadata 906 also includes a description value, a language identifier value, and a region identifier value. A pair of tags delineates each value. For example, in FIG. 1A, the description value is "Home Page of Acme Corporation," the language value is "English," and the region value is "Global." The description value provides a description of the network resource that is associated with the real telephone number which, in the present example, may be the main corporate telephone number for Acme Corporation. In accordance with the present invention, the telephone number may include an area code or a country code, and may include numeric, alphanumeric or mixed prefixes or extensions, e.g., 1-800-USA-RAIL, or any other type of symbol commonly used with telephone numbers. FIG. 16 provides example of Extended UTA usage for "smart home" control wherein each device in the household has a particular local UTA extension assigned for it, such as +1-212-123-4567-ALARM for ALARM system.

When multiple resources are defined in one MLS file, it is preferred that for security reasons, each network address declared for a resource must be related to the shortest network address that is declared in the MLS file for any resource. In the preferred embodiment, each network address must be logically subordinate to or descended from the network address in the MLS file that is shortest in characters. For example, in the excerpt provided in FIG. 1A relating to Web pages, all subsequent resource declarations would be required to identify network addresses that specify files located within the directory tree for which www.medialingua.com is the root node. This relationship is checked by the Registration Service 22 when the MLS file is initially created.

Of course, as described above, a non-Web page resource, e.g., an email address or a "buddy" identifier from an instant messaging buddy list, may be the resource defined in the MLS file.

Another key advantage of this mechanism is that it can be used to provide access to network resources using multiple telephone numbers. One or more Number Files 64 are established. The Number Files 64 store a plurality of entries. Each of the entries stores a telephone number associated with a certain one or more network resources in association with the <telnumber> field. However, each of the entries references the same network resource in association with the <resource> tag.

For example, one or more Number Files 64 have entries that respectively store a telephone number for Acme Corporation such as the main number for the legal, marketing, engineering and sales departments. Each entry identifies the same network resource. Accordingly, the entries establish a plurality of telephone numbers, all of which point to, or resolve to, the same network address. When a third party wishes to access the referenced network resource, the third party uses whatever telephone number of the network resource that is known to the third party. The Resolver 40 will resolve the telephone number, regardless of which telephone number is entered, to the same network address. Accordingly, a user can locate and access network resources using any one of a plurality of known telephone numbers.

In an alternative embodiment, the attributes also include a listings attribute set off by the tag <MLS:listings>. A listings attribute is one or more keywords or other values that describe other properties of a resource. For example, each resource has a subject property that identifies the general nature of the product, service, or organization that is associated with the resource. This enables the database to be organized like a "yellow pages" directory. As an example, Acme Corporation includes in its NumberFile 64 the line <MLS:listings>Anvils, Rockets, Slingshots to indicate that it is a manufacturer of anvils, rockets, and slingshots.

In an alternative embodiment, the resources described in the Number File 64 are persons rather than Web pages. A resource of type "person" has metadata including a mailing address, email address, and other personal information. In this embodiment, the system can be used as a person locator service rather than for navigating to Web pages or other network resources.

As an example, a resource of a person locator service may include links to Web pages whereby a user may send email to the resource owner. Additionally or in the alternate, the resource may provide links that include options to send an SMS message, page or other messaging communication to the resource owner. Moreover, ftp or other links to data associated with the resource owner may be provided at the Web pages. In this manner, the telephone number in the <telnumber>field of Number File 64 acts as a "Personal Internet Address" (PIA), i.e., a unifying personal identifier that can be utilized by others to contact, send and/or gain information about the resource in a variety of ways, e.g., direct dial, e-mail, ftp downloading or uploading, messaging, chatting, sending or scheduling a task or meeting request, leaving voice mail or a video message or checking the on-line status of the PIA owner. The usefulness of the telephone number associated with the person locator service is augmented where the telephone number is both a landline and a mobile telephone number, e.g., as in "one call" services offered by various TELCO and wireless providers that automatically ring a predefined mobile telephone when there is no answer at the landline telephone.

In instances where the resource provides means for sending messages, the sender's identification may be captured from the user's computer and operating system settings. For example, when sending an email, the present system may capture the sender's identity by referencing the Window operating system's ID setting as defined in the Start/Settings/Control Panel/Users/Properties setting. In this manner, the resource to which the message is sent will have an identification of the sender whereby the resource may respond to the message.

In accordance with various embodiments of the present invention, the resources described in the Number File 64 are wireless devices, Web enabled appliances or other communication facilities other than Web pages or persons. For example, a resource of type "device" has metadata defining the device, e.g., screen size, available memory, type of communication available, mailing address associated with the device, email address, a request for resource renewal, e.g., to attend to paper refill when a networked printer (the resource) is detected to have run out of paper, and other information. In this embodiment, the system can be used as a device locator, resource availability and status service rather than for navigating to Web pages or other network resources.

In other alternative embodiments, the Number File 64 may store other or additional attributes. For example, other attributes include Organization, Subject, Abstract, Type, Audience. The Organization attribute the Organization attribute the Number File 64 information that may identify an organization or company that owns or is associated with the network resource, for example, "Federated Stores Incorporated." In the Subject attribute, the Number File 64 stores information that describes the subject matter of the network resource, for example, "dogs." In the Abstract attribute, the Number File 64 stores information containing an abstract of the network resource. In the Type attribute the Number File 64 stores information describing a type of the network resource, for example, "RealAudio file". In the Audience attribute, the Number File 64 stores information describing the intended audience of the network resource, for example, "Women age 19-34".

Defining metadata for a network resource, associating the metadata with a network resource, and storing a copy of the metadata on a server that contains the network resource in this manner offers significant advantages. For example, maintenance of the metadata is convenient. Since a copy of the metadata is stored locally on the server that contains the network resource, the metadata can be updated at any time without contacting a central service. As described further herein, a metadata crawler mechanism periodically visits the server to monitor changes in the metadata. If a Number File 64 has changed, after validation, the changes are automatically propagated to the database and the index.

In addition, in combination, the Number Files 64 operate as a distributed database of metadata. Maintaining a distributed database enhances scalability, because modifying the metadata is not dependent upon the availability of a single centralized database. Further, by storing the metadata files in association with the server of a device on which the network resources are located, data integrity is improved. Only a user having authorization to store files on a server can create metadata mappings that reference network resources on that server.

Of course, one skilled in the art will appreciate that the metadata may, alternately or in addition, be stored at a central database. The central database may be periodically updated by the various respective network servers that contain the resource or information about the resources, or may be manually updated by a central administrator.

Yet another advantage is multi-lingual compatibility. The XML language supports the UNICODE character encoding standard. As a result, attributes stored in a Number File 64 can be expressed in any human language.

Telephone Number System

Figure 1B:
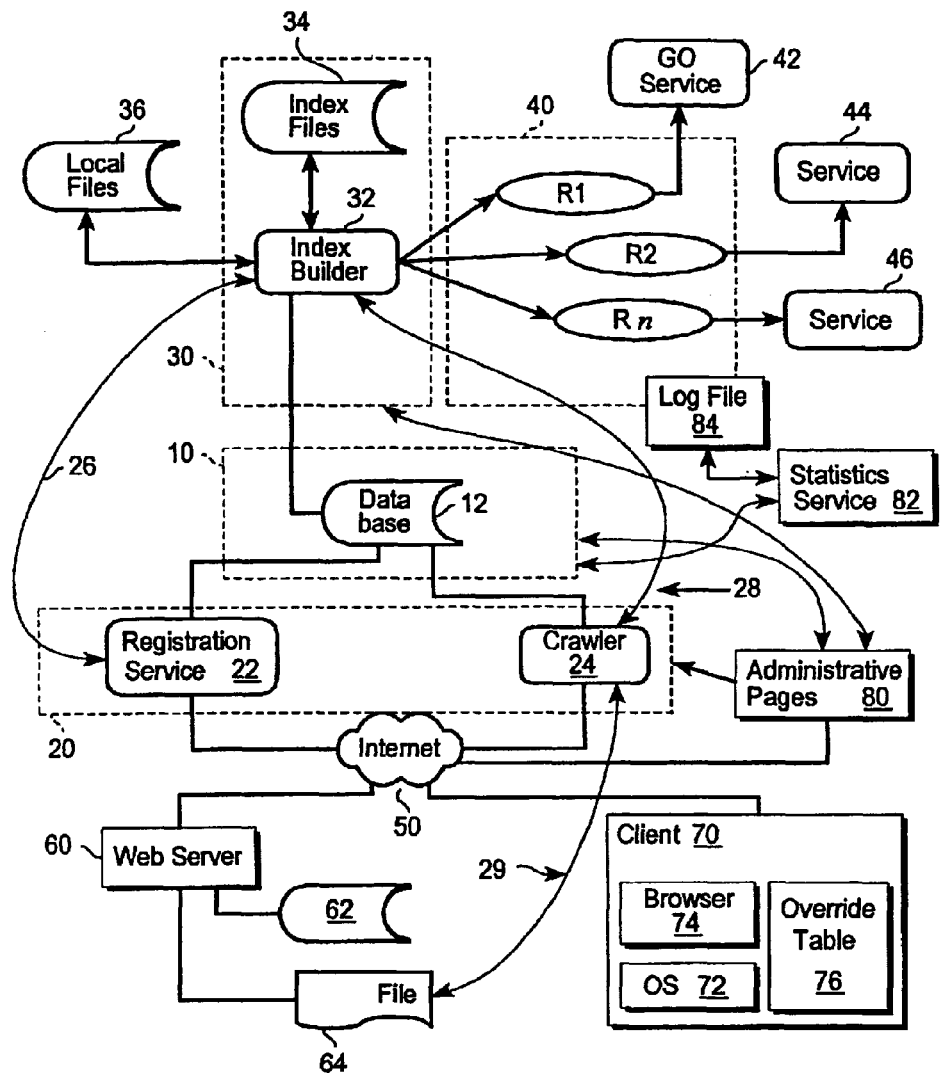
FIG. 1B is a block diagram of one embodiment of a system for navigating network resources based on metadata.

Using the metadata stored in Number Files 64, in combination with a network resource locating system, attributes of a network resource can be used to locate and communicate with the network resource. For example, as described above, the telephone number attribute of a Number File 64 can be used to locate a Web page. FIG. 1B is a block diagram of an embodiment of a network resource locating system comprising a Registry 10, a Librarian 20, an Index 30, and a Resolver 40. One skilled in the art will appreciate that variations in the presently described network resource locating system may be realized for resources other that Web pages.

It is understood that as used above and hereinafter, the term "network address" refers generally to an unambiguous identifier of the location of a network resource, one example of a network address being a URL.

The Registry 10 includes a database 12 in the form of a commercial database system, such as the SQL Server, or a proprietary database. The Registry 10 provides a centralized storage point for mappings of telephone numbers to network addresses or URLs, as well as descriptive information associated with the telephone numbers. By definition, each telephone number is unique across the Internet or any other communications network and, therefore, is unique within the Registry 10. The Registry 10 operates as a centralized, highly robust, and scalable persistent storage area for all metadata. The Registry 10 also stores statistics related to the usage of the metadata in the context of various services that are built on top of the Registry, such as the GO navigation system described herein.

Telephone numbers, network addresses, and the descriptive information are loaded into the Registry 10 by the Librarian 20. In the preferred embodiment, the Librarian 20 and the Index 30 communicate with the database 12 using an ODBC interface. In the preferred embodiment, the database 12 has a capacity on the order of several hundred million entries. The Registry 10 and database 12 help ensure a consistent structure and vocabulary across Web sites or other utilized resources.

The Librarian 20 has a Registration Service 22 and a Crawler 24, each of which is coupled to the database 12 and to a network such as the Internet 50 or other communication networks. The Registration Service 22 receives new mappings of telephone numbers to network addresses, and descriptive information, and loads them into or "registers" them with the Registry 10. The Registration Service 22 receives the mappings from a client 70 over the Internet 50. The Crawler 24 traverses or crawls the Internet 50, periodically connecting to registered Web servers that are connected to the Internet, to locate changes to the mappings stored in or in association with the Web servers.

The telephone number system interacts with one or more Web servers or other resources that are connected to the Internet 50. As an example, one Web server 60 is shown in FIG. 1B, but any number of Web servers can be used in connection with this embodiment. A local database 62 is coupled to the Web Server 60 so that the Web Server can retrieve values from the local database for use in Web applications running on the Web Server.

A Number File 64 is also stored in association with the Web Server 60 such that the Web Server can retrieve the Number File and forward its contents to the Internet 50 in response to a request. In the preferred embodiment, the Number File 64 stores one or more telephone number entries. Each telephone number entry contains a telephone number of a resource in the Web Server 60, a description of the resource, a network address, or other identifier of the location of the resource, and other information about the resource such as its language and intended geographic region of use. Preferably, the Number File 64 also stores an identifier of a grammar that is used to format the other information in the Number File. In this way, the information in the Number File is self-describing and language-independent.

As indicated by path 29, the Crawler 24 can contact the Web Server 60 and retrieve values stored in the Number File 64 using a connection through the Internet 50. As indicated by path 28, the Crawler 24 can notify the Index 30 that the Index Files 34 need to be updated to reflect a change in the information stored in the Number File 64.

The Index 30 is coupled to the Registry 10. The Index 30 comprises an Index Builder 32 and one or more Index Files 34 that contain an index of all telephone numbers, telephone number entries, and resources known to the system. For example, the Index Files 34 has index entries for values stored in the Number File 64. The Index Files 34 are constructed, managed, and updated by the Index Builder 32.

Generally, in the preferred embodiment, the Index Files 34 are more compact than the indexes maintained by conventional search engines, because the amount of information represented in all the Number Files 64 is far less than the total content of all network resources available on the Web. Such compactness is a distinct advantage, providing greater scalability and responsiveness than conventional search engines. In addition, the compact size of the Index Files 34 allows the Index 30 to be replicated in multiple different geographic locations.

The Resolver 40 comprises one or more resolver processes R1, R2, Rn, each of which is coupled respectively to a Service 42, 44, 46. Each resolver process R1, R2, Rn communicates with its respective Service 42, 44, 46 to receive requests containing a telephone number, convert or resolve the telephone number into a network address associated with the telephone number, and forward the network address and other information associated with the telephone number to the requesting Service.

A client 70 is coupled to the Internet 50. The client is a computer, server, Web enabled appliance or wireless device or network in which a Web browser 74 runs under control of an operating system 72. An example of the Web browser 74 is Netscape Communicator®, and an example of the operating system 72 is Microsoft Windows 95®. The services of the telephone number system are accessible to the client 70 over the Internet 50 using the browser 74 according to standard telecommunication or Internet and Web protocols.

For example, under control of the browser 74 and the operating system 72, the client 70 can establish an HTTP connection through the Internet 50 to the Registration Service 22. The browser 74 retrieves pages or forms from the Registration Service 22 that are prepared in the HTML language. The browser 74 displays the pages or forms. A user of the client 70 reads the pages, or enters information in a form and sends the filled-in form back to the Registration Service 22. In this way, the client 70 and the Registration Service 22 carry out a dialog by which a user of the client 70 can perform functions offered by the system.

Preferably, the Registration Service 22, Crawler 24, Index Builder 32, and Resolver 40 are one or more computer programs having the functions and procedures described herein. In one embodiment, each of the Registration Service 22, Crawler 24, Index Builder 32, and Resolver 40 is an independent process, and one or more instance of each such process can be active and executing at a given time. In the preferred embodiment, the computer programs are constructed using an object-oriented programming language and related tools, such as the Java. language.

The Registration Service 22, Crawler 24, Index Builder 32, and Resolver 40 preferably execute on one or more server computers that can rapidly access, manage, and update the database 12 and index files 34. The foregoing elements can be distributed or segregated. For example, it is contemplated that the Resolver 40 and its processes R1, R2, Rn execute on one server computer, and the Registration Service 22, Crawler 24, and Index Builder 32 operate on the same computer or on a set of computers separate from the server that hosts the Resolver 40. In this configuration, the Resolver 40 can rapidly receive and respond to client requests for access to network resources that are indexed in the Index Files 34, without affecting or interfering with the other elements and their functions.

In one embodiment, the Librarian 20, and other functions of the system, are accessed by connecting the client 70 to one or more administrative Web pages 80 that implement the functions, using an HTTP connection. The administrative Web pages 80 are hosted on a Web server and are generated by a Web server application that can communicate with the other elements of the system. The Web server application sends a top-level page to the client 70. The browser 74 of the client displays the top-level page, which presents a menu of options for working with the system. For example, preferred menu options are set forth in Table 1.

TABLE 1

TOP LEVEL MENU OPTIONS

MLS FILE

Create
Activate
Modify
Delete
STATS & BILLING

Stats
Billing
CUSTOMER

New Customer
Modify Profile
Change Contacts
Logout

Each of the top level menu options can be selected by moving the cursor generated by the client 70 over the name of the desired option, using the client's pointing device, and clicking on the desired option. The functions carried out by selecting each menu option are described below in the context of the functional module that carries out the functions.

In the preceding discussion, the elements of the system have been described with respect to the Internet 50 as an interconnecting element. However, the Internet is merely one example of an interconnecting element that can be used to facilitate communication among the elements of the system. Other elements, such as local-area networks, wide-area networks, other wired and wireless networks, Intranets, and extranets can be used. Also, the protocols that define the Internet, such as Transmission Control Protocol and Internet Protocol, are not required; other protocols are suitable and can be used.

In this configuration, the system has numerous advantages over prior approaches. For example, customer Web sites 60 are isolated from the database 12. The Index Files 34 are separate from the database 12 and only the Index Files are accessed by the Resolver 40. This reduces database loading and increases responsiveness, and provides scalability. The architecture is well suited to distributed replication of the Index Files.

Customer Profile Functions

In one embodiment, the system provides a set of customer information management functions that store, track, and update information about customers of the system. The information managed for each customer is called a customer profile. The customer profiles are stored in the database 12.

When the Customer/New Customer option is selected, the system generates one or more Web pages containing forms that enable a user to enter a new customer profile. The form has fields for entry of a name, address, telephone number, contact person, and payment method. The Web pages and forms are communicated to the client 70 and displayed by the browser. The user of the client 70 enters appropriate information into the data entry fields and clicks on or selects a "SUBMIT" button on the Web page. In response, the client 70 returns the filled-in form in an HTTP transaction to the system. The system extracts the entered information from the fields and stores the information in a table of the database 12.

In the preferred embodiment, the Customer/New Customer registration process is initiated using a Web page generated by the system in the form shown in Table 2:

TABLE 2

REGISTRATION HOME PAGE

Welcome to the Telephone Number System registration site.
Before you can submit your Telephone Number, you need to provide us with some information about you and the organization that you may represent.
To initiate the registration process, you first need to enter your email address as your login name, and select a password.
You will need to remember this login name and password, as the Telephone Number System uses them to grant you access privileges.
Name
Password
   [BACK] [NEXT]

In Table 2, the designations [BACK] and [NEXT] represent function buttons. The user enters the user's email address in the Name field, and a user-selected password in the Password field. When the user clicks on the NEXT function button, the Name and Password are stored in the database 12 in association with one another.

Preferably, the system then displays a Web page containing a form that enables the system to receive further information about the user. The form may have fields for entering the user's name, address, city, state, postal code, nation, and telephone number, instant messaging or buddy list identification, e-mail address, mobile and fixed line service providers, equipment type and model number. The user enters the requested information and clicks on a NEXT button. Alternately, or in addition, certain of the information may be retrieved from information already available at the user's computer, e.g., preferred language settings or country and area code information stored in the user's Web browser or in the user's Windows® operating system. The system checks each value to verify that it matches the proper data format required for the corresponding field. The values are stored in the database 12 in association with the user's name and email address. Collectively, this information is the customer profile. Once the customer profile is established, the user can create telephone number entries and store them in one or more Number Files 64.

Selecting the Customer/Modify Profile option causes the system to generate a Web page containing a form that enables a user to change a previously entered customer profile. To ensure secure operation, the user's IP address is extracted from the HTTP transaction that the user used to request the Customer/Modify Profile option. The user is permitted to view and modify only that profile that corresponds to a previously created Number File that is stored on a server having the same IP address as the user. Based upon the user's IP address, the system looks up the corresponding profile in the database 12 and retrieves the contents of the profile. The contents of the profile are displayed in the Web page.

The user may then move the cursor generated by the client 70 to any of the data values displayed in the Web page and enter modifications to the values. When the user selects or clicks on the "SUBMIT" button, the Web page containing the filled-in values are returned to the system in an HTTP transaction. The system updates the database 12 using the values in the page.

Selecting the Customer/Change Contacts option enables the user to change the billing contact associated with a registered Number File. Selecting the Customer/Logout option enables the user to terminate the current session, or log in as a different customer. These functions are provided using a Web application that receives and loads appropriate values into the Registry.

Registration Service

Figure 2A:
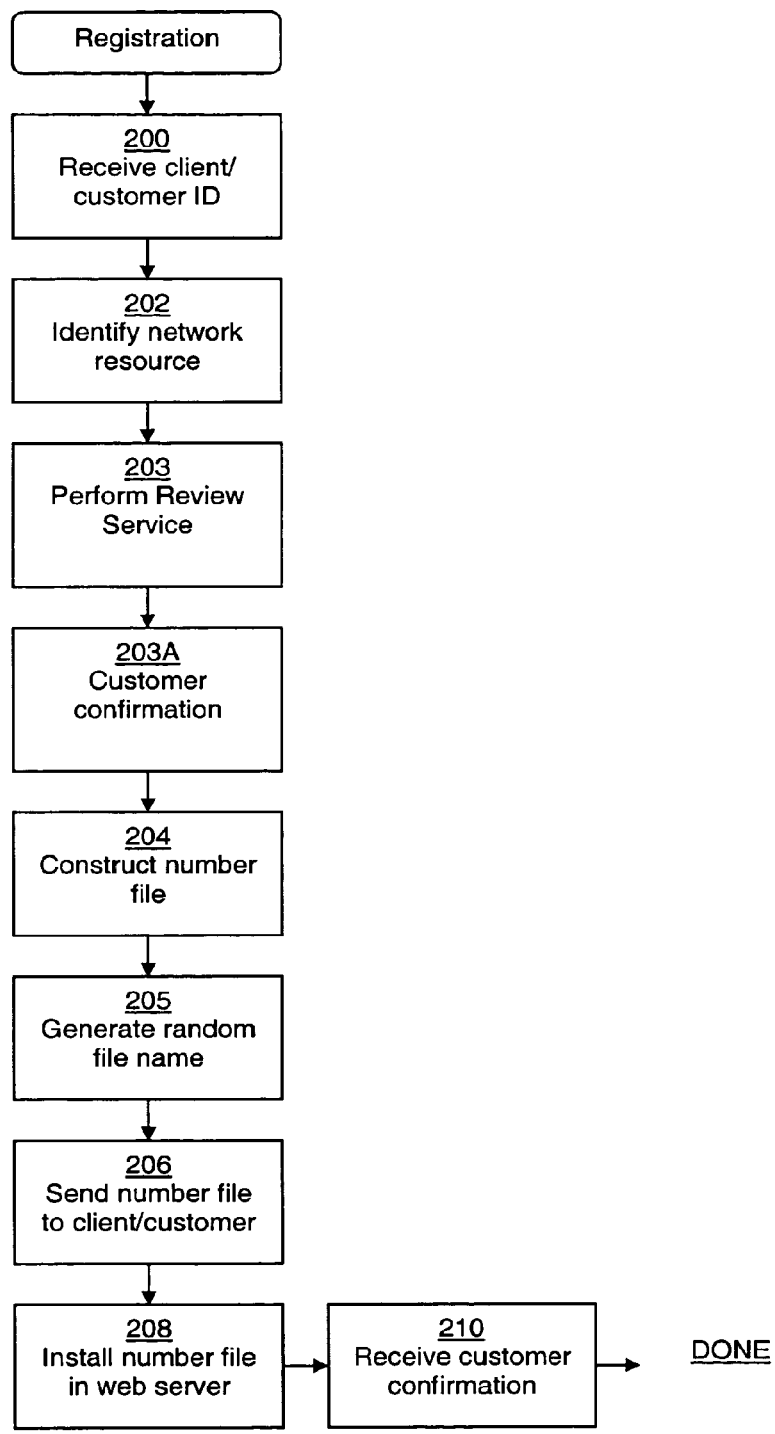
FIG. 2A is a flow diagram of a method of a registration service in the system of FIG. 1B.

FIG. 2A is a flow diagram of an embodiment of a preferred method of operating the Registration Service 22 of the Librarian 20.

Preferably, the Registration Service 22 has a Web page interface by which one or more clients 70 can access functions offered by the Registration Service by selecting function buttons of the Web pages to activate the functions.

The primary function offered by the Registration Service 22 is registration of new telephone numbers into the Registry 10. In one embodiment, the Registration Service 22 is invoked by selecting the Create option from the top-level menu page. As shown in block 200, an external user or "customer" of the system identifies himself or herself to the system so that information entered later can be associated with the customer. This information includes an electronic mail address of the customer whereby messages can be directed from the Registration Service 22 to the customer over the Internet 50. In this context, the terms "customer" and "user" refer to the operator of a computer remotely connected to the system, for example, the client 70.

As indicated in block 202, the customer then provides information to the Registration Service 22 that identifies a network resource of the Web Server 60, by its location, its telephone number, and descriptive information about the network resource. For example, the customer enters the telephone number "212 555 3000" (the main number for the company named XYZCorp), the URL http://www.xyzcorp.com, and a description about the resource. Preferably, this information is entered in fields of a Web page that is constructed for the purpose of receiving the information, in the form shown in Table 3:

TABLE 3

TELEPHONE NUMBER ENTRY PAGE

Telephone Number: 212-555-3000
URL: http://www.xyzcorp.com.
Type: company
Language: English TABLE 3-continued

TELEPHONE NUMBER ENTRY PAGE

Region: North America
Description: This is the home page for the widget manufacturers, XYZ Corp.
[BACK] [NEXT]

When the user has entered all the information, to continue processing of the Number File 64, the user clicks on the NEXT function button at the bottom of the page.

In response, at step 203, the system initiates a review service whereby a cost of providing the described resolution service is calculated. As an example, a flat fee may be charged based on the expected number of resolutions for a certain resource on a per month basis. The expected number of hits for any particular site may be based on a recorded history of past activity at the site. As an example, MSN provides a service that documents the number of hits at various Web sites on a per month basis. By referencing this database, the system may determine how many hits will be expected at the Web Site identified by the user and the system may charge the user accordingly, either in advance or on a forward-looking basis.

At step 203A, the user is informed of the charge for providing the resolution service and either refuses the charge and exits the program or accepts the charge and proceeds to step 204.

At block 204, the Registration Service 22 constructs a Number File 64 based on the information entered by the customer. At this point, the Number File 64 is stored on a server accessible to the Registration Service 22. However, the Number File 64 is not yet stored in association with the Web server 60.

In block 205, the Registration Service 22 generates a file name at random for the Number File 64. A random file name is used in order to prevent unauthorized programs, processes, or users from identifying or modifying the Number File 64 when it is stored in association with the Web Server 60. If the same file name was used, at any Web server registered with the Registry 10, an unauthorized user could modify an entry stored in the Number File 64 to reference a different network resource. Eventually, as will be discussed further below, the Crawler 24 would detect the modification and store the telephone number in the Registry 10. Accordingly, it is desirable to hide the name of the Number File 64 from all unauthorized users.

In block 206, the Number File 64 is sent as a file attachment to an electronic mail ("email") message to the customer. Block 206 includes the step of receiving an email address from the user. In the preferred embodiment, the system displays a Web page having a data entry field for the email address, in the form shown in Table 4:

TABLE 4

EMAIL ENTRY PAGE

Please enter your email address so that we can send you the telephone number file that you have just built.
joe@xyzcorp.com
[BACK] [NEXT]

After sending the Number File 64 in an email to the user, the system displays a confirmation page at the client 70. In the preferred embodiment, the confirmation page has the form shown in Table 5.

TABLE 5

CONFIRMATION PAGE

Your Telephone Number File has been mailed to the address joe@xyzcorp.com. You should now save this file on your Web site according to the instructions in the email that you will receive. Once this step is accomplished, the file will have to be activated through the Telephone Number file activation service. (Simply follow the previous link, or in Customer Service, look for the menu item Activate under the MLS File category.)
[FINISH]

In block 208, the customer installs the Number File 64 in the Web Server 60 or in a manner that is accessible to the Web Server. Preferably, the Number File 64 is stored in a location on the Web Server 60 that is specified by the Registration Service 22. For example, the email specifies that the Number File 64 shall be stored in the root directory of the network resource that is named in the Number File 64. This is done to ensure that the receiving customer individual is authentic; the Registration Service 22 presumes that only an authentic customer representative would have root directory access to the Web server on which the named network resource is located. The root directory is also specified for the convenience of the customer. When the Number File 64 is stored in the root directory of the Web server, the customer can modify or re-organize the Web server without affecting the Number File. Conversely, if the Number File 64 was stored in a subordinate directory of the Web server, then there would be a risk of disabling the Number File by accidentally deleting its directory.

In block 210, the customer confirms to the Registration Service 22 that the Number File 64 has been stored in the specified location by the customer. The customer confirmation can be provided in an email directed to the Registration Service 22 or by entering an appropriate command using the Web interface of the Registration Service 22.

Figure 2B:
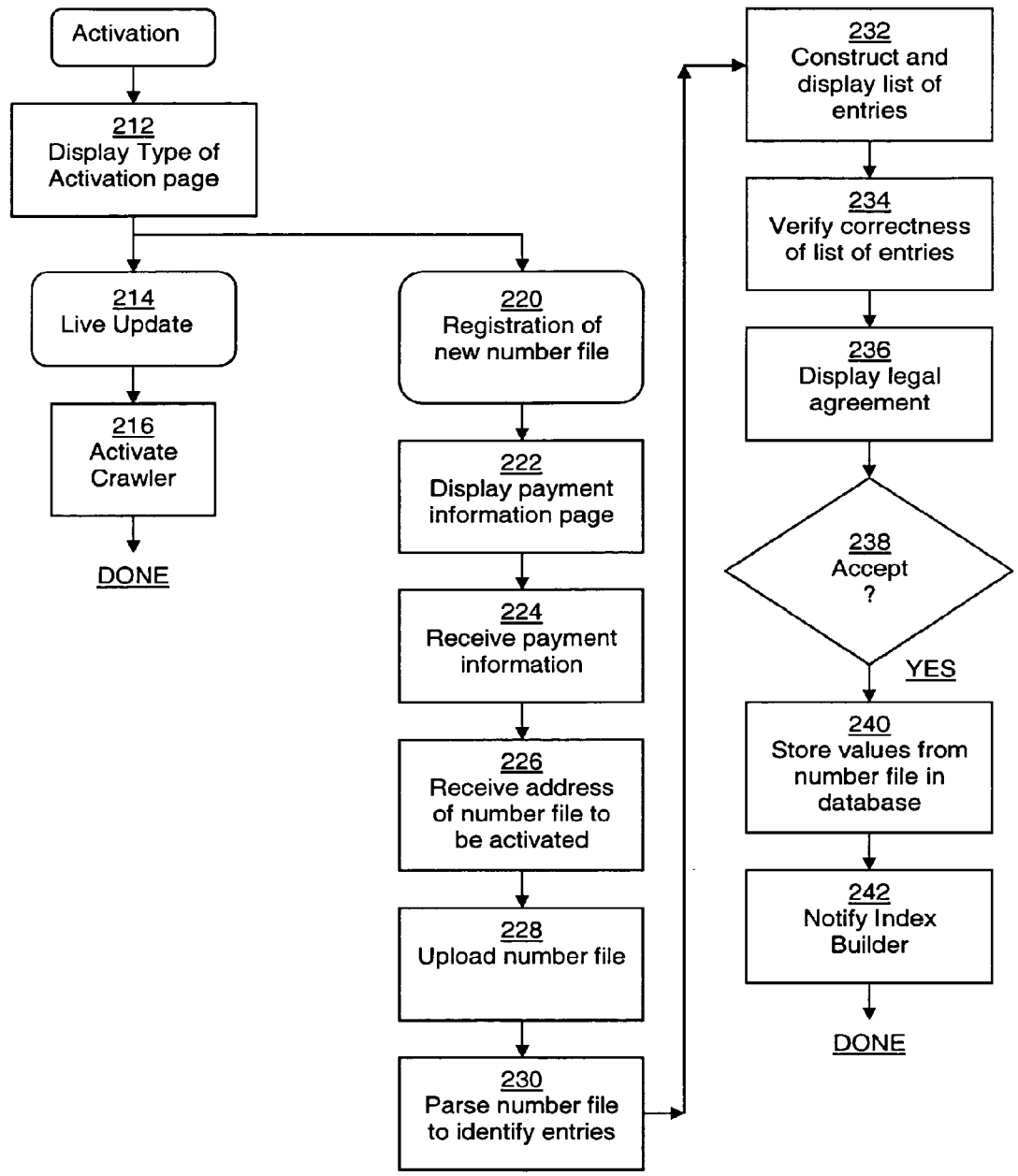
FIG. 2B is a flow diagram of a method of activating a number file in the system of FIG. 1B.

Thereafter the user is required to activate the Number File. Activation is a process of verifying that the Number File is stored in the correct location by an authorized user. Optionally, the activation process also includes the process of arranging payment for the privilege of having a registered Number File recognized by the system. One embodiment of an activation method is shown in FIG. 2B.

In the preferred embodiment, the user activates a Number File after creating it by selecting the MLS File/Activate function from the top-level menu option list. In response, as shown in block 212, the system constructs a page that requests the user to enter a type of activation, and sends the page to the client, which displays it. For example, the system displays a page of the form shown in Table 6:

TABLE 6

ACTIVATION TYPE SELECTION PAGE

Please select the appropriate service:
   (*) Live update of a previously registered Number File.
   (*) Registration of a new Number File on your website.
[BACK] [NEXT]

Preferably the symbols shown in the form "(*)" in Table 6 above are displayed as radio buttons, or another graphic element, that can be selected by the user. When the user selects the first option ("Live update of a previously registered Number File"), as shown in blocks 214-216, the system activates the Crawler, which locates the user's Number File over the Internet, and updates the database 12, as described below.

Thus, the "Live update" function provides a way for a user to force the system to locate a modified Number File and update itself with the new information. Alternatively, as described below in connection with the Crawler, the user may simply wait and the Crawler eventually will locate the modified file and update the database.

When the user selects the second option ("Registration of a new Number File on your website"), as shown in blocks 220 to 222, in response the system constructs and sends to the client 70 a Web page with which the user can enter payment information pertaining to the user and its Number Files in accordance with the amount calculated and actions taken at steps 203 and 203A. Payment steps of the activation process are an entirely optional part of the process, and other embodiments are contemplated that omit any payment mechanism including those relating to steps 203 and 203A. In the embodiments that do use a payment mechanism, the Web page contains fields that accept entry of payment information. For example, the fields enable entry of a credit card type, card number, expiration date, and cardholder name. The system receives the payment information values in block 224.

In block 226, the system prompts the user to enter the network address of the Number File to be activated, and a description of the Number File.

In block 228, the Registration Service 22 establishes an HTTP connection to the Web Server 60, requests and uploads a copy of the Number File 64. This step is carried out to verify that the Number File 64 is valid and is stored in the correct location. In block 230, the Number File 64 is parsed, and values identifying the network resource are extracted. In block 232, the system constructs a Web page that displays all the entries parsed from the current Number File 64, and sends the page to the client 70. Within the Web page, the system displays a prompting message, such as the following:

"The Number File that we have downloaded from your site contains the following entries. Please verify these entries are correct. Press NEXT to continue.

[BACK] [NEXT]"

As shown in block 234, the user reviews the entries, verifies that they are correct, and clicks on the NEXT function button. If any of the entries is not correct, the user clicks on the BACK function button, which provides access to the MODIFY function described herein.

In the preferred embodiment, the system then displays a Web page containing a written legal agreement governing payment of registration fees and resolution of disputes involving other issues such as legal issues, as shown in blocks 236-238. The agreement concludes with function buttons labeled ACCEPT and DECLINE. To accept the terms of the agreement and proceed with registration, the user clicks on the ACCEPT button. To decline the terms of the agreement and discontinue the activation process, the user clicks on the DECLINE button. Use of the legal agreement is entirely optional and embodiments that do not use such an agreement are contemplated and are within the scope of the invention.

The system then stores values parsed from the Number File 64 in the database 12 of the Registry 10, as shown in block 240.

For security reasons, the network address or URL of the Number File 64 must match the root directory of the Web server 60. This prevents redirection of telephone numbers to unauthorized different network addresses. It also prevents the owner of the Web server 60 from redirecting to that Web server any telephone number that he or she does not own.

In block 242, the Registration Service 22 notifies the Index Builder 32 that a new entry has been made in the database 12. Path 26 of FIG. 1B represents the notification. The notification includes information sufficient to identify the new entry in the database 12, for example, a row identifier ("rowid") of a table in which the new entry is stored. In response, the Index Builder 32 carries out a live update of the Index Files 34, in the manner discussed further below.

Thus, the Number File 64 created by the user is activated and available for use by the Resolver 40.

In the preferred embodiment, the database 12 is available to receive queries from registered members of the system. As a result, a registered member can submit queries to the database 12 that request the database to display currently registered information about network resources or Web pages of other organizations. Accordingly, if another registered user succeeds in registering information that misrepresents the content of that user's network resources, the misrepresentation can be reported to the Registry for corrective action. Thus, in this manner, the formality of the registration process, and the open query capability of the database 12 enable the present system to avoid the deception that is possible through the improper use of metatags.

Modifying and Deleting Number File Information

After a Number File is created having one or more entries, the entries can be edited or deleted using the MLS File/Modify and MLS File/Delete functions shown in the top-level menu list.

When the user selects the MLS File/Modify function, the system reads the MLS file from the server associated with the user, and displays the contents of the file in a Web page having the form shown in Table 7

TABLE 7

MLS FILE/MODIFY PAGE DISPLAY

The current list of MLS entries contained in your MLS file is shown below. To edit an entry, select the appropriate word and press EDIT. To delete an entry, select the appropriate word and press DELETE. To add a new MLS entry, press ADD. Press NEXT when you are done editing the MLS file.
[BACK] [EDIT] [DELETE] [ADD] [NEXT]
Telephone Number: 212-555-3000
    URL: http://www.xyzcorp.com
Type: Company
Language: English
Region: North America
Description: the home page for widget manufacturer, XYZ Corp.
Selection:
Telephone Number: 212-555-1234
URL: http://www.acme.com
Type: Company
Language: English
Region: Global
Description: Home page for Acme Corp
Selection:

The page consists of a text instruction section, a set of editing function buttons, and a list of entries currently contained in the Number File. The text instruction section explains the functions carried out by the editing function buttons. In the preferred embodiment, the function buttons of this page operate on entire Number File entries rather than individual fields within each entry. For example, to edit an entry, a user selects the appropriate telephone number, such as "212-555-1235" and presses the EDIT function button. In response, the system displays an entry editing page that contains the selected entry. The user can enter modified text in fields of the entry editing page.

Similarly, to delete an entry, the user selects the appropriate word and presses the DELETE function button. In response, the system constructs a new Number File that contains all the prior entries except the entry selected for deletion.

To add a new entry to the currently displayed Number File, the user clicks on the ADD function button. In response, the system displays a page in the form of Table 3 discussed above in connection with creating a new Number File.

To apply changes made in the EDIT, DELETE, or ADD operations, the user presses the NEXT function button. Selecting the NEXT function button causes the system to construct a new Number File, preferably in the above-described XML format. The system emails the new Number File to the user in an appropriate explanatory message. For security reasons, the user is required to store the new Number File in a directory specified by the system, as in the case of creation of a new file.

Crawler

Figure 3:
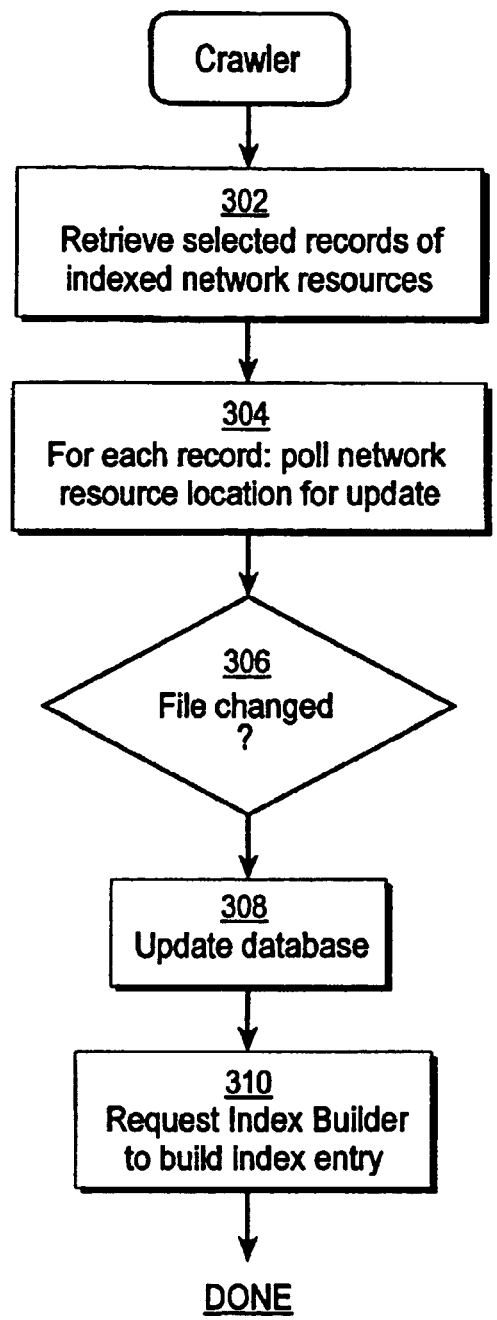
FIG. 3 is a flow diagram of a method of operating a crawler in the system of FIG. 1B.

FIG. 3 is a flow diagram of an embodiment of a method that is preferably carried out by the Crawler 24. In the preferred embodiment, the system includes a Scheduler process that triggers activation and execution of the Crawler 24. For example, the Scheduler stores a schedule of events. An event states that the Crawler 24 should execute every twenty-four hours. Upon the occurrence of a scheduled event, the Scheduler launches the Crawler 24.

In block 302, the Crawler 24 reads the database 12 of the Registry 10 and retrieves one or more rows or records that identify network resources that are indexed in the Index Files 34. The protocol for selecting the rows or records is not critical, and several different schemes can be used. For example, the Crawler 24 can select all rows or records that have not been updated since the last time that the Crawler executed. Alternatively, the Crawler 24 can select all rows or records that have been created within a specified time frame or that are older than a particular number of days. In still another alternative, the Crawler 24 selects the least recently updated record. In a preferred embodiment, the system includes a mapping of telephone numbers to MLS file names and locations called the File Info table. The Crawler matches the selected rows to the File Info table and locates the network address, location or URL of the Number File associated with each telephone number, row or record.

For each of the selected rows or records, in block 304, the Crawler 24 polls the customer Web site that is represented by the row or record, searching for updates to the Number File 64 that is stored in association with that Web site. The polling step includes the steps of opening an HTTP connection to the Web site, requesting and receiving a copy of the Number File. The Crawler 24 parses the Number File, using an XML parser, to identify telephone number entries, and values within each telephone number entry, that specify the telephone number, network address, and descriptive information relating to network resources. An XML parser is commercially available from Microsoft® Corporation.

For each entry in the Number File, as shown in block 306, the Crawler 24 tests whether the entry matches a row or record in the database 12. Thus, the Crawler 24 determines whether the contents of the Number File are different from entries in the database 12. If so, as shown in block 308, then the Crawler 24 updates the database 12, and requests the Index Builder to rebuild the index entry associated with the updated row or record in the database 12.

In this way, the Crawler 24 polls Web sites on the Internet 50 to locate customer sites that have updates. Because the Number Files are distributed across the network at numerous customer sites, each customer has the freedom and flexibility to modify its Number File at any desired time. The customer need not notify the telephone number system, because the Crawler 24 will eventually locate each change and update the database 12 accordingly. Thus, the Librarian 20 automatically monitors changes to Number Files distributed across the network, and periodically updates the Registry 10 with the change. Advantageously, customers or end users are not involved in updating the database 12; the Crawler 24 updates the database automatically.

In the preferred embodiment, a customer can instruct the Librarian 20 to immediately execute the Crawler 24 with respect to a specific Web site. In this way, changes to a particular Number File are immediately identified and loaded into the database. The customer activates immediate execution of the Crawler 24 by selecting the Live Update option from the top-level menu. In the preferred embodiment, the system also carries out, once weekly, a comprehensive update of the Index Files 34 based on the contents of the database 12. In this way, at least weekly, the Index Files 34 are rebuilt based on the current contents of the database 12.

In an alternate embodiment, the Crawler 24 also validates each of the network resource locations that are identified in each Number File. For example, the Crawler 24 attempts to connect to and load each network resource that is identified in a Number File entry. If an error occurs, an appropriate email message is composed and sent to the contact person of the organization that registered the Number File. The email message advises the contact person that the network resource location in the Number File is invalid.

Index Builder

Figure 4:
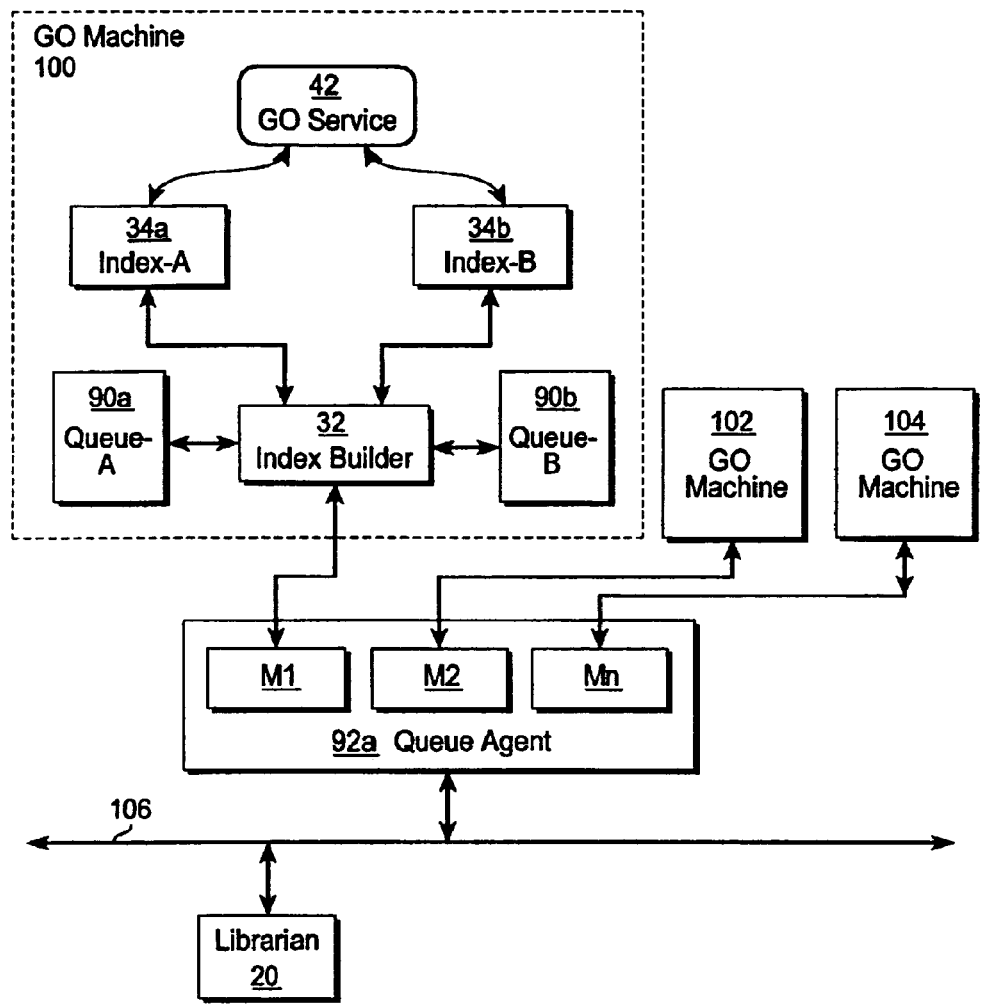
FIG. 4 is a block diagram of an index builder service of the system of FIG. 1B.

The Index 30 comprises an Index Builder 32 and Index Files 34. The Index Builder 32 is a software program or process that operates in two modes. In the first mode, a Reconstructor process of the Index Builder 32 periodically polls the database 12, discovers changes to the database, and indexes the changed telephone number records in the Index Files 34. In a second mode, the Index Builder 32 updates the Index Files 34 in real time, based upon a queue of requests to update the indexes. FIG. 4 is a block diagram of a preferred embodiment of the Index Builder 32. Computers labeled GO Machines 100, 102, 104 each run an instance of the Index Builder 32. Each GO Machine 100, 102, 104 is associated with a network interface process M1, M2, Mn of a Queue Agent 92a. The Queue Agent 92a is coupled to a network 106, such as a local area network, and receives requests to build index entries from the Librarian 20. The Queue Agent 92a propagates a copy of each request to one of the network interfaces M1, M2, Mn, which forwards the request to its associated GO Machine 100, 102, or 104. This architecture is highly responsive to external queries, and is fault-tolerant.

Within each GO Machine, the Index Builder 32 is coupled to a pair of queues 90a, 90b and a pair of indexes 34a, 34b. The GO Service 42 can access either of the indexes 34a, 34b, but always accesses only one of the indexes at a time. The Resolver 40 is omitted from FIG. 4 for clarity, but it should be understood that the GO Service 42 accesses each index 34a, 34b through a Resolver 40 process.

It is important for the GO Service 42 to be in constant communication with one index or the other. Accordingly, using the architecture shown in FIG. 4, the Index Builder builds the indexes using the following process. The GO Service is placed in contact with index 34b and instructed to communicate telephone number resolution requests only to index 34b. As index build requests arrive from the Queue Agent 92a at the Index Builder 32, the Index Builder 32 adds the requests to both of the queues 90a, 90b. When one of the queues is sufficiently full, for example, queue 90a, the Index Builder 32 sequentially removes entries from the queue, in first-in-first-out order, and updates the index 34a with each queue entry. Concurrently, if any new index build requests are received, they are routed to both of the queues. When the queue 90a is empty and the index 34a is fully updated, the Index Builder 32 instructs the GO Service 42 to communicate telephone number resolution requests only to index 34a. The Index Builder 32 then removes entries only from queue 90b and updates only index 34b from that queue. Thus, the Index Builder 32 can add index entries to either of the queues 90a, 90b, but always updates only one index at a time using the contents of only one of the queues at a time. The queue with which the Index Builder 32 communicates is always the opposite or complement of the indexes 34a, 34b with which the GO Service 42 is currently communicating. In this way, the GO Service 42 constantly communicates with an index, and the Index Builder 32 can update the index in real time without disrupting telephone number resolution operations.

Preferably, the index build requests comprise an identifier, called a FileId, of a file or row that is mapped in the File Info table described above. The Index Builder 32 looks up the FileID in the File Info table and retrieves all entries in the database that match the FileID. Each database entry includes a unique identifier that is associated with a network resource that is described in the database entry. The unique identifiers are generated using a sequence facility of the database server. Based on the unique identifier, for database entry that matches the FileID, the Index Builder retrieves a matching index entry. The information in the index entry is compared to the information in the build request. If the information in the build request is different, the index entry is updated. If the information in the build request indicates that the associated network resource has become inactive or unavailable in the network, the index entry is deleted.

To provide scalability, reliability, and rapid response, each of the GO Machines 100, 102, 104 has a similar configuration and operates in parallel. Although three GO Machines 100, 102, 104 are shown in FIG. 4 as an example, any number of GO Machines can be used in the system. In the preferred embodiment, a Scheduler process determines when the Index Builder 32 executes.

Resolver

Generally, the Resolver 40 functions as a runtime query interface to the metadata that is stored in the Registry 10. The Resolver 40 functions to receive telephone number requests from services 42, 44, 46, query the index 30 to identify network addresses corresponding to the telephone number requests, and respond to the services with the network addresses. The Resolver 40 is structured to respond rapidly to query operations and to service millions of requests per day. To maximize response time and ensure scalability, the Resolver 40 does not directly access the database 12 of the Registry 10 in responding to queries. Instead, the Resolver communicates with the Index 34 that is stored in fast main memory.

In the preferred embodiment, the Resolver 40 operates in any number of multiple instances R1, R2, Rn, each of which is associated with a service 42, 44, 46 that is making a request to the Resolver. The services 42, 44, 46 communicate with Resolver instances R1, R2, Rn using HTTP connections. Further, it is preferred to operate the computer hardware on which the Resolver 40 runs in a triple-redundancy configuration. This configuration provides rapid response to the requesting services 42, 44, 46 and provides reliability. Each instance R1, R2, Rn is implemented as an instance of a Web application that implements the Resolver. The services 42, 44, 46 communicate with Resolver instances R1, R2, Rn using HTTP connections.

Figure 5:
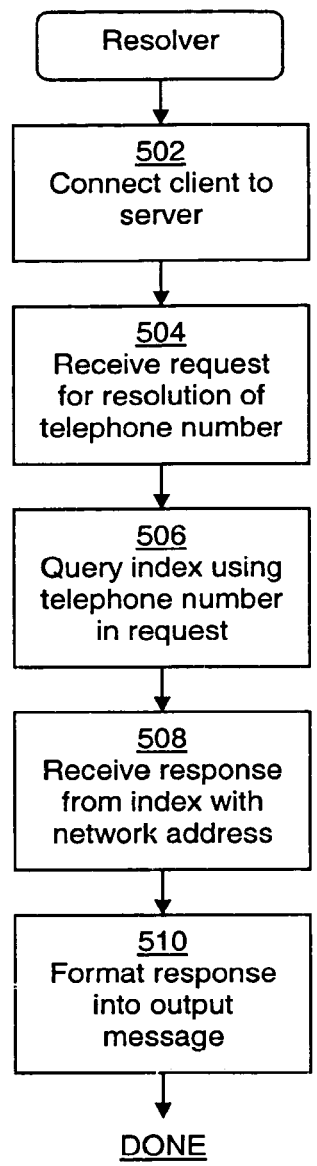
FIG. 5 is a flow diagram of a method of operating a resolver service in the system of FIG. 1B.

In one embodiment, an instance of the Resolver 40 is implemented as a dynamically linked library (DLL) that is integrated into the services 42, 44, 46. In the preferred embodiment each instance of the Resolver 40 is a detached, separate process or program that operates according to the method shown in FIG. 5. The Resolver 40 is implemented with one or more APIs that allow the development of services that use the Resolver, such as "yellow pages" and search services.

As shown in blocks 502-504, an external Web client, server or browser, such as the client 70, accesses the Resolver 40. In one embodiment, the client 70 connects to the Resolver 40 using an HTTP connection. In block 502, the client 70 establishes an HTTP connection to the Resolver 40. In block 504, the client 70 provides a URL to the Resolver that requests the network address corresponding to a particular telephone number. For example, the URL is in the form http://www.resolver.com/resolve? tn=TELEPHONE NUMBER. In a URL of this form, "http://" identifies the URL as an HTTP request, www.resolver.com is the server domain, and "resolve" is the name of a program running on that server domain that implements the resolver. The statement "tn=TELEPHONE NUMBER" passes the value "TELEPHONE NUMBER" to a parameter "rntn" that is recognized by the resolver. In instances where the telephone numbers are stored with accompanying area and country codes, the client browser is preferably programmed to add the country and area code to a telephone number that is entered by the user without one or both of the codes. This information may derived from settings in the user's Window's operating system.

In another embodiment, the client 70 connects to one of the services 42, 44, 46 associated with an instance of the Resolver 40. The services 42, 44, 46 communicate with the client 70 to request and receive a telephone number.

Thus, in one of these ways, the Resolver 40 receives a telephone number requested by the client 70. In response, the Resolver 40 constructs a Qualifier object in main memory that contains the telephone number. In block 506, the Resolver connects to the Index 30 and submits a query requesting the network address or URL that corresponds to the telephone number in the request from the client 70. In the preferred embodiment, the query is submitted by sending a message containing the Qualifier object to an Index Store object. The Index Store object encapsulates or provides an abstract representation of the Index 30. The Index Store object executes an index query.

In block 508, the Resolver 40 receives a response from the Index 30 that contains the network address or URL that corresponds to the telephone number in the request from the client 70. In the preferred embodiment, the Index Store object returns an Entry Set object to the Resolver 40. The Entry Set object contains or references a set of one or more entries from the Index 30 that correspond to the requested telephone number. Preferably, an entry Set object is configured to supply the location or URL of a network resource described in an entry of the object.

Use of The Entry Set object allows operation when only a part of a telephone number is entered. This is particularly useful when a user of the present system knows only a part of the telephone number for which information is sought. As an example, a user who knows only the last four digits of a telephone number may enter "3421". The Entry Set object will contain all telephone number entries that end with the numbers "3421", e.g., "212-324-3421", "213-247-3421" and "702-397-3421" and the user may then select the number or corresponding resource that is believed to be the desired resource.

The Index Store object also has logic for ordering entries in the Entry Set object based on a function of past usage. When the Entry Set object has just one entry, ordering is not needed. When the Entry Set object has more than one entry, the entries may be in using any desired method to indicate any desired ordering preference.

In block 510, the Resolver 40 formats the response of the index into an output message. In a preferred embodiment, the Resolver 40 constructs an XML file containing the information in the response from the Index 30. In the preferred embodiment, the services 42, 44, 46 each are provided with an XML parser that can convert the XML file produced by the Resolver 40 into text or other information in a format that is usable by the client 70. Also in the preferred embodiment, each entry referenced in the Entry Set object contains a usage value that indicates the number of times that the entry has been resolved. The usage values may be used to order the entries when they are displayed or otherwise used by one of the Services 42-46.

Preferably, after each telephone number resolution, the Resolver 40 writes an entry in a log file 84 that describes the telephone number, the total number of times it has been resolved in the past including the current resolution, the IP address and domain name of the client or server that requested the current resolution, and the time at which the current resolution occurred.

In the preferred embodiment, the Index 30 and the Resolver 40 execute on the same physical computer, and the Index Files 34 are stored in main memory of that computer. This configuration improves response time of the Resolver 40 by providing it with high-speed access to the Index 30. It is contemplated that the Resolver 40 will respond to several tens of millions of telephone number resolution requests per day. Also in the preferred embodiment, the Index 30 and the Resolver 40 are implemented as a plurality of Component Object Model (COM) programmatic objects that communicate with the AltaVista runtime library using AltaVista's API. The AltaVista runtime library is commercially available for license from Digital Equipment Corporation in the form of the AltaVista Software Development Kit (SDK).

In an alternate embodiment, the Resolver 40 is capable of distinguishing among network addresses that refer to resources located on the Internet, an internal business network or "intranet", and an externally accessible internal business network or "extranet". In an intranet environment, the Resolver 40 accesses a Registry 10 that is located within the organization that owns and operates the Resolver. The Registry 10 stores resource information that identifies intranet resources. This is particularly applicable for businesses having PBX-based telephone systems utilizing internal four or five digit extension dialing. The Resolver 40 resolves the telephone number or extension entered by the user into the locations of intranet resources, and navigates the user to the resources.

Services

The services 42, 44, 46 can be implemented in several variations. In one embodiment, the GO service 42 is a computer program that is installed into or attached to the browser 74 of the client 70. For example, the GO service 42 is installed into the client 70 as a plug-in to the browser 74. The user downloads the GO service 42 from a central distribution site and stores the service on the client 70. The user executes an installation program that installs the service into the browser 74. Once installed, the GO service 42 intercepts telephone numbers entered by the user into the browser 74 and resolves the telephone numbers into network addresses that are usable by the browser 74.

Figure 6:
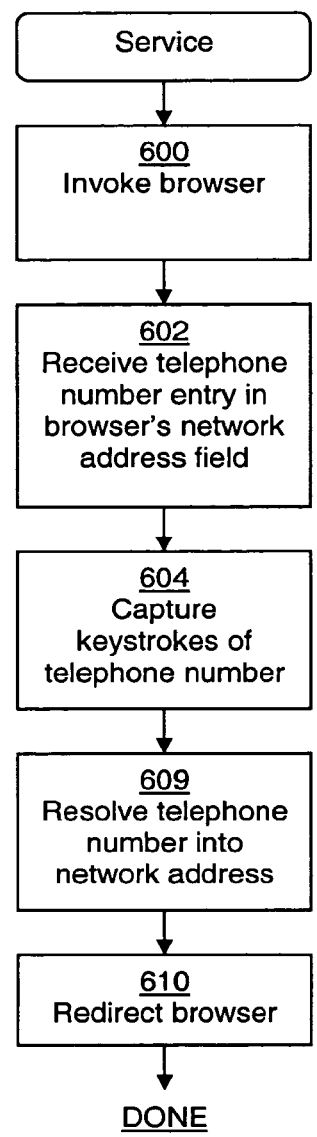
FIG. 6 is a flow diagram of a method of operating a number finding service in the system of FIG. 1B.

FIG. 6 is a block diagram of a method of operating the GO service 42 in this configuration. In block 600, the user invokes or initiates execution of the browser 74. The browser 74 has a URL data entry field into which a user customarily types a network address of a document to be retrieved and displayed by the browser, such as a URL. In block 602, the user enters a telephone number into the network address data entry field. In block 604, the GO service 42 captures all keystrokes that are typed by a user into the network address data entry field of the browser 74 and thereby receives the telephone number entered by the user.

Control is next passed to block 609. In block 609, the service 42 requests the Resolver 40 to resolve the telephone number received at the browser into a network address. For example, the service 42 constructs a URL that references a pre-determined location of the system that implements the Resolver 40. The URL contains, as a parameter to be passed to the Resolver 40, the telephone number received at the browser. The service 42 opens an HTTP connection from the client 70 to the Resolver 40 using the URL that contains the telephone number. The Resolver 40 extracts the value of the telephone number from the URL, and carries out the resolution process described above. The Resolver 40 then returns the network resource location values in an HTTP message to the browser 74.

If a corresponding network resource location value is received from the Resolver 40, in block 610, the GO service 42 redirects the browser 74 to the network address found by the Resolver 40. For example, the service 42 extracts the network resource location value from the HTTP message received from the Resolver 40, and passes the value to functions of the browser 74 that can load and display Web pages. The browser 74 then loads and displays the file or page located at the network address in conventional manner. Alternatively, if more than one network resource location value is received from the Resolver 40 in response to the Resolver 40 receiving only a partial telephone number, then in block 610 the service displays a list of the network resource location values. The results are displayed in an order, from most prior resolutions to least prior resolutions, based on the resolution values compiled and stored by the Statistics Service 82. In another variation, the service returns to the client 70 an HTTP response containing an XML in which the results of the query are stored.

In an alternate embodiment, the GO service 42 is implemented as a Web application that runs on a dedicated Web server. To locate a network resource, the client 70 connects to the GO Web server using a predetermined network address or URL. In response, the Web application of the GO service 42 displays a Web page comprising a form with a data entry field. The end user types the telephone number of a network resource into the data entry field. The GO server 42 locates the network resource in the manner described above.

In another alternate embodiment, the GO service 42 is linked to a button or panel that is embedded in a Web page of an external Web server. The button or panel is anchored to a network address or URL that invokes the GO service 42 when the button or panel is selected by a user viewing the external Web server. This configuration provides a way to enter telephone numbers that does not require use of a browser.

In yet another alternate embodiment, the GO Service 42 includes a mechanism to detect and respond to the language being used by the client 70 that contacts and provides a query to the GO Service, defining the country code this way. Assume the computer that is running the GO Service 42 operates using UTF-8 character set encoding and the English language, whereas the client 70 is using the Japanese language and a different character set encoding. When the GO Service 42 sends a Web page to the client 70 that contains the telephone number entry form, the Web page includes a hidden field that stores a pre-determined text string. The client 70 receives the Web page, and its browser or operating system converts the Web page to the character set that it uses. The user of the client 70 enters a telephone number into the Web page and submits it to the GO Service 42. The GO Service 42 receives the Web page, extracts the value of the hidden field, and compares the hidden field value to a table or mapping of hidden field values to character set encodings and languages The GO Service 42 retrieves the corresponding character set encoding and language. Based on the language (country codes), the GO Service 42 selects a resource having a matching Language value in the metadata section 906 of the resource. In this way, the system transparently determines the language of the client that originates a query, and supplies a resource that is appropriate to that language.

In another alternate embodiment, the GO Service 42 and the Resolver 40 use the values of the metadata in the Number File 64 associated with resources to respond to advanced queries. For example, assume that United Airlines registers a Number File 64 that describes resources in several different languages such as English, French, and Japanese. A user desires to locate a Web site affiliated with United Airlines that is located in France or prepared in the French language. The user enters the telephone number for reservations for United Airlines in the United states appended with the word "France" as follows: "1-800-241-6522 France," into the GO Service 42. The Resolver 40 attempts to match the entry to the Description, Region, and Language fields of the metadata section 906 associated with the United Airlines Number File 64. The Resolver 40 and the GO Service 42 redirect the user's browser to a United Airlines site presented in French.

In an alternate embodiment, when the GO Service 42 is implemented as a browser plug-in installed in the client 70, the GO Service provides character encoding information to the Resolver 40. To obtain the character encoding currently used on the client 70, the GO Service 42 calls an operating system function of the operating system that runs on the client 70. The GO Service 42 attaches the character encoding information to the URL that is used to return the user's query to the Resolver 40. In this way, the Resolver receives information indicating the language and character set currently used by the client 70, and can respond with a network resource that is appropriate to that language.

In another alternate embodiment, the computer system further includes a microphone coupled to an analog-to-digital converter. The analog-to-digital converter is coupled through an appropriate interface to the bus of the computer system. Under control of driver software or another appropriate application program, the analog-to-digital converter receives an analog audio input signal from the microphone and converts the signal to a digital representation of the signal. The driver or application program receives the digital representation and converts it into a phoneme, string of words, keyword, or command for the GO Service 42. The converted digital representation is used by the GO Service 42 as input, as a substitute for input from the keyboard or mouse. Thus, a user can view the user interface display 1000 and speak words into the microphone to command the GO Service 42 to locate a particular network resource. In this way, the user can navigate the Web using spoken words (numbers).

Figure 9:
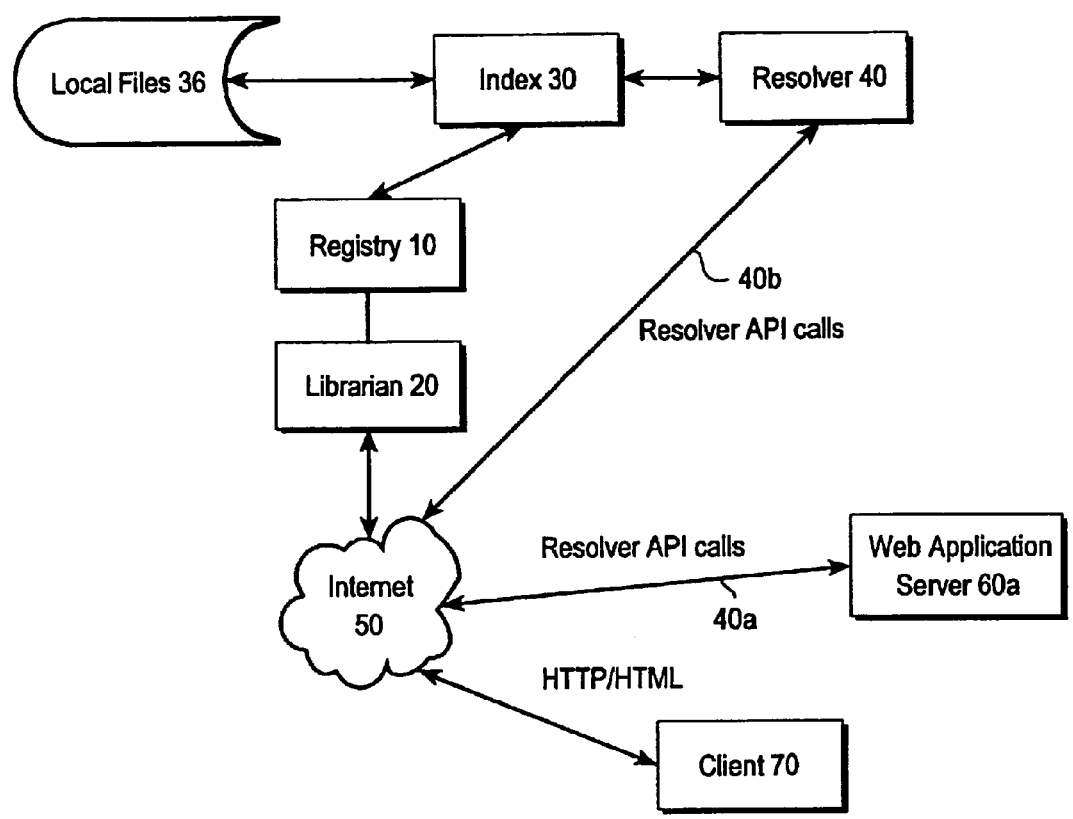
FIG. 9 is a simplified block diagram of a resolution and navigating system.

Another alternate embodiment is shown in FIG. 9. A Service is implemented in the form of a Web server or middle-tier Web application server 60*a*. The Web application server 60*a* communicates to the client 70 using HTTP messages through the Internet 50. The Web application server 60*a* includes a Common Gateway Interface (CGI) script processor, an application server such as Netscape's Kiva, Microsoft's Active Server, or Apple's WebObjects®. An application program running on the Web application server 60a communicates with the Resolver 40 through the Internet 50 over paths 40a, 40b using CGI scripts to generate HTTP requests and responses. The Web application server 60a uses calls to functions provided by the API of the Resolver 40 to communicate along paths 40a, 40b. Using this structure, the Web application server 60a issues requests containing queries to the Resolver 40. In response, the Resolver 40 evaluates the query, queries the Index 30, and creates a set of metadata for all Index entries reflecting Web pages that match the query. The set of metadata is packaged as an XML file and delivered to the Web application server 60a by the Resolver 40. The Web application server 60a has an XML parser that can parse the XML code in the XML file. Based on the parsed XML code, the Web application server 60a creates one or more HTML documents and delivers the HTML documents to the client 70. The client 70 displays the HTML documents to the end user.

Statistics Service

As described above in connection with the Resolver 40, each time a telephone number resolution is carried out by the Resolver, it writes a log file entry. The system includes a Statistics Service 82 that is responsible for reading the log file and loading information from the log file into the Index Files 34.

In the preferred embodiment, the Statistics Service 82 operates periodically on a scheduled basis. The Statistics Service 82 reads each record of the log file and constructs an index object based on the information in the log file. The Statistics Service 82 then sends a message to the Index Builder 32 that requests the Index Builder to persistently store the values in the Index Files 34. In response, the Index Builder 32 stores the values in the Index Files 34.

The top-level menu page of the system has hyperlinks that enable the user to access statistics and billing functions.

Figure 7A:
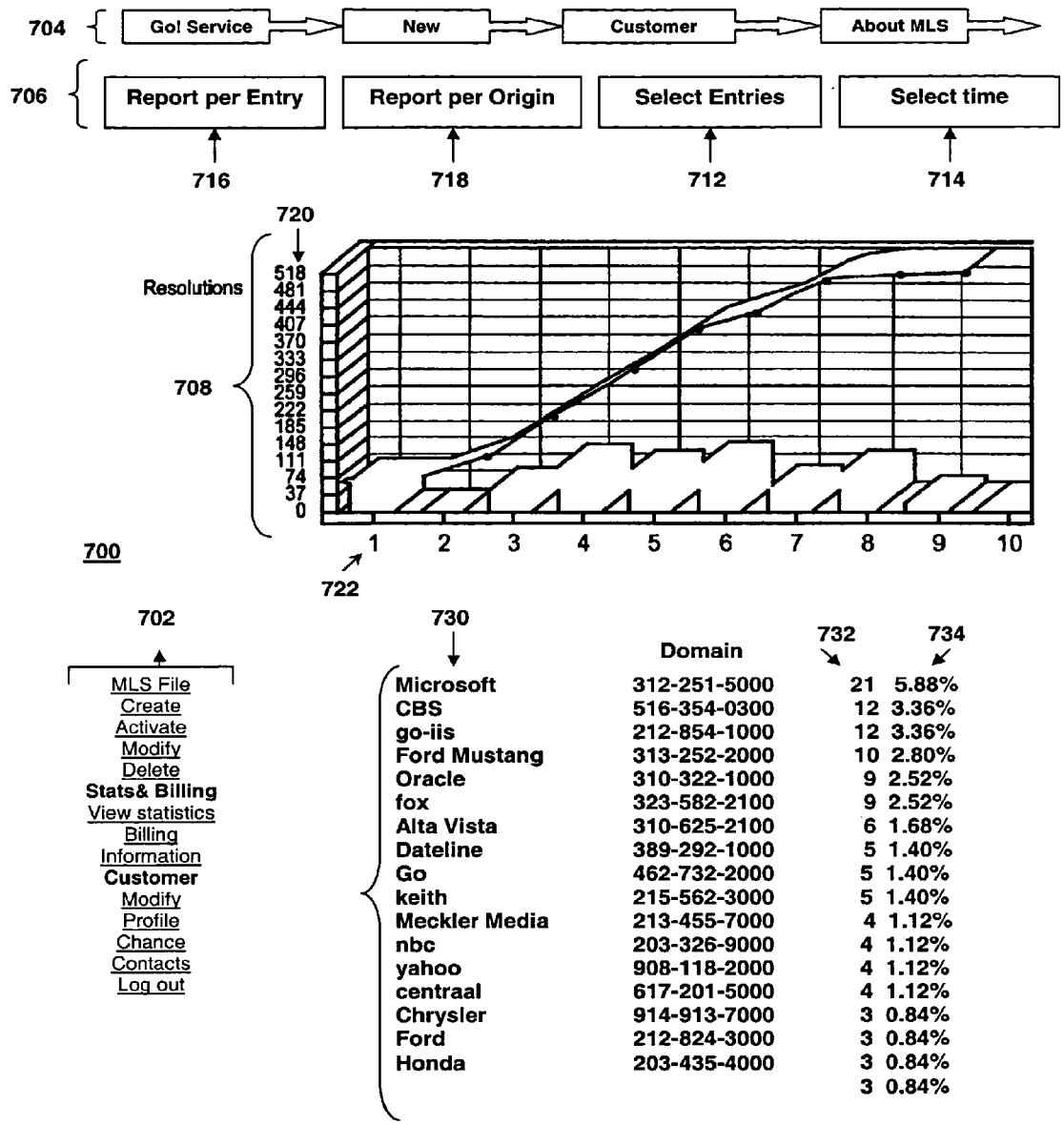
FIG. 7A is a diagram of an exemplary statistics report page generated by the system of FIG. 1B.

When the Statistics & Billing/Statistics option is selected, the system generates a Web page 700 in the form shown in FIG. 7A. The Web page 700 has a list 702 of top-level options. A set of function buttons 704 enable the user to establish other global functions such as resolving an address, entering new customer information, obtaining customer service, and learning more information about the telephone number system.

Report function buttons 706 enable the user to access report generation functions of the system. In an embodiment, the report function buttons 706 include a Select Entries button 712, a Select Time button 714, a Report per Entry button 716, and a Report per Origin button 718.

The Select Entries button 712 is used to identify a range of entries within a Number File for which statistics are to be generated. When the user selects the Select Entries button 712, the system reads the Number File on the server having an IP address matching the IP address of the user's current domain. The system parses the Number File and displays a list of all the telephone numbers in a new Web page that is sent to the client 70. The Web page displays a radio button adjacent to each of the telephone numbers in the list. By clicking on the radio button and then submitting the Web page to the system, the system will provide statistical information for all the selected telephone numbers in all reports that are generated later.

The Select Time button 714 is used to identify a time frame for which statistics are to be generated. When the user selects the Select Time button 714, the system generates a new Web page and sends it to the client 70. The Web page includes a form into which the user enters a starting date and an ending date. When the user submits the filled-in page to the system, the system receives and stores the date values. When reports are generated thereafter, the reports will contain statistical information for resolutions of telephone numbers that occurred within the specified dates.

The Report per Entry button 716 is used to generate a report and graph showing all telephone number resolutions that have occurred for each telephone number entry defined in the current Number File. When the Report per Entry button 716 is selected, the system reads statistical information that is stored in the statistical tables of the database 12 for each of the telephone numbers that are defined in the current Number File. The system generates a graph and a chart of the statistical information, and generates a Web page containing the graph and chart.

FIG. 7A is an example of a Web page generated in this manner. The graph pane 708 shows an exemplary bar graph. Each bar in the bar graph represents a telephone number defined in the current Number File. The vertical axis 720 identifies the number (in thousands) of resolutions of each telephone number. The horizontal axis 722 identifies each Number for which statistics information is reported. The statistics pane 710 comprises a description column 730 with information taken from the Description field from the Number File, a quantity of resolutions column 732, and a percentage column 734. The description column 730 lists each telephone number and associated Description that is defined in the current Number File. The quantity of resolutions column 732 gives the number of resolutions of that telephone number that have occurred within the currently defined time period. The percentage column 734 indicates, for each telephone number, the percentage of total resolutions represented by the resolutions of that telephone number.

Figure 7B:
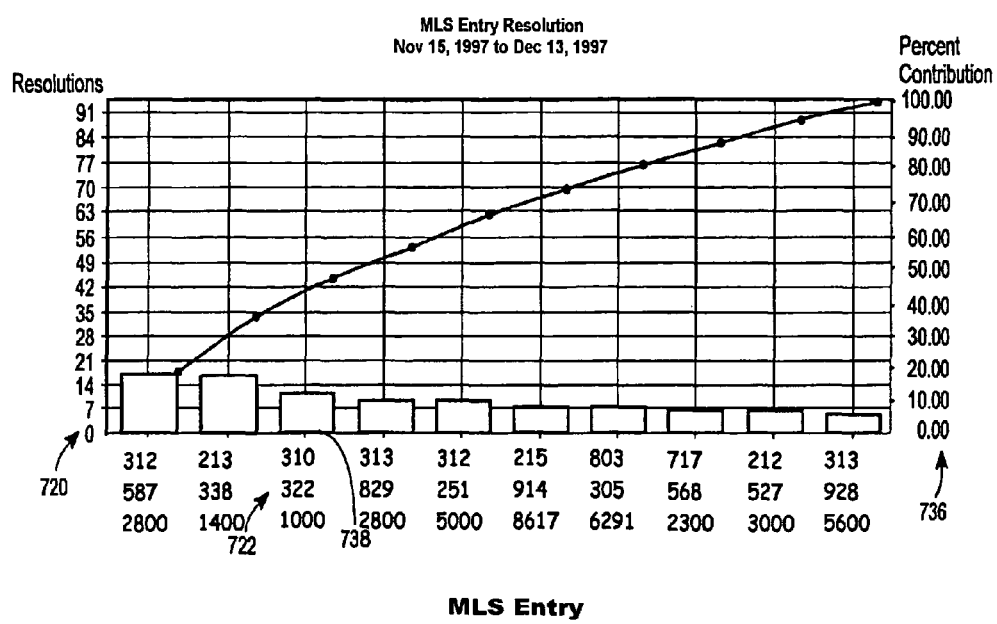
FIG. 7B is a diagram of another exemplary statistics report page generated by the system of FIG. 1B.

FIG. 7B is an example of another type of graph generated by the statistics service. The vertical axis 720 shows the number of resolutions of each telephone number. The horizontal axis 722 comprises a plurality of bars 738, each bar associated with a telephone number. The bar represents the number of resolutions of that telephone number. A second vertical axis 736 displays a number indicating the percentage of total resolutions carried out by the system that is represented by each telephone number shown in the horizontal axis 722.

In an embodiment, a fee is charged by the owner of the telephone number system to end users or customers who register telephone numbers in the Registry 10. The Librarian 20 records a charge against the account of the user when a new entry is submitted to the system using the Registration Service 22. In another embodiment, end users or customers who register telephone numbers in the Registry 10 pay a fee to the owner of the telephone number system for each resolution executed by the Resolver 40 in response to a third-party request. The Resolver 40 records a charge against the account of the user when each resolution is completed. In these embodiments, the account information and charges are logged and accumulated in tables of the database 12. Periodically, an external billing application reads the charge and account tables of the database 12 and generates invoices that are sent to the user. The Statistics & Billing/Billing Information option of the top-level option list 702 enables the user track and monitor, in real time, the user's credits and payments for registered telephone number entries, as well as resolution fees. When the Billing Information function is selected, the system reads the charge and account tables of the database 12 and generates a report, in a Web page, summarizing the charges to the customer. The Web page is delivered to the client 70 and displayed by it.

Hardware Overview

Figure 8:
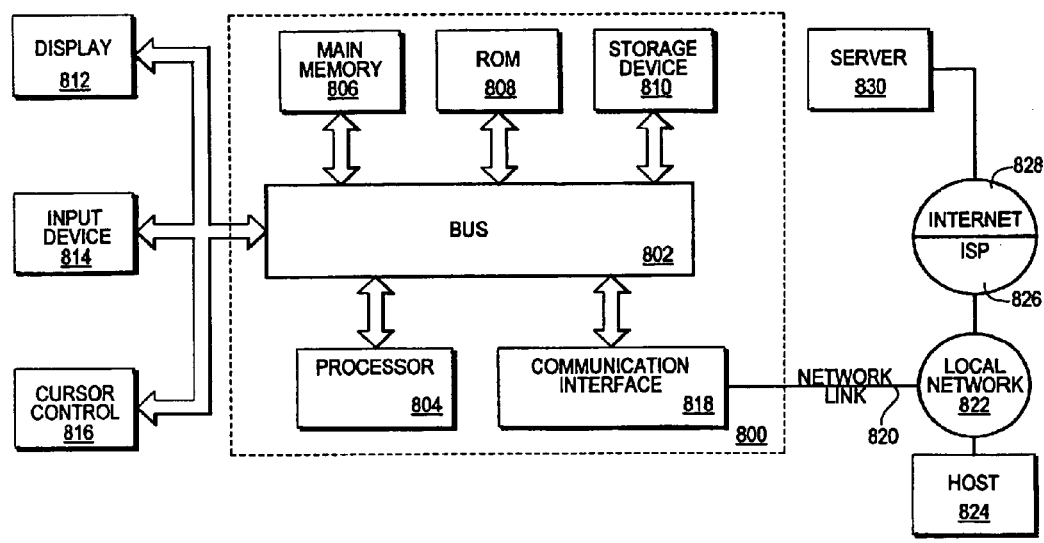
FIG. 8 is a block diagram of a computer system that can be used to implement the present invention.

FIG. 8 is a block diagram that illustrates a computer system 800 upon which an embodiment of the invention may be implemented. The system of FIG. 8 is directed to the above-described embodiments for the resolution of Web page resources using telephone numbers. One skilled in the art will appreciate that the system of FIG. 8 can be modified appropriately using known methods and components to accomplish resolution of other resources as described above, e.g., mobile telephones, PDAs, etc.

Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing a telephone number-based network resource locating system. According to one embodiment of the invention, network resource locating is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector coupled to bus 802 can receive the data carried in the infra-red signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for a language-independent network resource naming system as described herein.

The received code may be executed by processor 804 as it is received, and/or stored in storage device 810, or other non-volatile storage for later execution. In this manner, computer system 800 may obtain application code in the form of a carrier wave.

Variations; Advantages

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Other embodiments of the invention relate to a system, and a method for facilitating secure on-line communication using uniform address as one of the parameters.

DEFINITIONS

Secure layer protocols: Secure Sockets Layer (SSL); Microsoft® Passport single sign-in (SSI); other similar.

URL. URL (Uniform Resource Locator) is a unique identifier (such as IP address, Keyword, telephone number or DNS etc.), which uniquely identifies network resources.

IP address. IP (Internet Protocol) address is a numeric URL and represents a layer beneath DNS system; IP addresses are unique by definition; IP addresses may have DNS names assigned for them. The DNS name or Keyword cannot be used if there is no IP address assigned for it.

UTA (Uniform Telephone Address). UTA is a telephone number assigned for networking Target. Each Target has only one UTA assigned for it and therefore each UTA uniquely identifies particular Target. Each UTA has at least one Number File assigned for the UTA and associated with it. UTA system is a URL layer over phone number, IP address and DNS systems. UTA is compatible with Keyword system by RealNames. UTA can be assigned to any networking Target including Internet web resources and telephone fixed or mobile lines.

UTA's Target. Target is a web enabled networking object of any nature such as hardware (such as computing device/appliance, media, chip/processor), software (such as web browser, instant messenger, e-mail enabling software etc.), data (such as web site, page etc.), wave frequency, modulation, division or their composition (for example particular Radio station). Each Target is enabled to require network to assign URL for it. There is only one unique UTA assigned for each Target.

IP address locating Target in the Internet is called Primary IP address and Primary Number File belongs to Target and accessible at Primary IP address. All Targets have web-enabling means such as web server, web browser, and other hardware/software to enable Target managing Primary Number file, connecting, communicating and exchanging via Internet. For Target's Primary number file there should be assigned preferably two mirror copies called Default and Secondary Number files; the files are being located and accessible on-line at Switch and ISP servers accordingly.

Dynamic and Static IP addresses (URLs) and roaming mobile IDs. Each Target can be accessed in the network by using its URL. In the Internet Targets usually have static IP address assigned for them when using leased line (DSL, T1, etc); dial-up or mobile (roaming) Targets usually have temporary dynamic IP address assigned for them through DHCP (Dynamic Host Configuration Protocol) while Target is connected to particular ISP or cell. When roaming, mobile devices numbers are mapped and devices serviced by using such wireless roaming standards as ANSI-41 and GSM-MAP.
ANSI-41

ANSI-41 provides support for roamers visiting your service area, and for your customers when they roam outside your area. When a visiting roamer registers in your service area, for example:
  Using the roamer's MIN/ESN, your mobile switching center (MSC) visiting location register (VLR) determines the appropriate MSC home location register (HLR) for routing.
  Your MSC directs the message through SS7 network and, if appropriate, through our gateway access to other SS7 networks, to the home MSC/HLR for validation.
  The caller's MSC/HLR validates the roamer and sends a response allowing calls to proceed.
When your customers roam outside your service area, the process is the same, but messages flow through the network to your MSC/HLR.

GSM-Map

Much like ANSI-41, GSM-MAP allows for transport of crucial MSC/HLR/VLR registration and seamless roaming data between you and your roaming partner's GSM network, and this message protocol also provides instant access to advanced SS7 related offerings such as Number Portability.

One area in which GSM-MAP and ANSI-41 transport differ is in the area of roamer administration. GSM-MAP networks rely on an International Mobile Station Identifier (IMSI), as opposed to the Mobile ID Number (MIN) used in ANSI-41. The IMSI is a 15-digit identifier, which is made up of the Mobile Country Code (MCC) representing the roamer's home country, the Mobile Network Code (MNC) identifying the home network provider of the user, and lastly the Mobile Station Identification Number (MSIN), which identifies the actual mobile unit.

When a visiting roamer registers in your service area, for example:
  The roamer's phone is turned on in your service area; your VLR launches a Registration request to the roamer's HLR. Each HLR is identified via a Mobile Country Code and Mobile Network Code.
  The HLR responds to your serving VLR and your VLR, in turn, notifies the MSC of the roamer's profile.
The roamer is now registered in your service area.
When your customers roam outside your service area into roaming partners' GSM networks, the process is the same, but messages flow through the network to your MSC/HLR.

UTA's Default, Primary and Secondary URLs. UTA Primary URL is an address locating UTA's Primary Number File associated with Target itself in the Internet. UTA Secondary URL is a URL locating UTA Secondary Number File (the minor copy of Primary Number File associated with ISP location) in Internet. Secondary Number File is preferably kept at ISP web site. UTA Default URL locates UTA Default Number File which is kept at Switch web server. Secondary URL and Default URL are used preferably while target is off-line, i.e. is not accessible by its Primary URL, and for check and verification purposes.

UTA Number file. Number file is described in detail in U.S. patent application Ser. No. 10/085,717 which is the parent to this CIP. Such a number file is assigned to a particular UTA designating Target.

UTA Default, Primary and Secondary Number files. Number file contains Metadata, associated with UTA. Number file is preferably XML based RDF, CC/PP data file. Default number file is located at Switch server Default URL, which is described below. Primary number file is located at Target Primary URL and the Secondary number file is located at ISP Secondary URL. There could be Tertiary and further URLs providing different or distributed Internet services & connectivity; accordingly they are associated with Tertiary and further number files. Primary Number file preferably contains three URLs i.e. for Default, Primary and Secondary URLs. The Default URL is always the Switch server Primary URL. The Secondary URL is always the Target ISP's Primary URL. Both Default and Primary URLs are provided to Targets when subscribing and stored into Primary Number file during installation or dynamically when connecting to the network. Both Default and Secondary Number files are minor copies of Primary Number file.

UTA Number file metadata content: The Metadata preferably use XML and compatible RDF, CC/PP and other formats and may contain next data associated with the Target:

Telephone Number (UTA).
Primary URL. Primary URL is not nil if Target is "on-line", and is nil for "off-line" Target.
Secondary URL
Default URL
Authorization Center Primary URL
CA Primary URL (if different from Switch)
Network Security Primary URL
Authorization Center UTA
CA UTA
Network Security UTA
Primary (Switch) Public Key
Secondary (originating ISP) Public Key
Authorization Center Public Key
CA Public Key (if different from Switch)
Network Security Public Key
On-line status. On-line status data is Primary URL derivative.
Current status of device resources available and required
Purchased resources and current status of purchase
Data related to Network Security policy, contain financial or banking data, e-wallet, proxies, access authorization, authentication and identification datasets, biometric datasets other etc.
User preferences (regular telecom services such as Caller ID, order and terms to switching to order facilities such as text mode, instant messaging mode, SMS mode etc)
Methods and protocols access verification and authorization
Other metadata disclosed in the parent to this CIP application
Other data provided by third parties such as Microsoft Passport or VeriSign certificates etc.
CA (Switch) Digital Certificate (preferably includes all PNF fields with permanent values)
Authorized privileges for Public key cryptography (preferably is a part of DC)
Target' Secure Area Metadata:
Credit Card Record
Bank account information
Secure private key file for Public key cryptography
Password for disposable handset use

Target on-Line Status Check: IP Address "Ping" Command Description

The "ping" command or similar command checks on-line accessibility of particular Target at its IP address. Ping is accessible in manual mode in Windows using prompt Start—Programs—Accessories—Command Prompt. To ping the IP or URL the command string shall be:

ping <IP address>
or
ping <DNS name>
Here is the ping command example:
Microsoft Windows 2000 [Version 5.00.2195]
(C) Copyright 1985-2000 Microsoft Corp.
C:\>ping www.names.ru
Pinging www.names.ru [212.24.32.169] with 32 bytes of data:
Reply from 212.24.32.169: bytes=32 time<10 ms TTL=121
Reply from 212.24.32.169: bytes=32 time=10 ms TTL=121
Reply from 212.24.32.169: bytes=32 time=10 ms TTL=121
Reply from 212.24.32.169: bytes=32 time<10 ms TTL=121
Ping statistics for 212.24.32.169:
Packets: Sent=4, Received=4, Lost=0 (0% loss),
Approximate round trip times in milli-seconds:
Minimum=0 ms, Maximum=10 ms, Average=5 ms
C:\>

Web server. This is networking firmware or software installed on particular Target; usually web server provides Internet connectivity, data & script computing, etc. Web server is SSL enabled and therefore supports Public key encryption infrastructure (PKI) and procedures, it can generate Certificate Signature Request (CSR), Public and Private keys, search, retrieve, receive and store Digital Certificate issued by Certification Authority (CA). It can also operate within PKI operating as Mover or Target for the infrastructure. Web server can be firmware—just a chip such as ACE1101MT8 or PIC12C509A/S N (http://world.std.com/~fwhite/ace/) or software. Web server is always a part of Target but Target may have no web server.

Web browser. This is networking hardware or software. Web browser provides a set of functions that may vary but shall provide at least next functions: addressing & locating Targets in Internet and web enabled communication networks; connecting to chosen Target; screening the Internet static content (HTML, XML, etc.); screening and scoring/visualizing Internet dynamic content & live on-line voice & video exchange using voice & video over IP technology (dynamic mark-up languages, streaming data, voice &video over IP etc). Web browser is SSL enabled and therefore supports Public key encryption infrastructure (PKI) and procedures, it can generate Certificate Signature Request (CSR), Public and Private keys, search, retrieve, receive and store Digital Certificate issues by Certification Authority (CA). It can also operate within PKI operating as Mover or Target for the infrastructure.

UTA Subscription Authority. SA is an authority, which keeps central UTA repository, providing registration, management and resolution services for UTA and associated Number Files. Switch server is a data management engine at SA site.

Certification Authority. CA is an central PKI authority, providing Digital Certificates for UTA Number Files and related SSL services. The CA is preferably the SA.

Switch server. The Switch is Internet server providing on-line connectivity services for subscribed and non-subscribed Targets. Switch is a Central Target and keeps Default Number files providing Default URLs for each one. Being a Target, the Switch server has got its own Default, Primary and Secondary Number files. Local area network may have local LAN Switch. This unit controls UTA call routing between the LAN and external network as shown in FIG. 16.

Network Security file. Switch server and ISP may implement and apply Security policy for chosen or all IP communications, connections, calls and transactions. The Policy data are stored in Network Security file available at both Switch and ISP, Default and Secondary Network Security file. Security File may have UTA assigned for it and therefore can be reached in the network by using the Security UTA. Such UTA may be a well-known number like 911 or other local assigned numbers such as 01, 02 and 03 in Russia, etc.

On-line status. For the purposes of the patent application the "on-line status" term is understood as accessibility of particular Target through the web by using its UTA Primary URL (Status is "on-line") and the "off-line status" term applies to the Target, which is not accessible at its UTA Primary URL (the status is "off-line").

Mover. Mover is a Target initiating IP call, trying to connect to other Target by using Target's UTA. The calls can be performed via Internet as hardware-to-hardware, hardware-to-software, software-to-hardware, and software-to-software IP calls. Mover can provide Target its caller ID and other metadata from Mover Primary Number file. Mover can be anonymous entity.

IP call. IP call is an Internet connection between Mover and Target for data, voice & video point-to-point exchange via Internet using TCP/IP, voice & video over IP technology, other relevant web-enabling means. It can be made as wireline-to-mobile; mobile-to-wireline; mobile-to-mobile calls the present invention claims browser-to-wireline; browser-to-mobile; mobile-to-browser and wireline-to-browser, where mobile is understood as both cell and satellite communication. In secure mode the IP call may use known encryption methods such as RSA, Diffie-Hellman and other, SSL, MS SSI and PKI.

Service Provider or ISP. ISPs are Internet and web enabling communication network Service Providers. Being a Target, each ISP may have its own Default, Primary and Secondary Number files.

Point Of Sales (POS). POS is a UTA node in communication network, providing sales, exchange and transactional services. Each POS may have UTA assigned for it and therefore may be addressed via web-enabled networks.

Implementation

Use of preferable authentication standard means. X.501 recomendations; X.509 directory services; X.519 directory access protocol; Preferably using IETF Kerberos (http://www.ietf.org/html.charters/krb-wg-charter.html); Cryptographic Message Syntax (CMS); other Digital certificates, encryption issues: Internet X.509 certificates PKI can be used in conjunction with IETF "Use of ECC Algorithms in CMS" http://search.ietf.org/internet-drafts/draft-ietf-smime-ecc-06.txt specification to distribute agents' public keys. The use of ECC algorithms and keys within X.509 certificates is specified in L. Bassham, R. Housley and W. Polk, "Algorithms and Identifiers for the Internet X.509 Public Key Infrastructure Certificate and CRL profile", PKIX Working Group Internet-Draft, November 2000.

FIPS186-2, "Digital Signature Standard", National Institute of Standards and Technology, Feb. 15, 2000.

SECG, "Elliptic Curve Cryptography", Standards for Efficient Cryptography Group, 2000. Available from www.secg.org/collateral/sec1.pdf.

Financial and transactional services: Preferably implement and use ANSI X9.62-1998, "Public Key Cryptography For The Financial Services Industry: The Elliptic Curve Digital Signature Algorithm (ECDSA)", American National Standards Institute, 1999; Electronic Commerce Markup Language (ECML)

Primary Number File (PNF) creation. When a user subscribes for the first time to the UTA product & service, the user provides all necessary information including his UTA to the Subscription and Certification authorities and the latter form the Primary Number File. To enable the user to use PNF for transaction and SSL services, CA issues a Digital Certificate (DC) to enable SSL and PKI. Public part of information for PKI is being stored into UTA PNF and available to other PKI users and the private part is being stored securely at Target's memory. DC is signed by CA Private key and contains at least UTA and Target's Public key. The digital certificate complies with the X.509 format; and the UTA is contained in an X.509 extension.

Primary URL assignment and Primary Number file synchronization: Each time when Target enters a network, ISP assigns for it Primary URL; upon assignment this URL is then preferably provided to Target and stored in metadata in Primary Number file; Primary URL record is then preferably stored in Secondary Number file (at ISP) and in Default Number file (at Switch). While entering the network, Switch preferably authenticates Target using DC; Target then synchronizes Primary Number file entries with Secondary and Default Number files. To do so Target takes Secondary and Default URL from PNF and connects to the Secondary and Default Number Files; when connected Target starts metadata synchronization. To authorize and verify Targets and to prevent impostor from entering network resources, the Switch, ISP or any other SSL enabled entity can retrieve Digital Certificate from PNF and decrypt it using CA Public key receiving at least original UTA and Target's Public key; then exchanging via SSL the checking entity can ensure that the user does not personate the Target and the Target has appropriate privileges.

Updating Secondary and Default Number files: ISP continuously and timely updates Secondary number file by connecting to Primary or/and Default number files. Target's "on-line status" can be also checked through regular means of telecommunication service providers and then converted to number file format, stored into Secondary Number file.

Updating Default Number file:

Method 1: Switch server continuously and timely updates the Default Number files with data taken (Switch pulls) or received (ISP push) from Target's Secondary Number files; when call for particular Target is received, Switch server checks this Target's Primary URL in Default number file and if the latter is not nil Switch connects to it; If connection fails Switch terminates the call and sets Default Number file Primary URL field to nil and its status field to "off-line". Otherwise the Target' "on-line status" can be got using ISP's own means and then retrieved from ISP to Switch server for each particular Target. As optional the Switch server can be set to ping continuously all subscribed targets using their Primary URLs and checking this way their "on-line status" continuously. Each time when on-line status check is complete, the Switch updates the status in the Default number file for each Target/UTA.

Method 2: While entering network each Target connects to Switch server and synchronizes its Primary Number file with Default Number file metadata. Switch server continuously and timely communicates with each particular Target and updates the Default Number files with data taken (Switch pulls) or received (Target push) from Target's Primary Number files; when call for particular Target is received, Switch server retrieves Target's Primary URL from Default Number File and if the Primary URL is not nil Switch connects to it; If it is nil or connection fails Switch terminates the call and sets Target's Primary URL field in Default Number file to nil and its status field to "off-line".

Making outgoing IP call: When Target's UTA is entered into Mover's Internet browser address bar or other web enabling interface, the Mover connects and communicates with the Switch server as disclosed in the parent of this CIP, and receives Target's metadata from Default Number file; if the UTA's Primary URL is not a nil, Mover attempts to access UTA (Target) by using UTA's Primary URL taken from Target's Default Number File; if the Primary URL is valid and Target responds, the Mover and the Target provide their Digital Certificates to each other and make network security policy check; depending on policy Mover can access Target's Primary number file, and vice versa Target can check Mover Primary number file; Mover and Target compute security data applying security policy; accessing and exchanging data with the Target if privileges allow. Preferably IETF Session Initiation Protocol or similar to be used for exchange between Mover and Target.

When the Target's Primary URL is valid and Mover is calling to Target, but Target does not answer the call, the browser attempts to leave a message in device memory;

When the Primary URL is not valid or nil the browser retrieves Secondary URL and attempts to locate the Secondary Number File and etc. and when responding sequential URL is found the web browser allows composing and leaving there a message of any kind.

Answering incoming IP call: When IP call is received; Target automatically turns into "answer"/"deny" or other applicable mode, rings or otherwise indicates the incoming call; The Target attempts to retrieve Mover's UTA and Digital Certificate from Mover Primary Number file; Target can check UTA and Digital Certificate validity and Target's privileges using PKI. Target then makes a decision to allow or deny Mover' connection in accordance with security/calling policy, privileges and preferences of both parties provided in Number File's metadata and Digital Certificates. If secure call is requested then both parties encrypt the exchange using SSL and PKI, their Private and Public keys. The secure mode allows purchase, payment and other secure transaction services. When check, verification, authentication is complete preferably IETF Session Initiation Protocol or similar to be used for exchange between Mover and Target.

Enabled and Disabled calling ID lists. Each particular Target has a list of other networking Target' IDs related to the particular Target somehow (i.e. telephone number list of friends, partners, relatives etc.). The list can be divided at least in preferably parts: Those Targets, which are not allowed to see on-line status of the particular Target; Those Targets, which are allowed to see the particular Target's on-line status; those Movers which are not allowed to call to the Target; those Movers which are allowed to call to the Target etc. Therefore each Mover can check and receive "on-line status" for only those Targets who allow the Mover to check it. Before calling to particular Target Mover can check whether the Target is on-line and can save calling time if the Target is currently off-line.

Issuance of Digital Certificate (DC) for UTA/Target. When UTA Subscription Authority creates and registers UTA associated with particular Target, and creates Primary Number File for the Target, the Certification Authority (CA) creates a Digital Certificate (DC); to allow DC creation the Target shall be SSL enabled and:

The Target provides completes all required fields of Primary Number File (preferably all PNF fields with permanent values) and generates Certificate Signature Request (CSR) file, Public key and Private key; The Private Key is being securely stored at the Target's memory;

The Target provides its CSR and Public key to the UTA CA for signature

The Public key file and UTA Primary Number File are being encrypted (signed) by CA (Switch) with CA Private Key, and the encrypted message represents a UTA Digital Certificate;

The CA signs the CSR and returns it to the Target as Target's Digital Certificate (DC). The DC includes UTA, and the digital certificate is digitally signed by the CA.

The Target stores the DC in the Target Primary Number file and makes it available for SSL procedure.

Verification and authentication are used to prevent impostors from entering network and particular Target resources using particular Target's PNF, the digital Certification Authority, Switch or Target:

Simple authentication in non-secure mode (SSL is disabled): Takes UTA from Mover's Primary Number File; retrieves Default, Primary and Secondary Number Files for Mover's UTA; verifies Mover's UTA by comparing key data from Secondary and Default Number Files with those in Primary Number File; if verification is complete successfully the Mover is authorized to use requested services and the Target is provided with verification from Switch;

Strong authentication in secure mode (SSL is enabled) where Target A (A) authenticates Target B (B):

B:
  encrypts the Dataset B using Private Key B forming Dataset B1
  composes a check message containing DC B and Dataset B1
  transmits the check message to A; and A:
  Retrieves DC B and Dataset B1 from the check message
  Decrypts DC B using CA (Switch) Public Key
  retrieves Dataset B and Public Key from the decrypted B's DC
  decrypts the Dataset B1 using Public Key B forming Dataset A
  compares the Dataset A with Dataset B and if the Dataset A is identical to the Dataset B the A makes decision that B possesses correct CA's certified Private Key B and the verified Dataset B, therefore B is authentic;

Where Dataset B is preferably a part of DC B and preferably the UTA B; or other DC B fields, or some or all the DC B fields; or DC B itself.

Other similar/applicable authentication procedure can be set up based on particular cryptography use.

Verification authentication and authorization by Target. To authorize and verify Movers, and to prevent impostors from entering Target resources personating/using particular Mover's PNF, the Target via SSL Retrieves Digital Certificate from the Mover's Primary Number File; decrypts the DC with CA (Switch) public key; checks validity of the DC; authenticates the Mover; allows Mover to connect to Target based on Mover's privileges if the check is successful and denies connection if the check failed.

Verification authentication and authorization by Mover. In order to verify that a connection made to valid Target and not to an impostor, and to prevent impostors from entering Movers resources using particular Mover's PNF, when connecting to Target, Mover retrieves Target's DC from Target's PNF; decrypts it by using CA (Switch) Public Key; verifies Target's UTA and checks Target privileges.

Secured Transaction Services Between Targets Representing Buyer and Seller.

IP transaction services can be provided based on applicable Network Security policy and user's privileges using Secure Socket Layer (SSL), PKI and UTA CA services. The Public key cryptography allows verifying UTA though Public key cryptography infrastructure. SSL (secure socket layer) enables PKI usage for secure on-line e-commerce, banking etc. transaction services, data and live interaction exchange. All are based on the use of DC and its content. The payment between Buyer and Seller can be processed using procedure similar to credit card payment authorization procedure described below:

Purchase Message

"Purchase message" is a message composed by a Buying Target. "Purchase message" contains preferably
 Seller DC
 Seller Primary URL (optional)
 Purchase data (currency and money values, time of purchase, purchase/transaction number and other appropriate purchase information) "Purchase message" is agreement to buy, digitally signed i.e. encrypted using Buyer's Private Key.

Charge Message

"Charge message" is a message composed by a Selling Target. "Charge message" contains preferably
 Buyer DC
 Buyer Primary URL (optional)
 "Purchase message" signed using Buyer's Private Key.
 Purchase data (currency and money values, time of purchase, purchase/transaction number and other appropriate purchase information)
 "Charge message" is agreement to sell, digitally signed i.e. encrypted using Seller's Private Key.

Authorization Message

"Authorization message" is a message composed by an Authorization Center. "Authorization message>> contains preferably
 Buyer DC
 Buyer Primary URL (optional)
 "Purchase message" signed using Buyer's Private Key.
 Purchase data (currency and money values, time of purchase, purchase/transaction number and other appropriate purchase information)
 "Authorization message" is an authorization, digitally signed i.e. encrypted using Authorization Center's Private Key.

"Pay" Authorization Method comprising the steps:
Establishing wired or wireless connection between the Buyer and Seller
Displaying or otherwise indicating the Name of purchase and the value of purchase, other appropriate purchase/transaction data to the user
Waiting to receive the Buyer's authorization for purchase and if authorization is granted:
Executing preferably Strong Buyer/Seller cross-authentication in secure mode
If Seller and Buyer are authentic, Buyer:
 Composing "Purchase message"
 Connecting to the Authorization Center using Authorization Center Primary URL
 Executing Strong cross-authentication with the Authorization Center in secure mode if applicable
 Transmitting the "Purchase message" to the Authorization Center
The Authorization Center
 decrypts the "Purchase message" using Buyer's Public Key taken from Buyer's DC during authentication AND
 Authorization Center
  composes the "Authorization message"
  transmits the "Authorization message" to the Buyer
  Buyer transmits the "Authorization message" to the Seller
  the Seller decrypts the "Authorization message" using Authorization Center's Public key
 OR Authorization Center
  resolves via Switch the Seller Primary URL using Seller UTA taken from Seller DC; OR takes Seller Primary URL from "Purchase message"
  connects to Seller using Seller Primary URL
  authenticates the Seller and if Seller is authentic:
  verifies the purchase parties and data
  composes the "Authorization message"
  transmits the "Authorization message" to the Seller
  the Seller decrypts the "Authorization message" using Authorization Center's Public key
 the Seller allows the purchase if the payment is authorized "Charge" Authorization Method
The method includes these steps:
Establishing wired or wireless connection between the Buyer and Seller
Displaying or otherwise indicating the Name of purchase and the value of purchase, other purchase/transaction data to the user
Waiting to receive the Buyer's authorization for purchase and if authorization is granted:
Executing preferably Strong Buyer/Seller cross-authentication in secure mode
If Seller and the Buyer are authentic, Buyer:
 Composing "Purchase message"
 Transmitting the "Purchase message" to the Seller; The Seller:
  decrypts the "Purchase message" using Buyer's Public Key taken from Buyer's DC and verifies the purchase data if applicable to policy and if purchase data is correct
  composes "Charge message"
  connects to the Authorization Center using Authorization Center Primary URL
  Executing Strong cross-authentication with the Authorization Center in secure mode if applicable to policy and if cross-authentication succeeds,
  transmits the "Charge message" to Authorization Center; the Authorization Center:
   decrypts the "Charge message" using Seller Public Key and retrieves and decrypts "Purchase message" using Buyer's Public Key taken from Buyer's DC
   verifies the purchase parties and data
   composes "Authorization message"
   transmits "Authorization message" to Seller
   the Seller decrypts the "Authorization message" using Authorization Center's Public key
 the Seller allows the purchase if the payment is authorized Credit card record. The credit card record (CCR) is typical credit card record. The CCR is typically recorded on the credit card magnet stripe or in the smart card internal memory or in another credit card memory.

Credit card authorization method. In order to use credit card for on-line transactions the CCR must be taken from the credit card and saved in the Target' secure area metadata. Then CCR is used as described in Authorization methods. If it is required by particular Credit card system (such as VISA, MasterCard or other) to change CCR when authorizing particular transaction, the changed CCR is being changed by the Credit Card system and returned to the Target encrypted using the Target Public Key, then the received CCR is decrypted by the Target using its Private Key and stored in the Target' secure area metadata for further use.

Bank account charge method. Bank account charge can be deployed in a way similar to the Credit card authorization method.

Temporary UTA. In order to reduce cost per call and increase service accessibility & flexibility, Temporary Digital Certificates containing UTA can be issued by CA (Switch) and used for web-enabled disposable telephone handsets and web browsers or other networking objects/Targets all further called Temporary Targets (TT); they all can serve as temporary Targets or Movers in the network. CA (Switch) issues UTA and UTA DC; transfers the UTA and DC directly to Temporary Target Number File or to reseller; and the reseller assigns the UTA/DC to particular temporary Target Primary Number File.

Such disposable handsets may use Transaction, Text, Voice & Video over IP exchange only and be sold and set up for use with or without assignment of static (permanent) network UTA (telephone number) for them. When purchased handset is turned on, it prompts user: to manually type/use particular preset UTA, or set to automatically choose a dynamic UTA provided by network.

Semi static UTA mode: If user chooses to use particular UTA, a handset preferably requires to type a "Password for temporary UTA" to verify the user's rights to use the UTA (the Password is similar to Personal Identification Number for GSM SIM card); when the password is stored, handset connects to UTA issuing authority' (CA, Switch, ISP, reseller etc) server via SSL and verifies the "Password for temporary UTA" OR verifies the Password with the encrypted Password record contained in the Handset secured memory area; if the check is successful, the user is granted access to network resources using chosen UTA and is treated as an original UTA user; if the check fails the handset can be denied, blocked or reported stolen based on security policy; OR Particular UTA with DC can be assigned and valid through a standard period of time or number of connections/transactions for the handset/software and if assigned, such UTA shall be typed (it may be preset to appear in interface when handset is turned on) and should be confirmed for use by the user;

Dynamic UTA mode: When after purchase user turns on a handset for the first time, the handset connects via Internet to the Switch server; Switch server registers the handset in the network and assigns dynamic UTA and temporary Default Number File for it; Default Number File is a copy of Primary Number File; the dynamic UTA can be used only for duration of each particular call unless the user requires to hold the UTA for a standard period of time or based on other standard terms of use. Dynamic UTA is revoked after the call is disconnected or assigned and held for the handset for standard period of time if required by user. In order to get the UTA, handset shall be enabled to update its Primary Number File with the particular UTA and the CA shall issue a DC containing the UTA and assign it to the handset as described above.

PNF as Digital Identity Dataset. PNF can be used as a Digital Identity Dataset including all identifying information required for particular verification, authentication, and authorization and transaction purposes.

Session encryption using new shorter Key pair. In order to accelerate encryption of on-line audio and video streams Targets may use Shorter session Key-pairs.

To do so, each Target:
issues new pair of shorter Keys (public and private)
Private Key is to be stored safely in Target' internal memory and used only for the one session
each Target encrypts the new shorter Public Key with the Sending Target Original Private Key or with Receiving Target Original Public Key and transmits the encrypted message to the Receiving Target
Receiving Target decrypts the received message containing the new shorter Public Key of the Sending Target and uses the received Sending Target Public Key to encrypt/decrypt the session exchange with Sending Target.

It is understood that in Public Key Infrastructure Targets can encrypt a message (stream):
using the Receiving Target Public Key and the Receiving Target decrypts the message using its Receiving Target's Private Key
using the Sending Target's Private Key and the Receiving Target decrypts the message using Sending Target's Public Key Business model 1: selling UTA, which is valid for a period of time or number or fixed money value of services provided etc.

Business model 2: selling Digital Certificates where UTA is a main verifiable part and privileges contain terms of use based on a time period or number or fixed money value of services provided etc.

Business model 3: Selling PNF with permanent UTA for permanent Targets or without permanent UTA for Temporary Targets.

Business model 4: Selling media (SIM cards for GSM and later 3G standards, CD, DVD, or other media) with PNF files recorded on the media.

Business model 5: Selling record able memory chip or processor (SIM cards for GSM and later 3G standards, CD, DVD, or other media) with PNF files recorded on the memory.

Business model 6: Selling PNF as a Digital Identity Dataset. Business model 7: Selling UTA and/or Number File resolutions (on per resolution charge basis).

Business model 8: Selling UTA and/or Number File data to third party (on per provision charge basis).

Business model 9: Selling UTA and/or Number File authentication services (on per authentication charge basis).

Business model 10: Selling UTA and/or Number File charge authorization services (on per authorization charge basis).

Business model 11: Selling UTA Software Development Kit (SDK) realizing functionality of all described methods.

Figure 14:
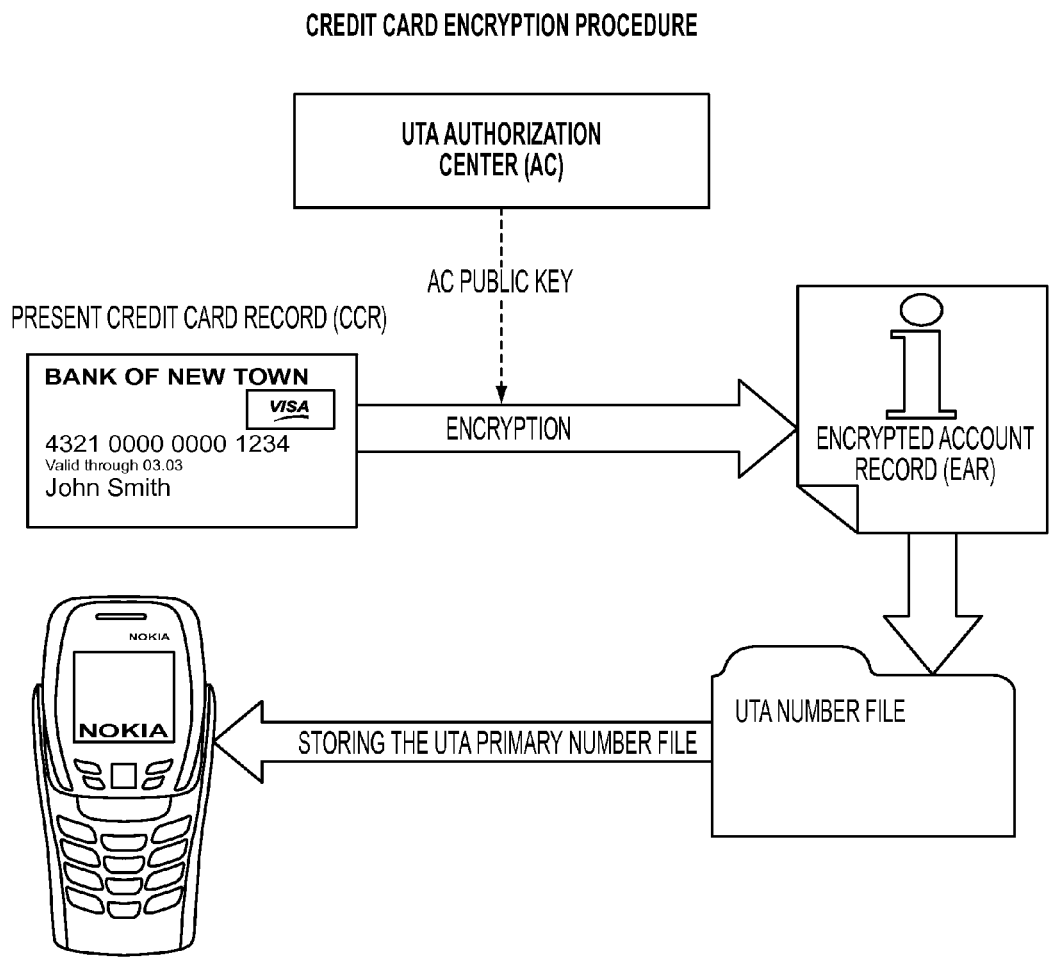
FIG. 14 is a diagram of a credit card encryption procedure in accordance with an advantageous embodiment of the present invention.

One skilled in the art would also appreciate the possibility of using CCR (or bank account details) encrypted using AC Public key as shown in FIG. 14. This implementation, provides the possibility of limiting to one the parties capable of reading the CCR and this entity being the authorization center. Therefore, this implementation provides sustainable secure charge service and permanent theft protection with the highest level of security. Another feature, is that this allows the use of regular existing credit card charge authorization infrastructure of major CCR (FIG. 15), and, therefore, makes the implementation of such authorization scheme very inexpensive. Using E-UTA-CCR provides double strong authentication possibility, comparing UTA taken from E-UTA-CCR and UTA taken from DC.

One skilled in the art would appreciate the possibility of using Account Record (AR) encrypted using AC Public key and thus forming EAR. This implementation provides the possibility of limiting to one the number of parties capable of reading the AR and this entity being the authorization center. Therefore, this implementation provides sustainable secure charge service and permanent theft protection with the highest level of security. The use of AC Public key for CCR encryption also allows any third party to encrypt the AR using the AC Public key and thus allows unlimited number of third parties to securely encrypt Account Records securely linking up with AC services this way.

Figure 15:
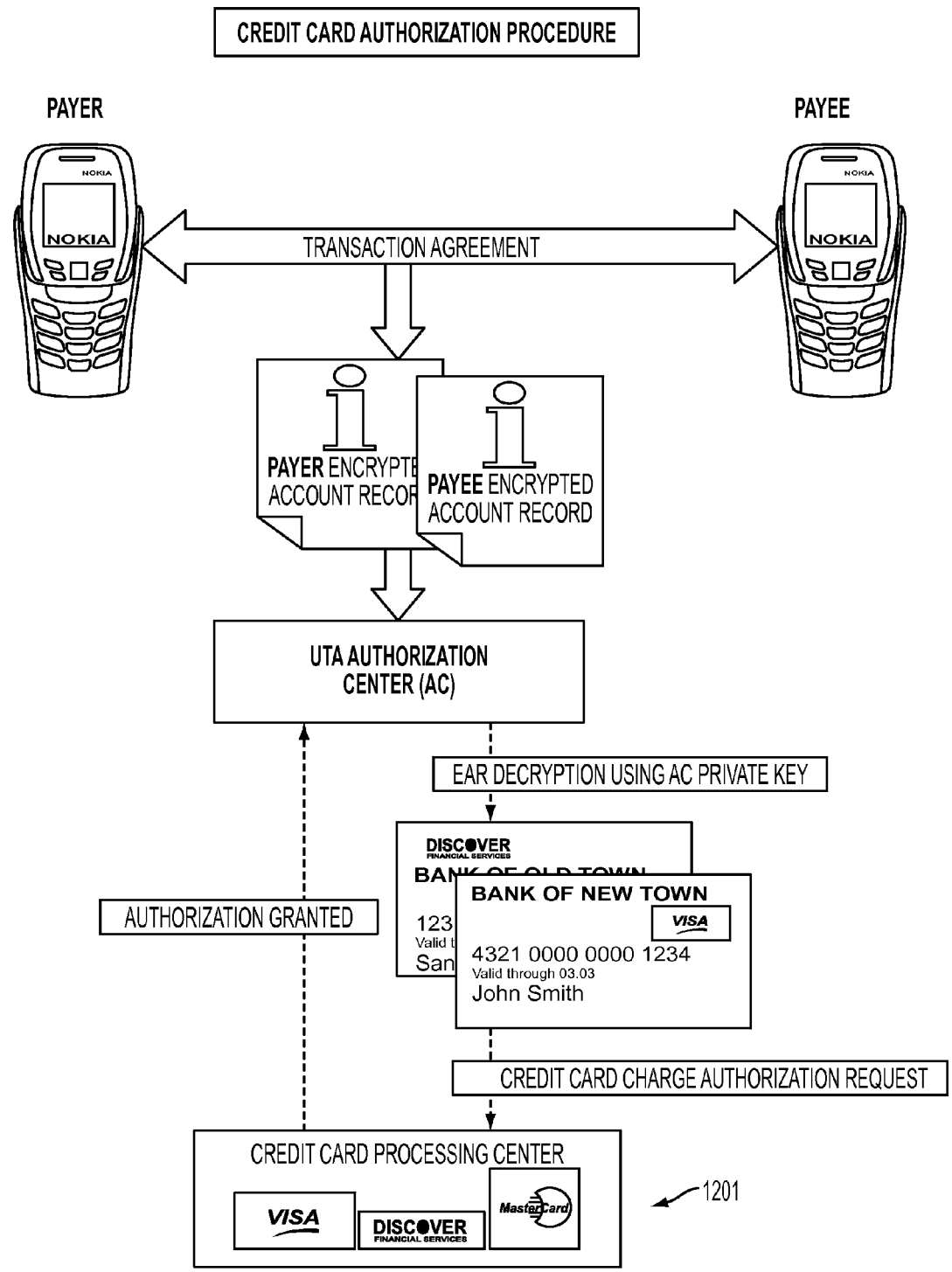
FIG. 15 is a diagram of a credit card authorization procedure in accordance with an advantageous embodiment of the present invention

One skilled in the art would also appreciate that due to the issuing of the ADC (which comprises the network resource UTA, the network resource Public key and the network resource EAR), the AC/CA becomes capable of "on-the-fly" authentication of a particular network resource and verification of the network resource's rights to use the particular EAR, thus securely mapping the particular network resource to the particular EAR and providing secure transaction services (see FIG. 15). Consequently AC/CA does not need to set up, run and securely manage a database mapping each particular CCR to each particular network resource UTA, and, therefore, the scheme allows AC/CA to be free from all database related expenses. On the other hand, the absence of the database allows AC/CA transaction services to be free of security failures associated with the database security and private data management.

Another feature is that EAR allows the use of regular existing credit card charge authorization infrastructure of major CCS block 1201 in FIG. 15, and, therefore, makes the implementation of such authorization scheme very inexpensive, virtually limiting AC/CA credit card authorization means to one regular CCS POS terminal having single CCS merchant account.

Using EAM along with DC provides a separation of certification and authorization responsibilities and distribution of said services without reducing the security level of the provided transaction services.

The EAR independence on the account nature (bank or service provider, or credit card system account, fingerprints or other biometric measures, tax IDs and data, social security data etc.) makes the method uniquely uniform for the accounts of any nature including, without limitation, bank accounts, Credit Card System accounts, service provider accounts, biometric and other accounts that are applicable.

Another feature of particular network resource PIN code or Password encryption using the network resource Public key allows the network resource to establish and independently compose and manage a password as a theft protection means, protecting the use of the network resource for transaction purposes.

Transaction Infrastructure

Figure 10:
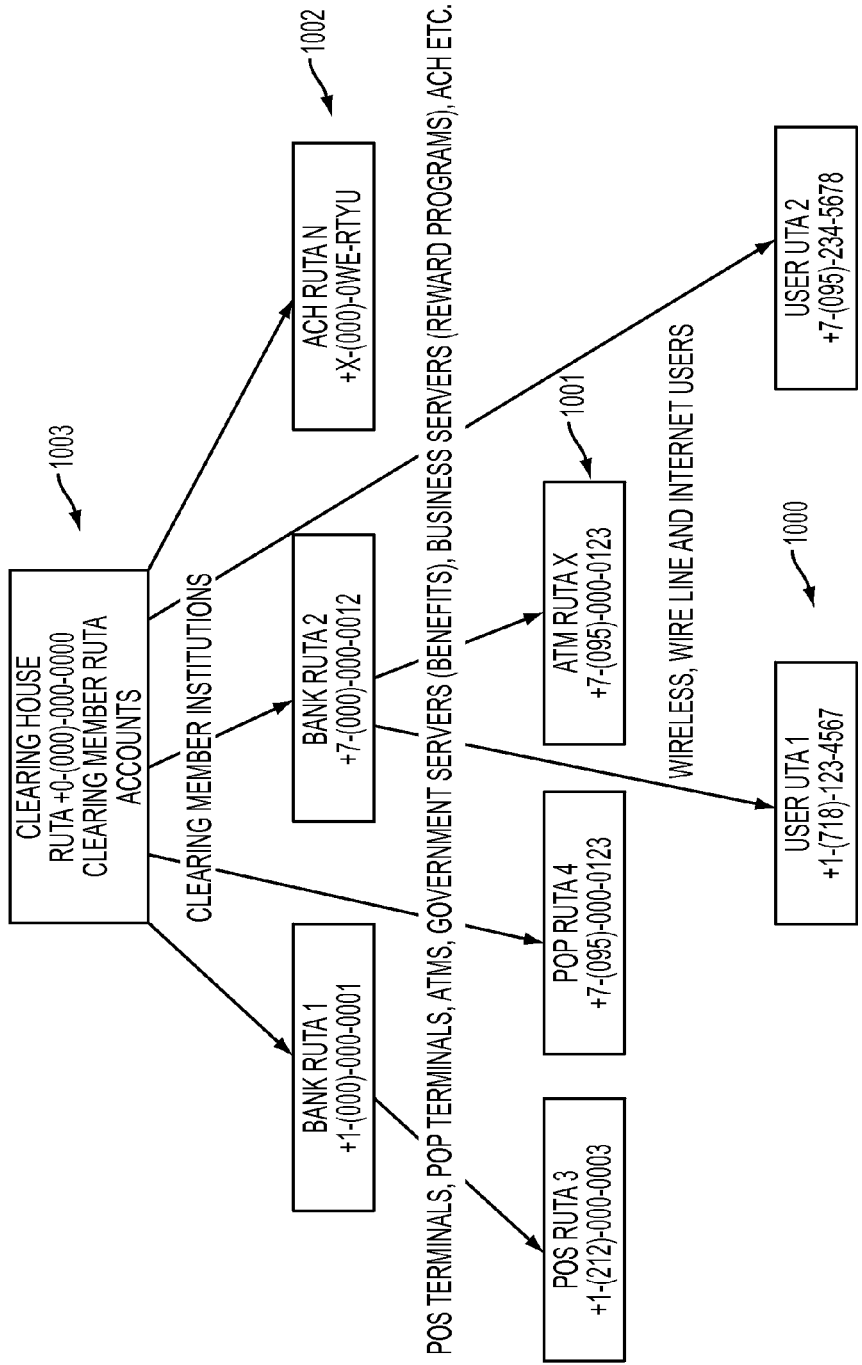
FIG. 10 is a block diagram of an UTA system financial structure in accordance with an advantageous embodiment of the present invention.
Figure 11:
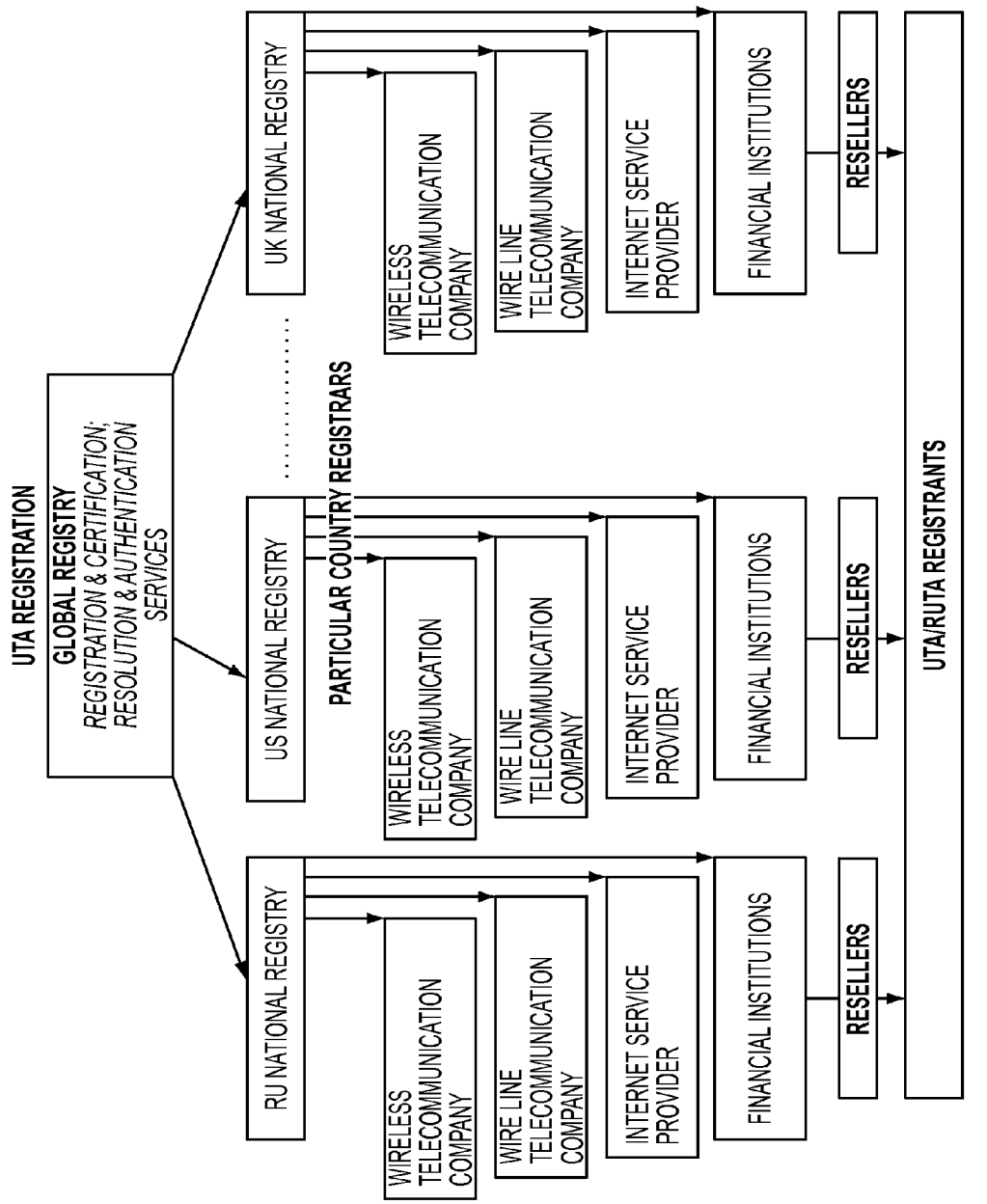
FIG. 11 is a diagram of an UTA registration in accordance with an advantageous embodiment of the present invention.

Transaction Infrastructure is illustrated by way of example in FIG. 10, and includes networking Targets 1000 each having assigned UTA number, financial institution targets 1001, 1002 each having assigned routing UTA number and authorization & clearing infrastructure 1003. Each networking target represents payer and payee, the financial institution targets represent a financial account provider (preferably banks) for said payers and payees, and the infrastructure represent a clearing & authorization system which according to one embodiment is a clearing account provider for financial institution targets.

Said financial institution targets have assigned Routing UTA (RUTA). Each RUTA is either ordinary UTA or specific UTA numbers. RUTA numbers are issued and stored, and indexed in the Switch database.

Figure 12:
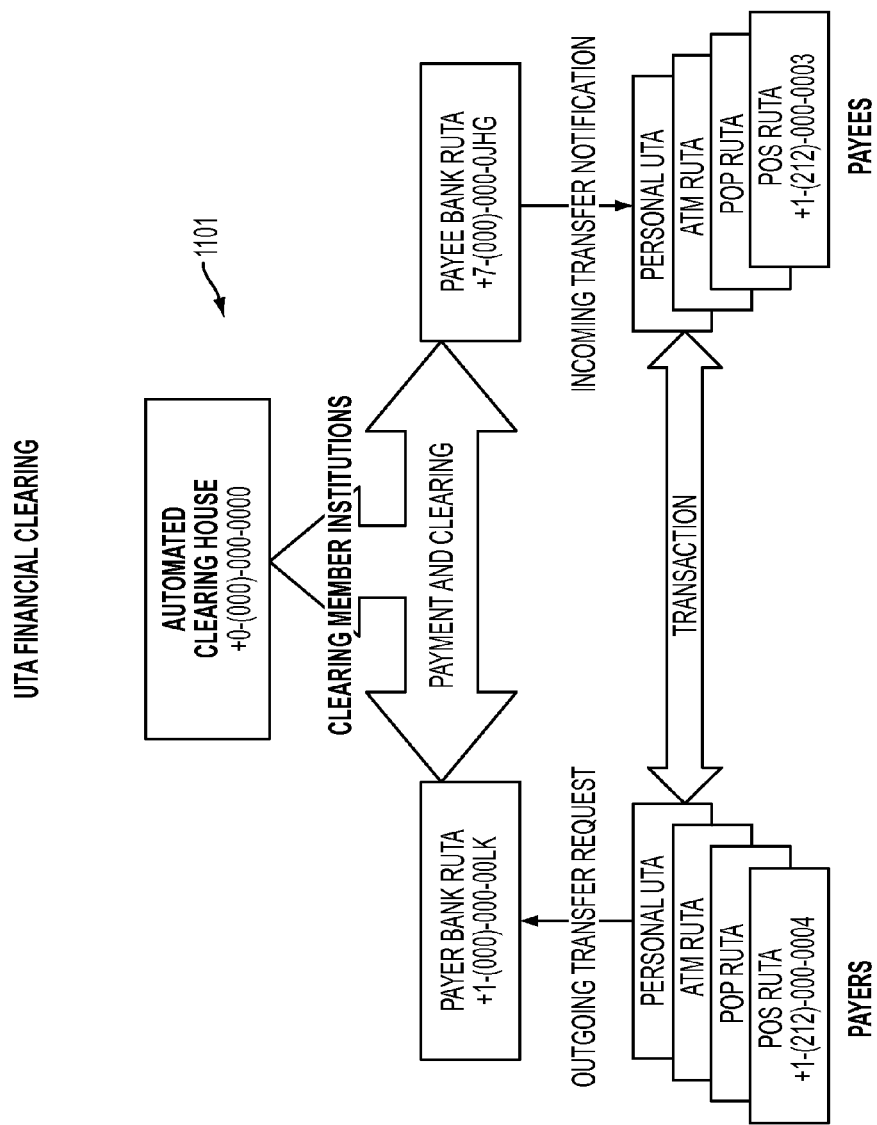
FIG. 12 is a diagram of an UTA financial clearing in accordance with an advantageous embodiment of the present invention.
Figure 13:
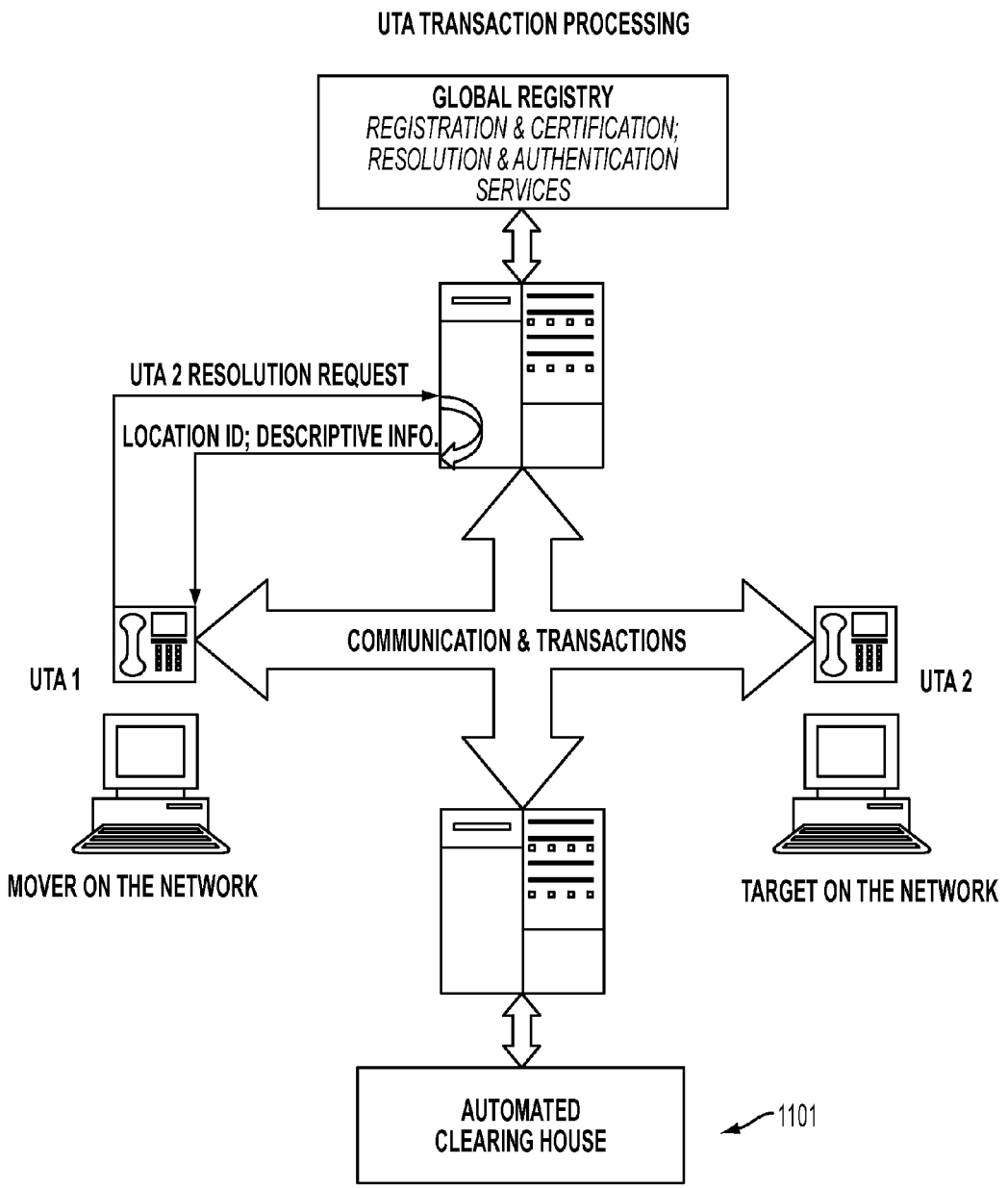
FIG. 13 is a diagram of an UTA transaction processing in accordance with an advantageous embodiment of the present invention.

The method described herein provides a creation of a specific "Zero-based" RUTA system. This method allows to assign "zero-country" zone with 100 billion available numbers including a "total zero"+0-000-000-0000 UTA number; and "zero area" zone like +1-000-000-0000 with up to 1 million available numbers for each country; and "zero based" number stack in each area of each particular country providing up to 1 million additionally available UTA number for each area code such as a stack of +1-212-000-0000 to +1-212-099-9999 for special authorization purposes for the USA New York 212 area. For example the Global Registry or Global Clearing & Authorization House 1101 as shown in FIG. 12 may have assigned "total zero number" for it and the local authorization nodes can use "zero-country" or/and "zero area code" numbers and "zero-based" numbers like 000-000x.

The form of UTA financial account number for global reach must include both UTA and its RUTA routing numbers for each dealing Target in the network and therefore the global routing number would use RUTA/UTA format. For example +1-212-000-0000/+1-718-123-4567 would mean that particular USA, New York, 718 area Target having UTA+1-718-123-4567 is being served by a financial institution located in the USA, Manhattan, area 212 having RUTA+1-212-000-0000. UTA extensions are being used, as shown, for example in FIG. 16, providing UTA access to each device within LAN, for example ATMs belonging to one particular bank can be accessed using this bank LAN switch.

In a very similar way corresponding relationship between banks may be established and used as a compound RUTA involving respective banks RUTA numbers. For example, as shown in FIG. 10, RUTA2/RUTA1/UTA would mean that this particular UTA Target is a client of particular RUTA1 bank and said RUTA1 bank has got a corresponding account in particular RUTA2 bank. This allows very simple and seamless routing services for networking Targets just by storing the appropriate RUTA in the particular Target Primary Number File metadata. This also allows to set up infrastructure wherein independent of Target location area and its bank location area each Target can choose any particular bank to serve Target's account; and each Target can use multiple bank and credit card accounts too.

Within each area code of a particular country the financial institutions can be indexed based on ordinary UTA numbers although "Zero-based" numbering system is being preferable and provides ordinate numbering wherein first issued RUTA number within particular area code has "0" as a very right digit, the next one has "1", next "2" etc. hereafter such number is being accomplished to a complete telephone number size by adding zeros from left. The last UTA in such stack would start with "0" having all "9"s afterwards. Therefore for example first specific RUTA number assigned in the USA for New York area 212 will be +1-212-000-0000 and the second +1-212-000-0001, next +1-212-000-0002 and the last +1-212-099-9999.

Said zero-method of assigning RUTA numbers allow to use the available zone of "Zero-based" telephone numbers for transaction purposes and to organize the RUTA database issuing consecutive RUTA numbers. This stack of available numbers runs from 000-0000 to 099-9999 for 7-digit based telephone numbering systems providing therefore up to one million of available routing numbers within each area zone of each country code.

Illustrated in FIG. 10, is an example of "ACH RUTA N" financial institution, where ACH is an acronym for Automated Clearing House. In fact, if RUTA number is assigned for an ACH institution, it would represent a corresponding account for all ACH member institutions. If the member institutions are members of RUTA infrastructure, then each must be assigned a RUTA-B number. Therefore if, for example, SWIFT has a RUTA-SW number, then each SWIFT number for particular SWIFT-member bank would be addressed via RUTA infrastructure as RUTA-SW/RUTA-B, and the bank clients accounts would have RUTA-SW/RUTA-B/UTA for global reach VIA SWIFT. This requires no need to know SWIFT numbers although allows for use of these numbers. Therefore RUTA infrastructure can serve as bridge gateway between all ACHs.

Set forth below is an illustrative example of SWIFT clearing via RUTA infrastructure.

Suppose that CITIUS33 is a legal SWIFT clearing number for CITIBANK N.A., and that SWIFT clearing system RUTA is: +0-(000)-00-SWIFT. Then, RUTA number for CITIBANK within SWIFT can be, for example: +0-00C-ITI-US33. Next, let us assume that a client, whose UTA is +1-212-123-4567, has a bank account with CITIBANK N.A. Then RUTA/UTA global reach substitute for CITIBANK client account via SWIFT can be, for example:

+0-(000)-00-SWIFT/+0-00C-ITI-US33/+1-212-123-4567

In general, all corresponding relationships in bank community are often grounded in currency relationships. That is, for example, if a Russian bank wants to provide USD accounts/payments for its customers it must open an account in an USD zone which, in turn, must open a corresponding account in one of US banks. Therefore, when RUTA is put into a Digital Certificate (DC), the DC must also define currency set assigned for such RUTA unless the bank account is RUTA-multicurrency. The currency issue can be addresses by using a country-code-defined currency value approach. In particular, if some bank's RUTA is +7-00C-ITI-BANK, then its domestic currency code is 7 (which in this example is Russian Roubles (RUR)). If this bank has a corresponding relationship with +1-00C-ITI-BANK, i.e. a bank in the USD currency zone, all Russian bank clients' accounts using compound RUTA BANK/+7-00C-ITI-BANK/UTA would be nominated in USD. On the other hand, all US bank clients' accounts using +7-00C-ITI-BANK/+1-00C-ITI-BANK/UTA would be nominated in Russian Roubles (RUR). Accordingly, multicurrency institution may use 0 area code or multicurrency sign attached to the appropriate RUTA account in DC or appropriate currency description in the number file. The latter approach is to use standard approach provided in "XML schemas" which describe meaning of XML tags such as RUTA for example. Accordingly, when RUTA+1-00C-ITI-BANK tag is taken its schema must be taken at RUTA+1-00C-ITI-BANK XML number file corresponding location and currency values resolved accordingly using XML approach.

The present invention provides a very user-friendly and seamless payment procedure wherein payer or payee only need to know accordingly the payee or payer UTA number to allow transaction and seamless payment routing between payer and payee bank accounts. The invention also allows unified approach wherein financial institution also are networking Targets having UTA numbers assigned for them and the financial institution can receive Fund Transfer Agreement or Deal Agreement from networking Targets, authenticate payer using particular Target UTA and apply the payment from this particular UTA bank account.

All financial institutions must have RUTA numbers assigned for them and must comply with the Gateway requirements in order to allow on-line transactions flow via RUTA/UTA transaction infrastructure. The Gateway must provide secure on-line mapping of the internal financial account numbers to the appropriate UTA numbers of their respective owners or the internal account numbering must be built upon UTA numbering approach. This allow to use UTA authentication procedure as a major part of payment authorization.

As shown herein the invention allows UTA use for financial routing too. The UTA represent a higher layer upon traditional routing systems in the Internet and telecommunications and for financial infrastructure. UTA layer therefore broadens, unites and unifies Internet and telecommunications and financial exchange addressing and routing and allows a uniform ISO/OSI transport layer for networking Targets of any nature.

Clearing & Authorization System Infrastructure

After applying a payment to a particular payer bank account, the payer's bank must transfer appropriate funds to the payee's bank. Therefore between financial institutions there must be a clearing facility established and used in order to allow this bank interchange.

In one embodiment illustrated in FIG. 12, Routing UTA transaction authorization & clearing system can use the existing infrastructures such as worldwide SWIFT number based or domestic one such as American Bank Association (ABA) number based FedWire in the USA or Bank ID Code (BIC) based system in Russia or other bank routing, interchange and clearing systems. In this embodiment the UTA numbers are being mapped to the existing SWIFT or ABA or BIC or other routing number and appropriate number descriptive information.

Alternatively transaction & clearing system can be set up as independent RUTA Clearing & Authorization House (CAH) using uniform UTA procedures for authentication between payer bank and payee bank using their respective bank RUTA numbers and bank Digital Certificates comprising RUTA numbers as a major verifiable part.

Alternative embodiment might not include CAH and instead can be built on the use of bilateral authorization & clearing agreements between banks wherein the payer bank may directly connect to the payee bank, cross-authenticate and transmit the Wire Transfer Agreement to the payee bank and clear the transaction using UTA methodology provided herein.

Digital Agreements and the Use of PKI for On-Line Transaction Services

On-line transaction services are such wherein the charged and charging targets are on-line.

The on-line transactions use PKI and digital signatures to authorize transaction.

The use of RUTA can be implemented by storing RUTA numbers along with Encrypted Account Records (EAR) or without storing the latter into DC or ADC. Multiple accounts can be resolved and managed using UTA infrastructure for each particular Target. To allow multiple accounts management for Particular Target, the appropriate RUTA numbers of particular financial institutions must be stored into DC or ADC. Therefore at least particular networking Target UTA and its Public key and the particular Target's financial institution RUTA numbers must be stored into Digital Certificate to allow incoming and outgoing payments for this particular Target accounts.

There are three types of digitally signed agreements:

Deal Agreement (DA)

The DA comprises DCs or/and ADCs of both Charging and Charged Targets and Agreement to buy digitally signed by the Charged Target and Agreement to sell digitally signed by the Charging Target and purchase values.

Funds Transfer Agreement (FTA)

The FTA is the Charged Target Agreement to pay; FTA is digitally signed by Charged Target; FTA comprises at least DC of the Charged Target and UTA of the Charging Target and money and currency values of the transfer. FTA may be unconditioned or may contain a reference for transfer.

Wire Transfer Agreement (WTA)

It is an Agreement issued and digitally signed by a financial institution in order to allow bank interchange and comprising at least the issuing bank client Target's Deal or Funds Transfer Agreement, the issuing bank DC and the transfer money/currency values and other applicable information.

The suggested method of performing sales provides at least three types of services:

- The Deal, wherein both dealing Targets must sign the transaction agreement reflecting their agreement to buy or to sell
- The Fund Transfer, wherein any networking Target may unconditionally or by reference decide to transfer funds to any other particular networking Target.
- The Wire Transfer, wherein two financial institutions may allow funds exchange and account clearing The Deal transaction type is being used for all B2C, C2B, G2C and B2B (EFT) transactions and between individuals (P2P).

For example, e-commerce on Internet, ordinary supermarket commerce, fuel station or anywhere else wherein the cashier applies charge to the consumer's UTA stored into POS terminal and the consumer receives the payment request on his/her networking device and authorizes the payment from his/her own networking device by entering his/her password. The Deal type would greatly facilitate the payment for telecommunication services wherein the Service Provider initiates a payment request on the client networking device and the device end user simply authorizes the payment by entering the password.

The Deal can serve and B2B purposes providing on-line transaction services capability for business networking Targets spread worldwide.

Deal type can facilitate concluding a deal between two people being at the time of transaction in different geographic locations but connected via the network.

In general the Deal type of transaction allows the charged party and the charging party both to sign obligatory agreement for goods, information or services supplied for the payment and thus provides legal background for the deal so that each party feels legally secured.

Funds Transfer is being used for transactions wherein payer can use unconditional or referenced intention to transfer funds to payee's account. The Fund Transfer is being used when Target end user needs to transfer funds to someone else. Such services can be on-line substitution for services provided by "Western Union" offices.

The Use of "UTA Credit/Debit Card" Records for Off-Line Transaction Services

The off-line transaction services is a basic part of credit card system services. For this invention purposes the off-line transaction services are understood as such wherein the charged Target is off-line. Therefore in order to apply the payment to the charged Target the invention provides the use of UTA credit cards and other credit mediums comprising readable UTA records being used as credit/debit account records. The charge can be applied if valid charged Target secret password or PIN code was entered and submitted into Charging Target POS terminal. UTA Card and record samples are shown in FIG. 17.

Example of UTA Payment Service Implemented in a Supermarket

The purchase exemplary procedure is shown in FIG. 18. When customer with a basket full of goods comes to a cashier, as usually the cashier counts the value of purchase by reading bar codes from the goods or manually or otherwise and receives the total value of purchase block 1301 in FIG. 18.

Hereafter if the customer prefers UTA payment method block 1302, the cashier either inputs the customer's telephone number into POS terminal manually or reads the UTA bar code located on the customer's mobile phone surface or on the customer's credit card or business card etc. The customer's handset can also be capable of displaying the UTA bar code and the bar code can be read from the handset display using ordinary POS terminal bar code reader. Examples of UTA record location and exposure are shown in FIG. 17.

Hereafter Cashier submits the UTA input block 1302 FIG. 18. And thereafter:

On-line

As shown in block 1304 in FIG. 18 the supermarket's payment request message comes to the customer's handset and the latter displaying the supermarket authenticated identity and the value of purchase and the prompt "accept—reject" the payment to the customer.

Customer chooses "accept" option and enters his/her secret password to confirm the purchase. Thereafter the customer submits the password authorizing the payment block 1305 in FIG. 18.

The cashier and the customer receive payment confirmation message from the network authorization means respectively on POS terminal and on the customer's mobile device as shown in the block 1306 on FIG. 18.

The confirmation is being logged and the transaction complete.

In this example the handset can be capable of receiving the list of goods being purchased from supermarket POS terminal and displaying the list including purchase value, bar code, picture, weights, price per kilo and other measurements related to each good. The handset can be capable of saving these data and using the data next time when customer wants to repeat the purchase in respect to chosen goods.

The handset can be capable also of managing many bank and credit card accounts therefore enabling the customer to choose from the account list which particular account must be used in this particular transaction. The accounts may be arranged to be used orderly wherein first account is being used by default and each consecutive account is being automatically or manually used in case if previous major account is not available for the payment.

This payment transaction is a Deal Agreement.

Off-Line

Whenever the customer's handset is off-line (i.e. the handset battery has died or the handset is not available for end user at the moment) after storing the UTA into the POS terminal the POS terminal internal memory block 1302 in FIG. 18, it displays the Customer's secret password input field and submit prompt block 1303. Optionally the POS terminal resolves the customer's UTA and shows the customer's identity descriptive information (ID number, face picture, name etc) on the POS display as shown in block 1303. The further step requests the customer to show his/her ID (driver license, passport etc) confirming his/her identity to use the UTA.

Alternatively, biometric fingerprint device coupled to the POS terminal can be used. Provided that Number file contains original customer's fingerprint EAR, it can be used for fingerprint authentication of fingerprints taken from customer at POS location instead of Password.

The customer enters his/her secret password and submits it. The password check request is being further resolved via authorization infrastructure and if the password check has been successful and authorization granted the POS terminal receives authorization message and displays it to the cashier and customer block 1307. Same authorization message is being sent to the particular customer UTA networking Target for further use.

The confirmation is logged and the transaction complete.

This payment transaction is a Deal Agreement.

Example of UTA Payment Service Used by Payer

Figure 19:
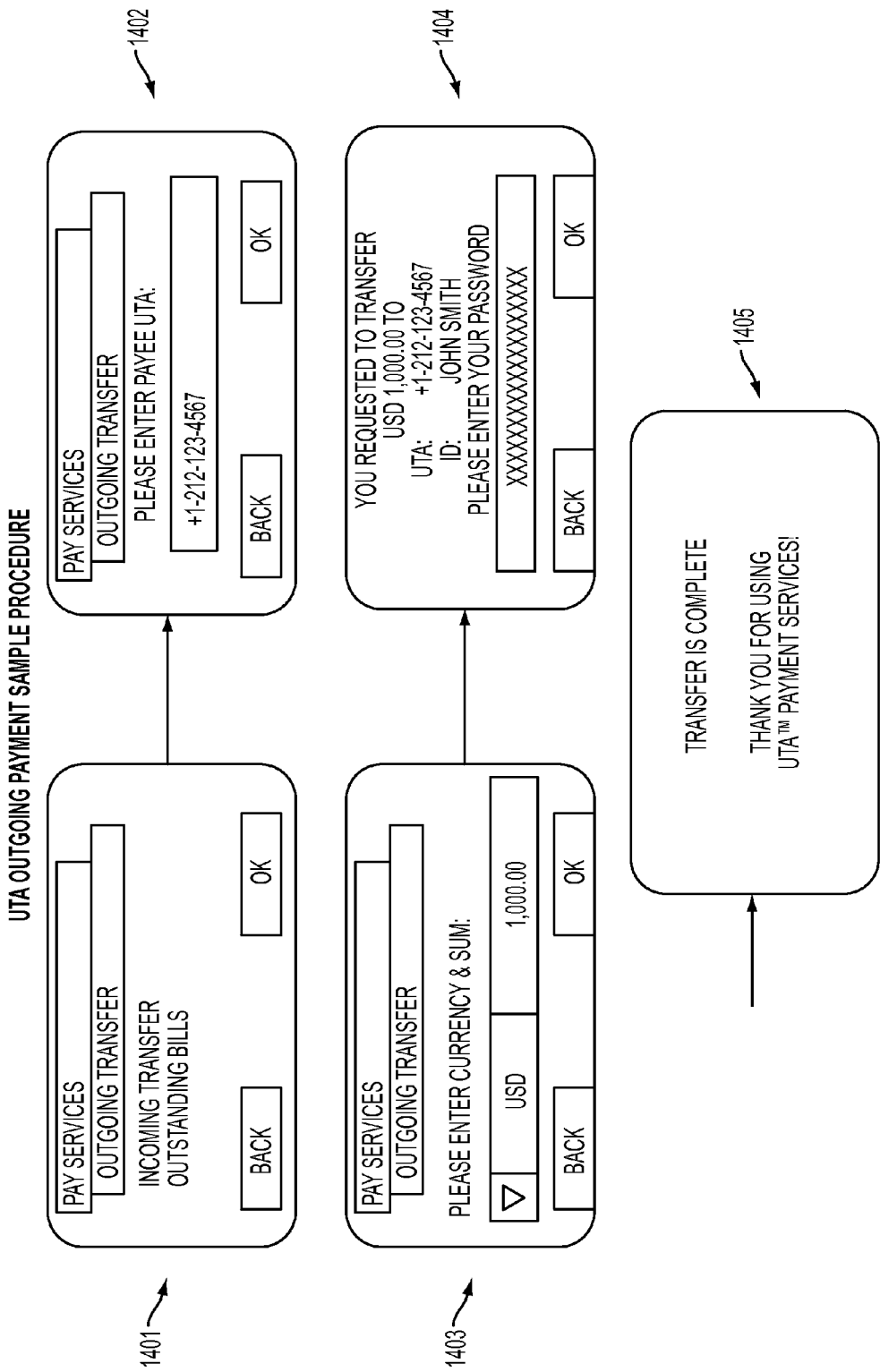
FIG. 19 is a diagram of a sample UTA outgoing procedure.

The payer chooses pay operation in the handset user interface block 1401 in FIG. 19.

The payer enters the payee UTA number into input field on the handset display block 1402.

The payer chooses currency and enters the value of transaction and payment reference if applicable block 1403.

The payer submits the payment.

The payer enters the secret password to confirm the transaction block 1404.

After password check procedure and if the password is correct the payment is being effected.

Payer receives authorization message from the network and the message is being displayed to confirm the execution of the transfer block 1405.

The payee receives authorization message from network as a notification informing that his/her account was credited and showing the authenticated identity of the payer and reference information if applicable.

The confirmation is logged and the transaction complete.

This payment transaction is a Funds Transfer Agreement.

Figure 20:
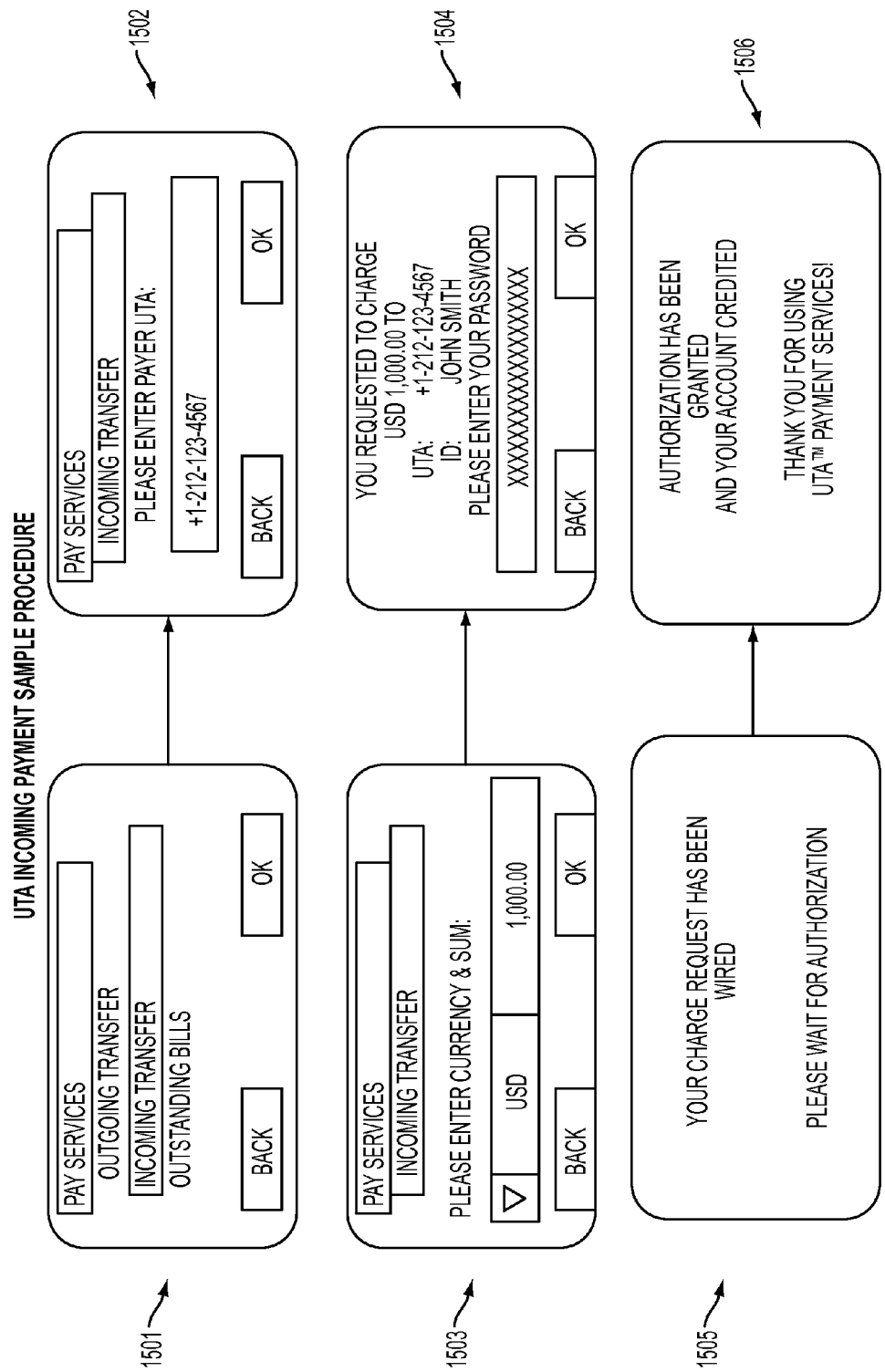
FIG. 20 is a diagram of a sample UTA incoming payment procedure.

Similar UTA online charge sample procedure used by payee is provided in FIG. 20.

Clearing & Authorization Procedure

On-Line Procedure

Assume the financial institutions are banks.

When Deal or Funds Transfer Agreement is composed and digitally signed it is being preferably transmitted by the payer to the payer RUTA bank in order to avoid unnecessary traffic. Although it might be instead the payee or payer Target and payee bank or payer bank without significant change in authorization procedure. The payer bank authenticates the payer Target signature and if authentic retrieves the transaction value and the payee Target RUTA/UTA or at least payee Target UTA which is further being resolved to the payee Target RUTA/UTA via Switch.

Using Existing Clearing System

After receiving the Deal or Funds Transfer Agreement the payer bank can resolve via Switch the RUTA number into SWIFT or other payee bank routing details and thus may further execute payment using any international or domestic third party (such as SWIFT and/or other systems) routing and clearing routine. This method allows the use of existing clearing and routing infrastructure and thus provides very inexpensive implementation of the RUTA/UTA clearing for payment methods provided herein.

If an existing SWIFT or other clearing system is being used, the appropriate system-specific routing account records are being stored into each particular financial institution RUTA Primary, Secondary and Default Number Files. While transacting Mover and Target exchange their respective RUTA taken accordingly from Target's and Mover's Primary or Default or Secondary Number File or from their DC or ADC. Further payer provides the payer's bank with a particular payee RUTA/UTA and the payer bank resolves the payee RUTA via Switch server receiving from Switch the ordinary SWIFT or other routing record assigned to the payee bank. This allows the payer bank to complete transaction with the payee bank in ordinary way. In this case the preferred embodiment would require that each particular UTA Primary Number File and its copies, DC or ADC must include RUTA as the only bank routing information and Number Files must not have the appropriate bank ordinary routing details to allow Switch to apply transaction fee, wherein the lack of particular Target bank ordinary routing details will make payer bank to resolve the RUTA number via Switch. In this case Switch would apply a fee schedule for all RUTA resolution and may require each payer bank to provide the Switch with information on the transaction and its value in the process of each transaction, thus allowing the Switch server to apply appropriate transaction fee to the payer or payee, based on transaction value percentage fee or a flat fee basis or on distance fee basis or on all said fees.

Using RUTA Clearing System

RUTA clearing block diagram is shown on FIG. 12. When the payer bank receives from payer the Deal Agreement or Funds Transfer Agreement, in turn the bank composes its own Funds Transfer Agreement called a Wire Transfer Agreement (WTA) which is being digitally signed by the issuing bank and comprising at least the transaction value; and payer and payee global RUTA/UTA or payer and payee UTA numbers. Thereafter the payer bank resolves via Switch the payee bank RUTA number receiving payee bank primary URL. Thereafter the payer bank composes and signs a bank's Wire Transfer Agreement (WTA) The bank connects to the RUTA Clearing & Authorization House (CAH) and to the Payee bank, cross-authenticates and transmits the WTA to CAH and to the payee bank.

CAH further authorizes or denies the transaction. CAH authorization or denial is provided in a form of Authorization Agreement (AA) digitally signed by the CAH. If payer bank clearing account balance allows the transaction, CAH debits the payer bank clearing account and credits the payee bank clearing account for the value of the transaction and applies fees. The AA is further being securely transmitted to both payee and payer banks. If authorization is granted and authentic the payee bank credits the payee UTA bank account and the payer bank debits the payer UTA bank account for the transaction value and appropriate transaction fees.

Off-Line Procedure

Off-line is understood to be the case when at the time of transaction the CAH is not available on-line. In this embodiment the payer bank may directly connect to the payee bank, cross-authenticate and transmit the Wire Transfer Agreement to the payee bank and post is to the CAH. The CAH timely retrieves the WTAs, grants or denies authorization, composes and signs the Authorization Agreement (AA). Further CAH connects to each payee and payer banks on timely basis and transmits the AA.

Automatic Teller Machine (ATM) Implementation

RUTA may be assigned to an Automatic Teller Machine (ATM) and the "Cash Request" can be generated using the ATM machine in order to charge any UTA networking device wherein, after on-line or off-line authorization of the transaction by a particular UTA end user, cash is dispensed to the requesting ATM user. In this regard, the POS terminal as referenced above, may also be implemented as an ATM.

An example of an ATM cash withdrawal in accordance with present invention is as follows:

An ATM client chooses UTA Withdraw operation,

Types in UTA or sweeps/puts in the UTA card in the ATM,

OFF-line: the ATM requires ATM client to type password (i.e., authentication information); when authorization is given the ATM provides cash to the ATM user.

ON-line: as described above, but in the end the Mover receives cash from ATM.

ATM can be equipped with a telephone or videophone to be able to provide live authentication by voice and picture wherein Target (payer) can see and talk to the Mover when authorizing a payment and Mover gets cash from ATM in ON-line mode if Target has authorized it.

Similarly ATM capable of accepting cash deposits can be used to implement "cash→cash" transaction between two ATM users. Regular ATMs can be used for "major credit/debit card→cash" and vice versa transactions between two ATMs. In this embodiment UTA numbers assigned to each ATM are being used to establish IP connection between ATMs and make the transaction independent of each ATM location. ATM videoconferencing capability would greatly facilitate visual authentication for both ATM users in this case.

Business Models

In the above described cases the Authorization Center may act as Clearing & Authorization House for respective registered banks and running a database which is mapping each particular RUTA to the particular routing details for specific Routing/Clearing system and remaining bank' clearing account balance information.

The Subscription Authority for a fee issues RUTA for banks and other financial institutions and Switch applies fee schedule for RUTA resolution services.

Transaction fee can be either a percentage or a flat fee or both fees applied per clearing transaction (fee per amount and fee per transaction).

Transaction fee may also be based on a distance between Mover and Target (e.g., local versus long distance calls).

The invention lends itself to a method of Digital Certificate (DC) composition, issuance and management providing multititier DC distribution model and multiple accounts access based on the use of DC and Public Key Infrastructure (PKI). Various, but by no means limiting, implementations of this method are described below.

Trusted Services Distributed Architecture

Trusted services based on the use of Digital Certificates and PKI are well established and widely used by such providers of trusted services as VeriSign and others. Usually these providers do not accept DCs issued by their competitors. This causes unnecessary market segmentation and lack of interoperability of trusted services on the global scale. The latter prevents users from adopting trusted services and in turn trusted service provider's businesses suffer from low market penetration.

The invention provides a method of distribution of trusted services through supply chain wherein the "Tier One" trusted service provider is a trustee for lower Tiers and all lower Tiers are hedgers. Referring to FIG. 21, the lowest "Tier END" signs $DC^{END}$ for users and applies it to upper "Tier (END-1)" for DC exchange. The "Tier (END-1)" uses $DC^{END}$ signed by "Tier END" as Certificate Signature Request (CSR), wherein "Tier (END-1)" extracts user data from $DC^{END}$ and signs it with its Private Key$^{(END-1)}$ issuing this way $DC^{(END-1)}$ which is being transmitted to Tier (END-2) and executed there in the same manner and further by supply chain up until Tier One is reached and the latter $DC^{Tier\ One}$ is finally issued. The $DC^{Tier\ One}$ is then returned to the user via supply chain members or directly and placed into his/her device or recorded on card or placed otherwise into memory chip or processor or printed on the surface or recorded otherwise.

Such distribution model is based on trusted legal relationships between upper and lower Tiers providing acceptance of lower Tiers DCs by upper Tiers considering each $DC^{lower}$ is being $CSR^{lower}$ wherein the upper Tiers further issue $DC^{upper}$ based on $CSR^{lower}$ content. The model provides delegating the responsibilities for inappropriate content and dataset relationships to the CSR issuers i.e. from the upper Tiers to lower Tiers down to Tier END which is being responsible for checking user rights of use of each particular NA, AR and EAR in the User' CSR. Therefore the distribution allows appropriate security measures for upper Tiers protecting them from mistakes and fraud caused by negligence and misconduct of lower Tiers while checking user's rights to use particular NA, AR and EAR.

The distribution model provides involvement in business of unlimited number of Tiers while providing competitive environment for each Tier level members. The model provides also replacement of all Tier level members Digital Certificates to the Tier One DCs guaranteeing this way scalable and global interoperability based on recognition of DCs issued by only one Tier One issuer.

This architecture allows also uniform DC replacement procedure wherein the new service provider Tier END(N) can add its service Field N into user's DC by applying for existing user's DC replacement via Tier infrastructure independent on who was the service provider Tier END(1) DC issuer or the previous user's DC Tier END service provider.

DC Content

Each DC is structured using subject matter segments wherein each segment contains fields. The DC preferably uses XML format and its subjected dialects. The subject matters can be Communication, Personal, Financial, Social, Biometric, Security, Credit Rating and other matters. The subject matters can be empty providing therefore that only one subject matter segment may exist.

The DC segment fields preferably can be either one of "Network Address (NA)" or "Account Record (AR)" or "Encrypted Account Record (EAR)" or their composition, wherein:

The "AR" is account or ID or other record of any nature meaningful for particular purposes. AR is not encrypted. In one preferred embodiment AR is a user credit rating, which is based on the use of Financial segment ARs. In other preferred embodiment AR is user name or other ID. In other preferable embodiments the AR can be either one of Routing ID or/and Account ID both forming the full financial account record; or keyword or code which is meaningful for particular service provider.

The "NA" is unique alphanumeric ID matching particular telephone number or ENUM (http://www.ietf.org/html.charters/enum-charter.html) or UTA (Uniform Telephone Address) or DNS name or other network ID which can be used widely, providing network interoperability and global reach for all networking devices. NA is a kind of AR, it is not encrypted and being used for communication and authentication purposes. NA may have reference attached to it in the form of AR or EAR. The NA field can be compound field NA1/NA2/NA3, reflecting bank correspondent relationship for example. In one of preferred embodiments the NA is Routing ID or/and Account ID both forming the full financial account record wherein one or both of them can be UTA records.

The EAR is AR which is being encrypted using Public Key belonging to some authorization facility of dedicated transaction service provider. Therefore EAR can be encrypted by unlimited number of parties and decrypted only by the particular authorization facility.

A preferred embodiment provides that each DC is structured as shown in FIG. 22.

In this embodiment each networking Target can be authenticated using DC by DC TITLE. The TITLE is particular network user ID.

The preferred embodiment provides usage of single NA or AR or EAR field values or/and their compositions for DC TITLE field and DC Segment fields.

The AR or EAR are preferably used without NA if the AR or EAR field refers to some dedicated service provider whose NA is well known for the user device otherwise. Usually this is home or global service provider having home, global or standardized access means.

If the AR or EAR are being used by service provider which is not preset, the service provider's NA must be attached to the field in order to provide access to its services. Therefore the whole field record would be (NA+AR) or (NA+EAR) or (NA+AR+EAR).

In preferable embodiment NA field value is being used as service provider gateway access address wherein this service provider is set to identify the incoming connections mapping their authenticated DC TITLE fields to provider's internal Account Record system. As an example the Service provider NA field is bank Routing number (i.e. RUTA or other address) and DC TITLE field is account number (user UTA or other address) which is being mapped to the bank account number while user is connecting to the bank gateway using bank NA address.

The EAR is preferably used wherein the Account Record contains private information such as Credit Card full record or other sensitive information which is not allowed for public view. Assuming that EAR is a credit card record the NA would locate a gateway of credit card authorization service provider or bank issuer or other related entity gateway. The EAR can be also the bank account title and the NA in this case would be the bank gateway access address. Otherwise EAR may encode a fingerprint or any other sensitive information.

In another preferred embodiment each service provider CR is being placed in a separate Digital Certificate, wherein each DC issued for particular Target are having same DC TITLE fields and contain this particular Target Public Key. Therefore each of these DCs are separately capable to authenticate the Target in the network and serve the narrow purpose with what the particular DC was issued. These DCs may be stored into subjected object store and accessible using service subject matter they serve. For example the Bank object folder may contain all bank related DCs in BANK_NAMED folders and CARD folder may contain CARD_NAMED folders containing DCs issued for different Banks and Card service providers.

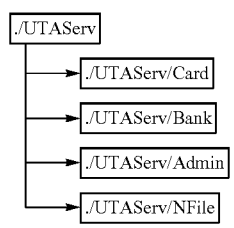

This embodiment allows avoiding replacement of previously issued DC while adding to it a new service provider CR and thus makes the PKI easier to implement and manage. It also provides service providers to keep better control over their service and account information which is being a part of CR for DC issuance & distribution services. This also allow to control access over each particular service subjected DC at the level of Target's storage management system.

Preferable Embodiments for "FREEDOM" Smart Card Services and Networking Devices.

The FREEDOM as described herein refers to a user's freedom of choice to access all his/her available service provider accounts using single smart card or networking device. In this case the preferable embodiment provides multitier DC distribution services and allows smart card and networking device use providing uniform access to distributed transactional services provided by multiple service nodes of different service providers. In this embodiment each smart card and networking device is being assigned with DC via trusted services distributed architecture. Each DC is segmented as described above and contains fields providing addressing and identification records providing connectivity, authentication and trusted access to transactional services provided by different banks, money management facilities, credit card systems, credit rating agencies and other service facilities. This "FREEDOM" smart card services provide secure trusted access to all financial accounts and money management instruments whose record fields are incorporated into Financial DC segment. This service therefore is vendor independent and uniform. Therefore the FREEDOM card owner may connect to all and any DC included accounts via ATM worldwide infrastructure if the ATM is PKI and communication capable and/or using his/her networking personal FREEDOM compatible device. Preferably the FREEDOM cards are UTA cards and the NA fields in DC are RUTA fields of particular service provider. The FREEDOM cards may be card with magnet stripe or any other medium or memory chip or wave or processor or networking device carrying the DC.

This embodiment provides the concurrent access to multiple accounts contained in the DC via any terminal capable to use PKI. This allows to use FREEDOM card with ATMs and allows use of personal communication devices as universal secure access means to all existing user's accounts. In regard to financial accounts it allows to download and manage financial accounting data from any ATM location using FREEDOM cards and from any networking personal device if ATM and the device are PKI compatible. The use of multiple accounts using authentication allows to arrange Global Credit Rating facility which collects accounts usage statistics and provides credit ratings for their respective users. This also allows the use of the FREEDOM cards for immigration.

FREEDOM CARD USE EXAMPLES

Example 1

Assume financial (NA+EAR) Field 1 is (www.authorization_center.com/FREEDOM/gateway.htm+Encrypted VISA Credit Card Account Record). Assume also the EAR is being encrypted using particular Authorization Center Public Key. When the FREEDOM card is being put into ATM, the ATM decrypts FREEDOM card DC using Public Key$^{Tier\ One}$. ATM then takes and uses network address www.authorization_center.com/FREEDOM/gateway.htm to connect to particular "Authorization Center FREEDOM gateway". If connection is successful, parties cross authenticate each other providing their DCs. Due to the exchange the FREEDOM smart card EAR field becomes available to Authorization Center (AC) and EAR is being decrypted by AC using AC Private Key. The transaction is then applied to the decrypted VISA Credit Card Record via regular VISA International authorization infrastructure.

Example 2

Assume financial (NA+AR) Field 1 is (ABA 021000089+ Name). In this case the NA is a bank routing number in American Bank Association FedWire system. Therefore the particular bank account operations are available by connecting to the ABA 021000089, cross authenticating and mapping the account Name field to the bank internal account numbering system. If the Name matches some existing internal bank account the access to this account is being granted.

Example 3

Assume financial (NA) Field 1 is (+1-212-123-4567) which is bank gateway telephone number. When the FREEDOM card is put in ATM and this NA address is decrypted from DC by ATM, the ATM accesses the bank using +1-212-123-4567 and after cross authentication between FREEDOM card and the bank the latter takes DC TITLE and mapping it to the internal account numbers. If the DC TITLE is matching to some particular bank account, the bank provides full access to the matched account.

Example 4

Assume the FREEDOM cardholder applies for loan or overdraft; assume also the FREEDOM card financial (NA) Field 1 is (+1-212-123-4567) which is Credit Rating Agency gateway telephone number. When the FREEDOM card is put into smart card reader and this NA address is decrypted from DC by the reader, the reader access the Agency using +1-212-123-4567 and after cross authentication between FREEDOM card and the Agency the latter takes DC TITLE and maps it to the internal credit rating account numbers. If the DC TITLE matches some particular Agency account, the Agency provides the card reader with the Current Credit Rating of the matched account; the received credit rating is taken under consideration and based on the consideration the bank lender makes a decision whether to lend money to the FREEDOM cardholder or not.

Example 5

Assume Security (NA) Field 1 is (+1-212-123-4567) which is Government Immigration Service Agency gateway telephone number. When the FREEDOM card is put in smart card reader and this NA address is decrypted from DC by the reader, the reader accesses the Agency using +1-212-123-4567, and after cross authentication between FREEDOM card and the Agency the latter takes DC TITLE and maps it to the internal Immigration Service Agency account numbers. If the DC TITLE matches some particular Agency account, the Agency checks if the card holder has a valid country entry visa to cross the border and if the visa exists and is valid, the cardholder is granted access to enter the country.

Example 6

Assume financial Field 1 is (+1-212-123-4567), Financial Field 2 is (+1-303-123-4567), and . . . Field N is (+1-512-123-4567+EAR), wherein Field 1 and Field 2 contain bank gateway access numbers and the Field N is a VISA card system authorization center telephone access number, wherein the EAR in Field N represents encrypted VISA card account record. When the FREEDOM card is put into an ATM, NA addresses are taken from DC Fields 1, 2, . . . N and decrypted by the ATM, and further the banks and VISA authorization centers are accessed by ATM using their respective telephone access numbers. After cross authentication with each bank and Authorization center, the banks map the DC TITLE to their respective internal accounting systems and VISA Authorization Center decrypts the EAR extracting this way the actual VISA credit card record. If the DC TITLE matches the bank account numbers and the VISA credit card record is authenticated and valid the ATM displays the balances of each bank and VISA accounts to the FREEDOM card user and allows transaction via each and any of the accounts in accordance with applicable bank and VISA card issuer regulation rules and user privileges.

Network Device Use Case

The network device access and authorization procedure is same as described for FREEDOM card wherein instead of FREEDOM card DC the device DC is being used and instead of ATM the device itself connects to the Authorization Center NA Gateway.

Business Models

The business models provide selling DC itself and issuance services on per DC and per issue operation basis. The model also provides selling DC replacement services on per DC and per replacement basis.

In the context of the foregoing, another aspect of the invention is an internet settlement architecture which may be implemented as follows.

Internet Settlement Architecture

Payment Nodes. The payment nodes are the network nodes wherein networking address of each node is treated as the node's account number. In regard to payments, each node can be either one of a payment originator, intermediary or destination (termination) node. Each node has unique network address associated with the node; the network address may have a form of telephone number Uniform Telephone Address, ENUM), www or e-mail address or any other appropriate networking address which can be resolved through the network resolution means into its Default Clearing Facility UTA. Each node may represent a Mover or a Target in regard to payment processing wherein the Mover is an originator of an Atomic payment and the Target is a Terminal node for the Atomic payment. The Mover can be either the EEP Originator or intermediate node and the Target can be either EEP intermediate or Terminal node.

UTA. In the context of the novel internet settlement architecture, UTA is a Universal Transaction Account. UTA is a unique Target identifier. UTA coincides either with one of telephone number (Uniform Telephone Address=UTA), www, e-mail, natural name, IP address or any other unique network ID. UTA coincides with or maps the Target's transactional account ID.

Atomic Payment (AP). Atomic payment is implemented as a peer-to-peer communication i.e., transactional call (t-call). T-call is a peer-to-peer communication wherein transactional instruction is being originated by Mover in a form of network connection using namespace string i.e., Target's UTA followed by Payment message containing specific transaction parameters and Mover's digital signature. Further we will consider the transaction being a payment although it might be transaction of any other kind. For simplicity we will also consider that the payment message is a part of a URL namespace (UTA namespace), and the payment message is following a question sign—"?" in a URN notation (see example below). The t-call string preferred format in this case would use URN Syntax (RFC 2141 and RFC 2396), and may use "Resolution of URIs Using the DNS" (RFC 2168), "Architectural Principles of Uniform Resource Name Resolution" (RFC 2276), DDDS and Namespace Definition Mechanisms implementations (RFC 3401, 3402, 3403, 3404, 3405, 3406), notwithstanding the RFCs mentioned above, we will not follow the URL Syntax requirements in our examples below to keep it simple and reader friendly. We also will not specify in namespaces communication ports to simplify the namespace notation although different ports might be used to distinguish payment communication from network surfing for example, enabling herewith navigation and payment applications using the same namespace resolution service. For vending machine implementation this would mean using the same www address for accessing the machine Internet server for viewing available drinks though port 80 and paying for the drink using some provisional port 88.

In regard to the namespaces and their authoritative domains using DNS analogy Atomic payments can be either ascending to the root domains or descending to the hosts and sub domain servers within authority zone of current domain.

For the payment transaction the communication parameters could be a sum, a currency value, payment reference, etc. Parameters may also contain a clearing method ID (such as on-line or off-line processing) and other Mover's preferences in a form of a namespace: PAYEE_UTA?PAR_1=VAL1&PAR_2=VAL2& . . . /PAYER_UTA/PAYER_DIG_SIGNATU RE. The nature of payment (to the foreign Termination node) also may define a method such as SWIFT vs. local ACH payment.

For example:
THE_DEFAULT_CLEARING.com?payee.com/credit/USD/1000/ON/payer.com Kjnkethab kjdlkcmmcv In this example:
THE_DEFAULT_CLEARING.com is a default clearing facility ID payee.com is the payee UTA (network address and account ID)

Credit designates the Payee account credit operation
US is the currency unit (US Dollars)
1000 is a sum
ON is an "on-line" clearing method request
payer.com is the payment Originator UTA (network address and account ID)
Kjnkethabkjdlkcmncv is the Payer digital signature.
Another example:
credit.THE_DEFAULT_CLEARING.com?+1-(212)-123-4567/USD/1000/+1-(202)-123-4567/Kjnkethabkjdikcmmcv
wherein
+1-(212)-123-4567 is a UTA (telephone number or enum) of the payee and
+1-(202)-123-4567 a UTA (telephone number or enum) of the payer.

Further we will call as a "t-call string" the payment notation such as credit.THE_DEFAULT_CLEARING.com-?payee.com/USD/1000/ON/payer.com/Kjnkethabkjdl kcmncv.

End-to-End Payment (EEP). The EEP is a payment originated by one node (Originator) and terminated at the other node (Terminal node). EEP can be an Atomic Payment but usually it is understood as a chain of consecutive Atomic Payments involving Originator, Terminal and intermediary nodes. The EEP flows through the chain of intermediary nodes from Originator to the Destination node in a form of a chain of consecutive peer-to-peer t-calls for Atomic payments. In order to process the payment each Atomic payment t-call must involve peers both supporting one trusted architecture so that peer-to-peer cross authentication can be made.

Client. A Client node is a node which is the bottom node in a clearing multi-tier infrastructure and therefore client has only relationships with mother clearing tiers. Since Client does not manage a clearing domain, the client's resolution database does not map any client UTA and only mother clearing facilities. Therefore all t-calls composed by a client are being resolved into Default Clearing Facility UTA assigned for particular client UTA account and then the t-call is being communicated to the appropriate client' DCF.

Clearing facility (CF). The Clearing facility is a clearing and routing facility. CF usually serves as EEP intermediary node but it may also act as a client being EEP originator or EEP termination node. In regard to communications each Clearing facility is understood as namespace domain and keeps UTA database for its clearing domain client nodes (hosts) in a way similar to how authoritative DNS server maps name space resources registered in the DNS domain "zone of authority".

Each CF can be a network child CF node (sub domain namespace node) for its appropriate upper tier mother CF nodes such as Automated Clearing Houses (ACH), corresponding banks, etc., and the child CF must use the mother's CF appropriate Mother Default Clearing Facility UTA, and support mother specific clearing and communication methods.

MDCF. Each lower tier clearing facility may use services of its Mother Default Clearing Facility (MDCF) which is default upper tier Clearing facility for particular unique transaction methods.

DCF. Each Client (node) uses its Default Clearing Facility (namespace domain) for each unique client account (host) .Client can be an account holder (host) in several Clearing facilities (namespace domains).

Clearing Infrastructure.

Figure 23:
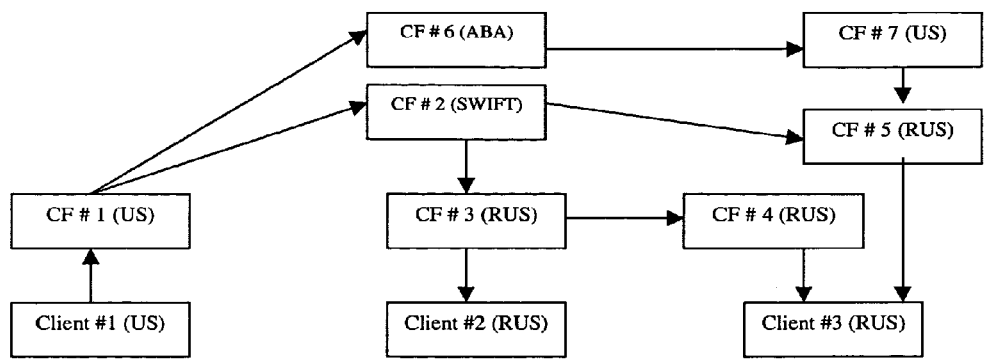
FIG. 23 is a flow diagram of an exemplary clearing infrastructure in an internet settlement architecture.

FIG. 23 illustrates the multi-tier clearing relationships between clearing and resolution process participants, wherein:
⇒ Client #1 is an account owner in the US based bank CF#1; CF#1 is a Client Default Clearing Facility (CDCF) for Client #1.
⇒ Client #2 is an account owner in the Russian based bank CF#3; CF#3 is a Client Default Clearing Facility (CDCF) for Client #2.
⇒ Client #3 is an account owner in the Russian based bank CF #4; CF#4 and CF #5 are Client Default Clearing Facilities(CDCF) for Client #3.
⇒ CF #1=USA based bank; SWIFT and American Bank Association (ABA) are Mother Default Clearing Facility (MDCF) for CF #1 distinguished by method
⇒ CF #2 is a SWIFT network International Clearing Facility; CF#1, CF#3 and CF#5 are child CFs for SWIFT.
⇒ CF #3 is a Russian bank; SWIFT is a MDCF for CF #3
⇒ CF #4 is a Russian bank; CF #3 is a MDCF (corresponding bank) for CF #4
⇒ CF #5 is a Russian bank; SWIFT and CF #7 are MDCFs for CF #5
⇒ CF #6 is an ABA clearing facility; CF #1 and CF #7 are children for ABA clearing domain.
⇒ CF #7 is a USA based bank; ABA is a mother clearing domain for CF #7.

FIG. 23 shows that Client #1 can transfer money to Client #2 using the only route: (Client#1➔ CF#1➔ CF#2 ➔ CF#3Client#2).

If Client #1 would like to transfer money to Client #3 it may use either one of alternative routes:
(Client#1➔ CF#1➔ CF#2➔ CF#3➔ CF#4➔ Client#3)
or
(Client#1➔ CF#1➔ CF#2➔ CF#5➔ Client#3) or
(Client#1➔ CF#1➔ CF#6➔ CF#7➔ CF#5➔ Client#3).

Operationally, in accordance with the present invention, the Clearing Infrastructure may support, for example, Architectural Principles of Uniform Resource Name Resolution (RFC 2276) or similar wherein network addresses coincide with account numbers.

Clearing cycle. Clearing cycle is an Atomic payment clearing procedure executed by a single CF. Each CF clears Atomic payments in accordance with certain payment convention such as positive client balance requirement, or client limits requirements or other clearing rules. The clearing cycle involves Resolution cycle which is an important part of a clearing cycle. During the clearing cycle CF:

⇒ receives the t-calls from Mover (its clients or child CF),
⇒ authenticates the Mover by its UTA and digital signature,
⇒ verifies a compliance of payment parameters with payment convention rules and if they comply
  Resolution cycle. CF resolves the Target UTA into the Next Default Clearing Facility (NDCF) UTA which is either DCF for Terminal node or MDCF for the current CF.
⇒ debits the client account and credits the NDCF account within current clearing domain;

a parameter in a t-call string providing one unique resolution DCF/MDCF UTA output for each unique pair of "unique UTA+unique method". In the database implementing only one default method, each unique UTA would have a single unique resolution DCF output if UTA is mapped within the database, or would resolve into the current CF MDCF if UTA has no mapping within the database.

The Table 1 shows Clearing database table wherein each Target UTA is being resolved for Children/Clients into output DCF using particular Clearing Method and for any Non Client is being resolved into particular MDCF using particular Clearing Method. Multiple clearing methods can be supported in a way similar to the use of Address-family identifiers (AFI) for RIP 2 (RFC 1723) or using other technique.

TABLE 1

| | | | Input UTA | | | | | | | |
|---|---|---|---|---|---|---|---|---|---|---|
| | Target UTA 1 | Target UTA 2 | Target UTA 3 | ... | Target UTA N | | Any Target UTA that is not a Child/Client for current CF (Non Client UTA) | | | |
| Method | 1 | 2 | 7 | 3 | ... | N | L | 1 | 2 | 3 | ... | K |
| Output | DCF UTA 1 | DCF UTA 2 | DCF UTA 7 | DCF UTA 3 | ... | DCF UTA N | DCF UTA L | MDCF UTA 1 | MDCF UTA 2 | MDCF UTA 3 | ... | MDCF UTA K |

⇒ composes t-call string such as credit.NEXT_DEFAULT_CLEARING.com?payee.com/USD/1000/ON/payer.com wherein the NEXT_DEFAULT_CLEARING.com is communication address and the rest is a copy of original incoming t-call except digital signature.
⇒ Digitally signs the t-call string credit.NEXT_DEFAULT_CLEARING.com?payee.com/USD/1000/ON/payer.com/digital_signature_of_CURRENT_CF
⇒ Connects to the NDCF using t-call.

The next clearing applies its clearing rules, composes its t-call address string as described herein and so forth until the Terminal node is reached.

CF resolution database. Each CF is an Account Domain Authority (similar to DNS authorities) and maintains a 'zone of authority' Clearing Domain namespace resolution database. For example each bank is a clearing domain namespace for its respective client accounts (hosts) and for other banks that use the present bank (sub domain namespace servers) as corresponding institution to gain access to current bank mother clearing facility. In a latter case Russian bank may have account in American bank to gain corresponding access to the American Bank Association FedWire clearing facility.

The appropriate 'zone of authority' Domain database maps and resolves Target UTAs into the Target's DCF or resolution is referred to the root or sub domain child Default Clearing Facility (DCF) UTA in such a way like IN-ADDR.ARPA reverse addressing domain is organized (RFC 1033) (see the RFC 1034 Name Server Algorithm as an implementation example). If Target UTA is not resolved within current clearing domain into child DCF (lookup output is nil), the Target UTA must be resolved by default into MDCF UTA (root namespace server) of the current CF according to the Mover-defined payment method. Table 1 shows a simplistic example of the database mapping table implementing <UTA+method>➔ <DCF UTA> conversion paradigm.

Each CF shall implement a resolution database wherein each Client UTA is associated with its multiple Default Clearing Facility (DCF) UTAs distinguished by clearing methods and all non Client UTAs are being resolved into MDCF distinguished by clearing methods. The distinguishing method is Using the previous example with Russian, American banks and ABA the Russian bank maps only its respective client UTAs, and the American bank maps both its own and the Russian bank' client UTAs, and the ABA clearing database should map clients for both American and Russian banks. This resolution case to some extent is artificial and in the real world namespaces are hierarchical and use country and area codes for telephone numbers and domain notations for Internet domain namespaces to unambiguously route the connection.

Since both present Internet URLs and telephone numbers are widely in use (occupied) it seems impossible to build hierarchical namespace for clearing infrastructure using existing www domains and telephone numbers country and area codes. Therefore it seems useful to implement clearing infrastructure using new namespace URN:<NID><NSS> (RFC 2276, and RFC 3401-3406), or new Global Top Level Domains such as .PAY for example and Zero Based UTA (ZUTA) numbers for telephony:
ZUTA: +0-(123)-123-4567 or +1-(000)-123-4567 or +1-(212)-0123456
DNS: 12120123456.PAY Another Internet implementation with ZUTA➔ URN conversion can be applied considering provisional "PAY" to be the NID (namespace ID) and ZUTA with the payment message would be an NSS (Namespace Specific String).

Figure 24:
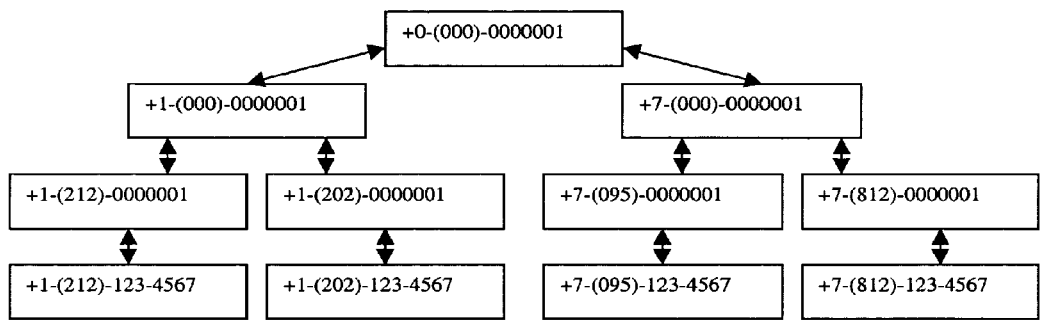
FIG. 24 is a diagram of an example of a Zero Based UTA hierarchical clearing architecture.

An example of a ZUTA hierarchical clearing architecture is shown in FIG. 24.

In order to convert ZUTA hierarchy into DNS hierarchy, the Algorithm (RFC 3402) implementation can be applied or other known or new techniques can be used also. Just as an illustration, distributed resolution services can use the next types of conversions:
+1-(202)-123-4567➔ 12021234567.pay
+1-(202)-123-4567➔ 2021234567.us.pay
+1-(202)-123-4567➔ 1234567.washington.us.pay
+1-(202)-123-4567➔ 1234567.202.1.pay
+1-(202)-123-4567➔ 4567.AT&T.washington.us.pay
+1-(202)-123-4567➔ 7.6.5.4.3.2.1.2.0.2.1.ABCD.arpa
+1-(202)-123-4567➔ tel:+12021234567

+1-(202)-123-4567➔ 12021234567.UTAresolution.com
+1-(202)-123-4567➔ UTAresolution.com?12021234567
While another DNS implementation still may use
+1-(202)-123-4567
➔ 12021234567.12020000001.0000000001.00000000001.com.
+1-(202)-123-4567➔ 12021234567@bank.clearing-house.com
Etc.

Figure 25:
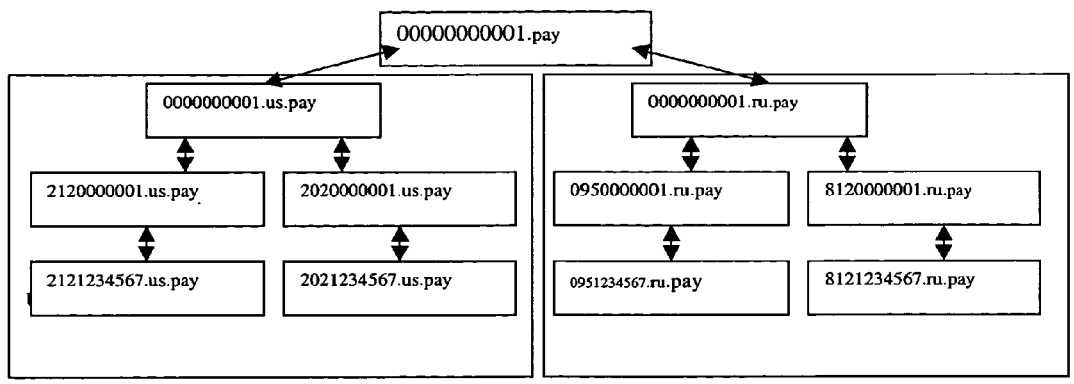
FIG. 25 is a diagram of another example of a Zero Based UTA hierarchical clearing architecture.

FIG. 25 shows the same clearing infrastructure as FIG. 24 assuming that ZUTA are converted into .PAY DNS notation wherein the US and RU are sub domains for .PAY domain descending resolution.

Another technique may use new protocol, for example some provisional HTTPSP—"hyper text transfer secure payment protocol" which could be HTTPS based and adopted for payment messaging, resolution and clearing purposes.

Still another approach can use standard Internet transport but dedicated proprietary distributed DNS system wherein domain holders all are domain Clearing Facilities and the DNS system maps ZUTA-to-IP; www-to-IP; e-mail-to-IP; Real Name-to-IP etc. Being proprietary DNS and PKI based, the latter solution seems to be the least expensive and the most secure solution.

In order to distinguish UTA resolution by clearing method, the resolution database can also be implemented as DDDS DNS database (RFC 3403) using ORDER and PREF fields to define the clearing methods and method usage priorities, the CF database in this case may implement DDDS Algorithm (RFC 3402) wherein the First Well Known Rule might be a "t-call string parsing", and Clearing and Resolution are implemented as DDDS database rules managed by t-call keys (RFC 3402) taken from t-call string as parameter' values.

Notwithstanding the above, more practical might be using of existing DNS namespaces as clearing ones wherein the Client #3 (see FIG. 23) would have 3 DNS names designating 3 alternative clearing routes. Assuming that CF#6 is CF6.com and CF#5 is CF5.com and CF#2 is CF2.com the clearing route would below DNS notation:

Client3.CF4.CF3.CF2.com for (Client#1➔ CF#1➔ CF#2 ➔ CF#3➔ CF#4➔ Client#3)
Client3.CF5.CF2.com for (Client#1➔ CF#1➔ CF#2 ➔ CF#5➔ Client#3)
Client3.CF5.CF7.CF6.com for (Client#1➔ CF#1➔ CF#4 ➔ CF#4➔ CF#5➔ Client#3).

In the latter case the Client #3 UTA is mapped to its URLs Client3.CF4.CF3.CF2.com, Client3.CF5.CF2.com and Client3.CF5.CF7.CF6.com within the CF2.com, and CF6.com clearing namespace domains.

Resolution Cycle. The resolution cycle is a clearing database lookup and applies to the atomic payment routing.

Resolution services. Resolution services apply to an EEP routing and is deployed as a process of consecutive resolution cycles—lookups into the CF Domain Name System databases (RFC 1035, 1034 and 3403) in regard to the payment destination node's network address resolution. Similarly to DNS system implementation each CF domain becomes a "zone of authority" for its end clients and children CFs.

Each Target's network ID can be resolved into its Default Clearing Facility's network ID wherein the DCF is domain zone of authority for the Target name which is being a sub domain or a host name in this case. For example Target ID=+1-(212)-123-4567 can map its DCF ID=12121234567.citibank.com wherein Citibank.com is authoritative domain for the Target. Such method allows seamless routing of t-calls through the chain of default clearing facilities. The default CF can be a bank or a credit card payment processing center or Automated Clearing House or other clearing facility.

CF discovery services implementation. In order to implement clearing route discovery and exploration, the Routing Information Protocol (RIP-2 RFC 1723) or other similar technique can be used.

TCP/IP "Tracert" command or alike can be implemented as discovery service command, or other similar commands can be used for wired and wireless communication networks.

Below is the "tracert" command use example:
C:\>tracert www.multilex.ru
Tracing route to multilex.ru [212.24.32.169]
over a maximum of 30 hops:

| 1  | <1 ms  | <1 ms  | <1 ms  | gate.medialingua.ru [192.168.1.3] |
| 2  | 1 ms   | 1 ms   | 1 ms   | 62.118.27.65 |
| 3  | 20 ms  | 21 ms  | 21 ms  | 10.4.255.100 |
| 4  | 123 ms | 211 ms | 131 ms | spd-gw-GE-0-1-20.mtu.ru [195.34.53.97] |
| 5  | 22 ms  | 21 ms  | 25 ms  | PTT-Pex.core.mtu.ru [195.34.53.65] |
| 6  | 22 ms  | 23 ms  | 23 ms  | Pex-M9.core.mtu.ru [195.34.53.10] |
| 7  | 44 ms  | 43 ms  | 42 ms  | s-b3-pos0-2.telia.net [213.248.101.57] |
| 8  | 45 ms  | 45 ms  | 45 ms  | teliasonera-01843-s-b3.c.telia.net [213.248.78.250] |
| 9  | 68 ms  | 73 ms  | 75 ms  | mow1-000.sonera.ru [217.74.128.122] |
| 10 | 75 ms  | 73 ms  | 74 ms  | vlan30-ge5-1.m9-3.caravan.ru [217.74.128.126] |
| 11 | 77 ms  | 71 ms  | 77 ms  | vlan615-ge0-0-10.office-1.caravan.ru [217.23.151.78] |

C:\>

As the route tracing example shows, the "tracert" command allows discovering the physical communication route from the Originator to Terminal node involving all intermediary nodes. Applying this communication method for implementation of an Internet Clearing and Settlement Infrastructure allows discovery services for payment routing.

The CF discovery and cost management services implementation overview can be found in the "Payment cost management case" of the "Use cases" section below.

Trusted services. In order to establish trusted relationships between payment nodes, the PKI may be used. Each node is being provided with a Digital Certificate containing at least the node's payment Attributes (RFC 3281). The payment Attributes are at least two UTA i.e., the Certified Target node UTA and the Target Default Clearing Facility's node UTA. Such Digital Certification of Routing Information provides trusted routing information for storing in the Clearing Facility Routing Database.

Illustrating the Digital Certificate content using DNS analogy again, such trusted payment attributes might include the whole set of DNS Resource Record's information which is kept in the name server master file or some vital mapping part of it (RFC 1034). Being further extracted from the Certificate and put into DNS zone master file, the Resource Record Information will provide trusted DNS resolution services. A convergence of Digital Certificates with DNS system is proposed in RFC 2538 "Storing Certificates in the Domain Name System (DNS)" and can be used to some extent in setting the DNS trusted database for the Internet Settlement Architecture. The RFC also provides access to the particular Target' Public Key so allowing t-call string encryption and digital signature check when appropriate.

The network may use one Root Certificate Authority or several RootCAs whose trusted services are mutually accepted due to some conventional agreement supporting cross operations. Although the number of RootCAs may vary the architecture nodes may not have sufficient hardware (mobile phones) or software resources to support all available RootCAs trusted services, therefore such nodes may use only one RootCA trusted services being cross operational due to some trust delegation agreement. Nevertheless, in some cases the number of useful trusted certificate' issuers may be limited to one.

Privacy issues. The privacy issues are being addressed in a way of PKI implementation wherein the Clearing network is a secure Electronic Funds Transfer (EFT) communication network and the Clearing databases are being distributed and replicated within the secure network area in a way described herein. Each Clearing Database is a secure network database accessible for only clearing nodes. The PKI trusted digital certificates are provisionally being used as a source of mapping information for the resolution database deployment herewith providing secure and trusted environment for clearing and resolution services.

Use Cases

Resolution DNS Database Implementation Case

Case 1

The proprietary Clearing & Settlement DNS infrastructure might be deployed using DNS software implementations (resolvers, name servers) and existing protocols including UDP and TCP/IP. Such DNS software may map and resolve not only www but any unique network ID into IP address providing different services as RFC 3403 provides. Herewith each Target UTA is being resolved into its mapping DCF IP address and for non Clients their appropriate UTAs are being resolved into Mother CF DNS server names while DNS system may use mother DCF domain as a "root" domain and resolve all non client UTA through it, or implement multilevel resolution model.

The RFC 1034, 1035 and 1183 can be used for such implementation to some extent. The resolution of Target UTA into domain name (see Credit transaction case payer.com➜payer.payerbank.com resolution example) in this case could be implemented using INN-ADDR.ARPA domain for IP address queries or using DDDS (RFC 3401-3406) for other types of UTA queries.

In the DDDS implementation case the "payee.com" query result might look like:

| | order | pref | flags | service | regexp | replacement |
|---|---|---|---|---|---|---|
| ;; | | | | payee.com. | | |
| IN NAPTR | 100 | 50 | "a" | "httpsp+N2T" | " " | payee.com |
| IN NAPTR | 100 | 50 | "a" | "https+N2R" | " " | payee.payeebank.clearing.com. |
| IN NAPTR | 100 | 60 | "a" | "https+N2R" | " " | payee.payeebank1.clearing1.com. |
| IN NAPTR | 100 | 70 | "a" | "https+N2R" | " " | payee.payeebank2.clearing2.clearing3.com. |
| IN NAPTR | 100 | 70 | "a" | "http+N2B" | " " | billing.payee.com. |
| IN NAPTR | 100 | 50 | "a" | "wap+N2V" | " " | wap.payee.com |
| IN NAPTR | 100 | 80 | "a" | "sip+N2V" | " " | payee.com@sip.someservice.com |
| IN NAPTR | 100 | 80 | "a" | "http+N2IP" | " " | 213.248.101.57, | wherein "https+N2T" service means a payment cost tracing service using provisional HTTPSP protocol; and three "https+N2R" services meaning providing alternative clearing domains for payment routing with preference 50, 60 and 70; and the latter "http+N2V" service for Viewing the content of the Payee WAP server providing services or consumer products.

Using the DDDS it is possible to trace routes using both payer and payee UTAs to query the DNS database for "https+N2R" services and matching the query results for mutually used clearing facilities and when matching facilities found it is possible to query the facilities for payment cost and time estimation in order to optimize the transaction.

Case 2

Assume the DDDS DNS database implements NAPRT resource records resolving each payment node address into its next DCF address. Assume also that some Payee (payee.com) has got account in PayeeBank (PEBank.com) and some Payer (payer.com) has got account in PayerBank (PRBank.com).

Consider that the t-call string is "?payee.com/credit/USD/1000/PayerDigSign". Assuming that the RFC 3402 Application Unique String is being composed by the Application by taking the text between '?' and first '/' signs (RFC 3402 First Well Known Rule), and using the text to query the DNS DDDS database. In our case the query is 'payee.com'.

The DDDS resolution of Payee.com would be:

| | order | pref | flags | service | regexp | replacement |
|---|---|---|---|---|---|---|
| | | | | Payee.com | | |
| ;; | | | | | | |
| IN NAPRT | 100 | 10 | " " | X2Y | " " | PEBank.com |

Now Application queries DNS database at PEBank.com applying the AUS payee.com. The PEBank.com rewrites the AUS into Payee.PEBank.com and Application queries database again for Payee.PEBank.com resolving into:

| | order | pref | flags | service | regexp | replacement |
|---|---|---|---|---|---|---|
| | | | | Payee.PEBank.com | | |
| ;; | | | | | | |
| IN NAPRT | 100 | 10 | "p" | X2Y | " " | payee.PEbank.DCF1.com |

Such implementation allows consecutive resolution of payer.com into payer.PRBank.com and into payer.PRBank.DCF1.com wherein the received DNS name "payee.PEbank.DCF1.com" is terminal (flag P) and the Application ends resolution for payee.com returning a string "payee.PEBank.DCF1.com" as a complete clearing path for the payee. Domain .COM is not a clearing domain here.

Same resolution being processed for payer would result into consecutive

| | order | pref | flags | service | regexp | replacement |
|---|---|---|---|---|---|---|
| | | | | Payer.com | | |
| ;; | | | | | | |
| IN NAPRT | 100 | 10 | " " | X2Y | " " | payer.PRBank.com |

| payer.PRBank.com | | | | | | |
|---|---|---|---|---|---|---|
| ;; | order | pref | flags | service | regexp | replacement |
| IN NAPRT | 100 | 10 | "p" | X2Y | " " | payer.PRBank.DCF1.com. |

Application compares the clearing terminal paths for payee Payee.com➜ PEBank.com; Payee.com➜ PEBank.com➜ DCF1.com and payer Payer.com➜ PRBank.com; Payer.com➜ PRBank.com➜ DCF1.com in order to find a Turning Clearing Node i.e. the leftmost matching name for both paths which is being DCF1 in our case. Both terminal chains are being compared for matching links which are being considered as the Turning Clearing Node wherein the route turns from ascending clearing into descending clearing. It is obvious that the clearing route for Payer-to-Payee in the present case will be Payer.com➜ PRBank.com➜ DCF1.com➜ PEBank.com➜ Payee.com wherein DCF1 is the Turning Clearing Node therefore.

There could be more than one Turning Clearing Node for each particular pare of payer and payee.

Routing Discovery Services Use Case

Assuming that Payer and Payee can be resolved using "Clearing DNS implementation case" into clearing route UTAs:

| Payer | | | | | | |
|---|---|---|---|---|---|---|
| ;; | order | pref | flags | service | regexp | replacement |
| IN NAPTR | 100 | 50 | "a" | "http+N2T" | " " | payer.com |
| IN NAPTR | 100 | 60 | "a" | "https+N2R" | " " | payer.FOObank.ROOclearing.com. |
| IN NAPTR | 100 | 50 | "a" | "https+N2R" | " " | payee.GObank.REclearing.com. | and

| Payee | | | | | | |
|---|---|---|---|---|---|---|
| ;; | order | pref | flags | service | regexp | replacement |
| IN NAPTR | 100 | 50 | "a" | "http+N2T" | " " | payee.com |
| IN NAPTR | 100 | 50 | "a" | "https+N2R" | " " | payee.ZOObank.ROOclearing.com. |
| IN NAPTR | 100 | 60 | "a" | "https+N2R" | " " | payee.GObank.TOclearing.com. |

Comparing the Payee and Payer resolution results for N2R (Name-to-Route) services we find that payment can be processed using either one of two independent routes i.e. within GObank where both payee and payer have accounts OR via ROOclearing Clearing Facility wherein Payee's ZOObank and Payer's FOObank have got clearing accounts.

Payer➜ GObank➜ Payee
Payer➜ FOObank➜ ROOclearing➜ ZOObank➜ Payee

If the Payer chooses to pay from its FOObank account (the account has got higher priority value in the pref field of NAPTR record) then the second ROOclering route must be used:

Payer➜ FOObank➜ ROOclearing➜ ZOObank➜ Payee.

Although the below "Payment cost management case" technique can be used to prioritize the existing routes on-line based on cost/time preferences of the payer.

Credit Transaction Case.

Assume the Clearing infrastructure involves Payee, Payee's bank, Payer, Payer's bank, and Automated Clearing House (www.CHIPS.com) shown in FIG. 23. Both banks and the ACH are Clearing Houses for their respective clients wherein each bank is a Payment Clearing and Routing Facility for its respective end-user clients and the ACH is a Payment Clearing and Routing Facility for both banks who are the members of the ACH. Assume also that the resolution services are implemented as a DNS service wherein the DNS database is mapping Target UTA to Target's DCF UTA. UTA can be a telephone number or a DNS name or an IP address or any other network address.

Let's now assume that the payer is a web site www.payer.com and the payee is a cell phone +1-(212)-123-4567 user.

Figure 26:
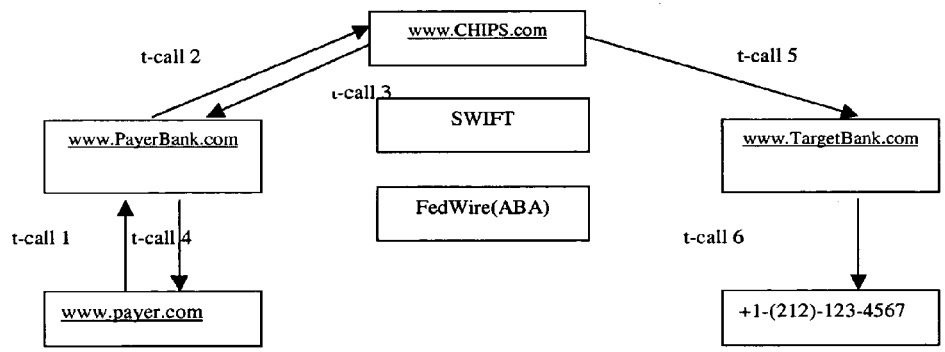
FIG. 26 is a diagram of an example of a payment procedure where funds are transferred from one account to another account.

Referring to FIG. 26, the task is to transfer funds from www.payer.com account to +1-(212)-123-4567 account.

Payment procedure:
1. payer.com composes t-call 1 string: credit.PayerBank.com?payer.com/USD/1000/CHIPS/+1-(212)-123-4567/DigitalSignatureOFwww.payer.com
2. www.payer.com connects to the network using t-call 1 string formatted in accordance to the network conventions (such as Syntax RFC 2396, RFC 3406 for example)
3. www.payerbank.com receives the t-call 1 and applies to it the First well known rule, then Payer bank executes clearing, lookup and resolution processes using the parameters taken from the t-call 1 string as the keys for the algorithm (RFC 3402). Since the payee +1-(212)-123-4567 account is not in the www.payerbank.com clearing domain, the resolution output will be nil (DNS error output), therefore CF output must be THE_UPPER_TIER_DEFAULD_CLEARING_FACILITY (UTDCF) which can either be one of SWIFT, ABA or CHIPS clearing houses used by www.payerbank.com as MDCF. From those CHIPS must be picked up as preferred one since CHIPS parameter was put in the t-call 1 string.
4. www.payerbank.com composes t-call 2 string in a form of credit.chips.com?payerbank.com/payer.com/USD/1000/ON/+1-(212)-123-4567/DigitalSignatureOFwww.payerbank.com. It is appropriate to notice that the www.payer.com notation itself might be reversely resolved using INN-ADDR operation into payerbank.com within www.payerbank.com since www.payerbank.com is a host within the www.payerbank.com clearing domain.

5. www.payerbank.com connects to network using t-call 2 string formatted in accordance to the network conventions (such as Syntax RFC 2396 and RFC 3406 for example)
6. www.CHIPS.com receives the t-call 2 string and applies its parsing, lookup, clearing and resolution procedures. The procedure output shows that the /+1-(212)-123-4567 resolves into 12121234567,TargetBank.chips.com since the TargetBank is a sub domain within the CHIPS clearing domain and the Target is a host within TargetBank clearing domain. Parameter ON applies to on-line clearing and notification procedure.
7. www.CHIPS.com composes t-call 5 in a form credit.TargetBank.com?chips.com/payerbank.com/payer.com/USD/1000/ON/+1-(212)-123-4567/DigitalSignatureOfwww.chips.com and connects to the network to complete the credit. It is appropriate to notice that www.payer.com notation itself might be reversely resolved using INN-ADDR operation into payer.payerbank.chips.com within www.chips.com since www.payer.com is a host in a www.payerbank.com clearing domain and the www.payerbank.com is a sub domain within the www.chips.com authoritative zone.
8. www.CHIPS.com composes t-call 3 in a form debit.PayerBank.com?chips.com/payerbank.com/payer.com/USD/1000/ON/+1-(212)-123-4567/DigitalSignatureOfwww.chips.com and connects to the network to complete the debit.
9. www.payerbank.com composes t-call 4 string in a form of debit.payerbank.com?payer.com/USD/1000/ON/+1-(212)-123-4567/DigitalSianatureOFwww.payerbank.com
10. credit.12121234567?chips.com/payerbank.com/payer.com/USD/1000/ON/+1-(212)-123-4567/DigitalSignatureOFwww.TargetBank.com and connects to the network to complete the credit.

Although only credit case is described herein one skilled in the art would appreciate the possibility of using the described technique to implementing a debit/charge/billing/etc case herewith.

It is obvious that advanced NAPTR RR and DDDS technique proposed in RFC 2916, 3401-3406 could be used for this use case implementation. In this case the resolution result may be in a NAPTR form:

| payee.com | | | | | |
|---|---|---|---|---|---|
| IN NAPTR | 100 | 80 | "a" | "pay+N2C" | " " payee.com@credit.payeebank.clearing.com, |
| IN NAPTR | 100 | 80 | "a" | "pay+N2D" | " " payee.com@dedit.payeebank1.clearing1.com, |
| IN NAPTR | 100 | 80 | "a" | "pay+N2B" | " " payee.com@billing.payeebank2.clearing2.com. |

In the latter implementation each kind of transaction uses default URL for crediting, debiting and billing activity for some provisional pay service.

Payment Cost Management Case

It is well known that wire transfer has a cost and it may vary depending on payment method (ABA, SWIFT and Credit Card methods) while Payer, Payee and sum are the same. FIG. 23 illustrates different payment chains including different number of participants and this number may also impact on the payment cost and clearing & routing time.

Assume the provisional Internet Settlement Infrastructure is exist and implements specific payment cost related "cost" command, assume also this "cost" command is similar to the existing "tracert" Internet command but additionally returns peer-to-peer atomic payment cost and other measures as a response parameters. Such command can be implemented using routing discovery services as shown in the "Routing discovery services use case" above. Assuming so for the infrastructure shown on FIG. 23, the provisional "cost" command applied to Client #3 would discover the clearing route (Client#1➡ CF#1➡ CF#2➡ CF#3➡ Client#2) returning the below result:

C:\>cost 'Client #2'.

Tracing route cost to 'Client#2' [212.24.32.169] over a maximum of 30 hops:

| | | | | | |
|---|---|---|---|---|---|
| | | Route 1 | | | |
| 1 | 10 ms | 10 ms | 10 ms | USD 0,32 | CF#1 [192.168.1.3] |
| 2 | 10 ms | 10 ms | 10 ms | USD 0,0 | CF#2 [62.118.27.65] |
| 3 | 10 ms | 10 ms | 10 ms | USD 0,5 | CF#3 [10.4.255.100] |
| 4 | 10 ms | 10 ms | 10 ms | USD 0,0 | Client #2 [10.4.255.101] |

Route 1 statistics:
Number of CF Nodes=3
Approximate payment cost USD 0,82
Approximate payment time 30 ms
C:\>

Now assume Client #1 would like to transfer money to Client #3. He/she may use either one of alternative clearing routes:

(Client#1➡ CF#1➡ CF#2➡ CF#3➡ CF#4➡ Client#3)

or (Client#1➡ CF#1➡ CF#2➡ CF#5➡ Client#3) or (Client#1➡ CF#1➡ CF#6➡ CF#7➡ CF#5➡ Client#3).

Therefore the 'cost' command in (Client#1➡ Client#3) payment would return:

C:\>cost 'Client #3'.

Tracing route cost to 'Client#3' [212.24.32.169] over a maximum of 30 hops:

| | | | | | |
|---|---|---|---|---|---|
| | | Route 1 | | | |
| 1 | 10 ms | 10 ms | 10 ms | USD 0,32 | CF#1 [192.168.1.3] |
| 2 | 10 ms | 10 ms | 10 ms | USD 0,0 | CF#2 [62.118.27.65] |
| 3 | 10 ms | 10 ms | 10 ms | USD 0,5 | CF#3 [10.4.255.100] |
| 4 | 10 ms | 10 ms | 10 ms | USD 0,5 | CF#4 [10.4.255.101] |
| 5 | 10 ms | 10 ms | 10 ms | USD 0,0 | Client #3 [10.4.255.102] |

-continued

| | | | | | |
|---|---|---|---|---|---|
| | | Route 2 | | | |
| 1 | 10 ms | 10 ms | 10 ms | USD 0,32 | CF#1 [192.168.1.3] |
| 2 | 1 day | 1 day | 1 day | USD 0,0 | CF#2 [62.118.27.65] |
| 3 | 10 ms | 10 ms | 10 ms | USD 0,5 | CF#5 [10.4.255.103] |
| 4 | 10 ms | 10 ms | 10 ms | USD 0,0 | Client #3 [10.4.255.105] |
| | | Route 3 | | | |
| 1 | 10 ms | 10 ms | 10 ms | USD 0,32 | CF#1 [192.168.1.3] |
| 2 | 10 ms | 10 ms | 10 ms | USD 0,2 | CF#6 [62.118.27.65] |
| 3 | 10 ms | 10 ms | 10 ms | USD 0,5 | CF#7 [10.4.255.106] |
| 3 | 10 ms | 10 ms | 10 ms | USD 0,5 | CF#5 [10.4.255.107] |
| 4 | 10 ms | 10 ms | 10 ms | USD 0,0 | Client #3 [10.4.255.108] |

Route 1 statistics:
Number of CF Nodes=4
Approximate payment cost USD 1,32
Approximate payment time 50 milliseconds
Route 2 statistics:
Number of CF Nodes=3
Approximate payment cost USD 0,82
Approximate payment time 1 day and 30 milliseconds
Route 3 statistics:
Number of CF Nodes=4
Approximate payment cost USD 1,52
Approximate payment time 50 milliseconds
C:\>

Obviously the Route 2 is the least expensive with the EEP cost of USD 0.82 but yet the most time consuming with the clearing period over 1 day against 50 milliseconds for the Route 1 or Route 3. The 'cost' command technique is computational and allows clearing time and payment cost on-line management.

Internet Settlement Architecture provides unique implementation of a clearing routes ranging by using cost command for EEP; and the ranging in turn allows the routing management by using cost and time user preferences, therefore the invention allows operational cost management implementation for financial institutions and their respective customers using cost tracing command.

Using payment preferences for the last cost command example may result in execution of different clearing procedures, so if the user primary preference is On-line clearing and the secondary—minimal cost, the clearing management output would be the Route 1 (cost USD 1.32; time 10 milliseconds) as the least expensive on-line route; and if the primary user preference is Minimal cost and the secondary—the clearing time, the clearing management output would be the Route 2 (cost USD 0.82; time 1 day).

It s possible to use existing Internet technology, its transport, resolution and routing techniques and to use mature PKI technology for payment clearing purposes allowing on-line, multi-tier and multi-route clearing infrastructure and payment services, providing seamless and transparent payment cost and payment routing management, enabling End-to-End payment Straight Through Processing (STP). The Internet Settlement Architecture payment cost management capability is capable of tremendously cutting or eliminating the banking and ACH overall operational costs allowing account holders to control and manage their payment cycle's time and cost.

Network specific identifiers (such as UTA, ZUTA and others) and the network specific software user interfaces (phone user interface and only numeric keyboards) may be used to navigate and manage the Internet Settlement Infrastructure enabling seamless payment addressing and clearing.

The Internet Settlement Architecture enables users to address payments without a need to know payee's banking details and payment routing information providing End-to-End account details resolution and Straight Through Processing for payment clearing services.

The Internet Settlement Architecture invention completely diverts the payment processing nature into online communication nature, diverting it from the field of multiple proprietary banking and clearing implementations into the standardized mainstream technology approach; from boring and cumbersome bank account details to the meaningful and easy-to-use network identifiers; from necessity to know bank details to the freedom of bank detail's resolution services; from impossibility of paying using numeric telephone keyboard to a freedom to address payments using existing telephone contact lists; from a $20^{th}$ century paper work to the future of on-line communications and complete computation.

The extensive use of the PKI trusted sources enables trusted financial account mappings allowing secure payment and clearing environment. The use of Attribute Certificates containing only payer network address mapped to its DCF network address allows filling in the DNS system database with the trusted mapping information avoiding the need to disclose the real banking details of the payee to a public.

The use of existing DNS technology for resolution of trusted mapping information allows seamless gathering of banking routing information enabling on-line straight through processing.

The Internet Settlement Architecture is widely based on the use of existing Internet infrastructure and technology, its transport protocols, providing therefore uniquely inexpensive built-in mechanisms for payment STP, with automatic management, resolution, routing and settlement. The invention opens a door for SID (Shared Information and Data) Model implementation of the Internet Settlement Architecture, providing Technology Neutral Architecture (TNA) for the TM Forum's (www.tmforum.org) New Generation Operations Systems and Software (NGOSS) business modeling initiative.

While various implementations of getting on-line status, authentication, verification, authorization, communication and transaction services for web-enabled hardware and software, based on uniform telephone address, as well as methods of Digital Certificate (DC) composition, issuance and management providing multitier DC distribution model and multiple accounts access based on the use of DC and Public Key Infrastructure (PKI) have been described, and a novel internet settlement architecture has been detailed, a skilled artisan will readily appreciate that numerous other implementations and variations of these implementations and methods are possible without departing from the spirit of the invention. Accordingly, the scope of the invention is defined by the claims set forth below.

What is claimed is:

1. A transactional communication method using transactional messages delivered over a communication network (CN), wherein the CN comprises a routing database; the routing database comprising at least a first field storing a first universal transactional account (UTA) identifier and a second field storing a second UTA identifier; the routing database providing resolution services by receiving from a remote terminal a query containing the first UTA identifier and retrieving the second UTA identifier from the second field corresponding to the received first UTA identifier wherein the retrieved second UTA identifier is further used to locate a connection endpoint; the CN implementing a messaging protocol or request-response session messaging protocol (MP) wherein MP messages are created using MP messaging syntax rules; wherein transactional messages are delivered to a service provider or processing center authorized by the service provider (SP) managing client accounts and processing the transactional messages while providing services to a client, the method comprising:

creating, by one of one or more hardware processors, UTA identifiers, each of the UTA identifiers comprising a unique string of symbols or characters;

assigning, by the one or more hardware processors, the first UTA identifier to the client and associating the first UTA identifier with a client account corresponding to the client;

assigning, by the one or more hardware processors, the second UTA identifier to the SP;

receiving, by the one or more hardware processors, the first UTA identifier from a remote terminal of one or more remote terminals, at a time subsequent to creation of the first UTA identifier, and storing the first UTA identifier into the first field and the second UTA identifier into the second field of the routing database;

creating, by a remote terminal of the one or more remote terminals, coupled to the CN and using at least one of the one or more hardware processors, an MP message containing at least the first UTA identifier and a value;

sending, by the remote terminal of the one or more remote terminals, and using at least one of the one or more hardware processors, the first UTA identifier for resolution to the routing database using the CN and retrieving the second UTA identifier from the second field of the routing database corresponding to the received first UTA identifier;

transmitting, by the CN and using at least one of the one or more hardware processors, the created MP message from the remote terminal of the one or more remote terminals, to the SP at the retrieved second UTA identifier; and receiving, by the SP and using at least one of the one or more hardware processors, the transmitted MP message and parsing the MP message to determine the first UTA identifier and the value.

* * * * *